Jan. 25, 1955      E. O. BLODGETT      2,700,447
JUSTIFYING TYPEWRITER
Original Filed Oct. 13, 1950      52 Sheets—Sheet 1
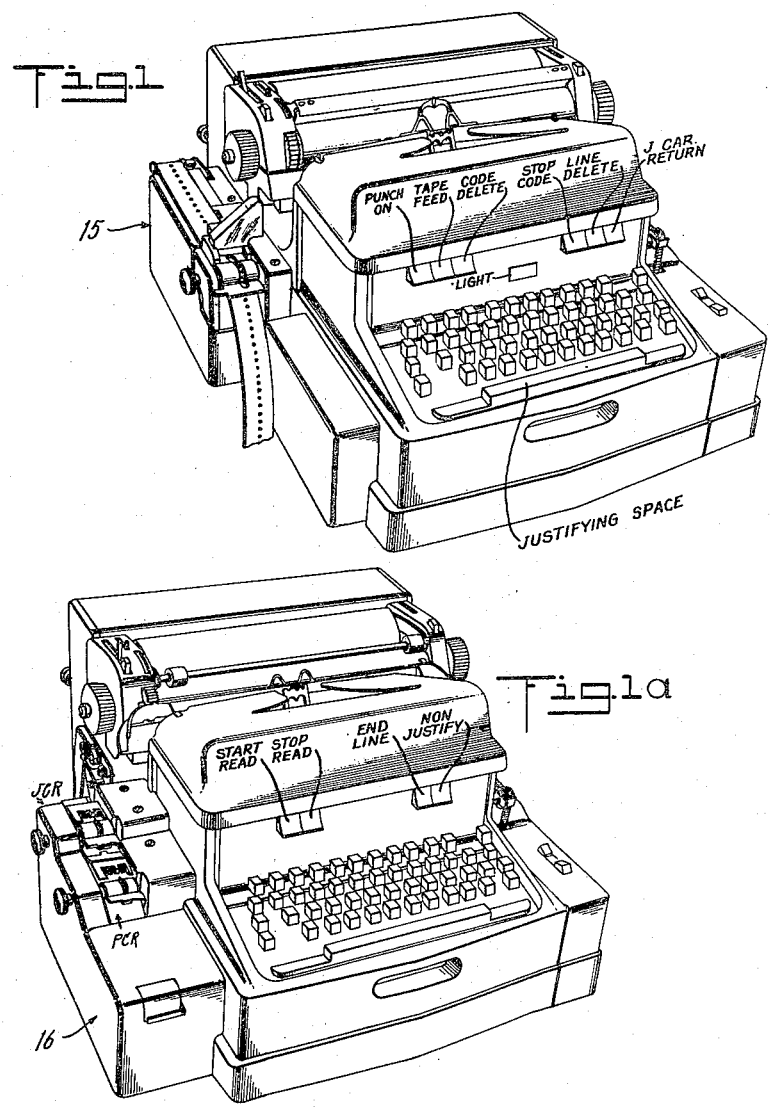
INVENTOR.
EDWIN O. BLODGETT
BY Robert S. Dunham
ATTORNEY Jan. 25, 1955     E. O. BLODGETT     2,700,447
JUSTIFYING TYPEWRITER
Original Filed Oct. 13, 1950     52 Sheets-Sheet 2
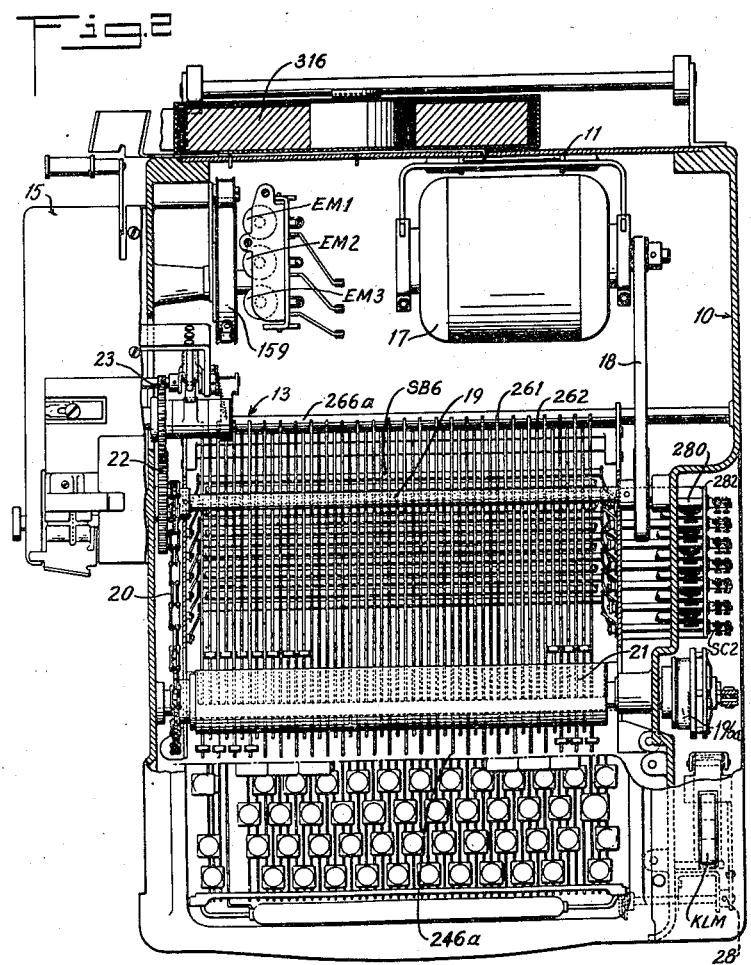
*INVENTOR.*
EDWIN O. BLODGETT
BY Robert S. Dunham
ATTORNEY

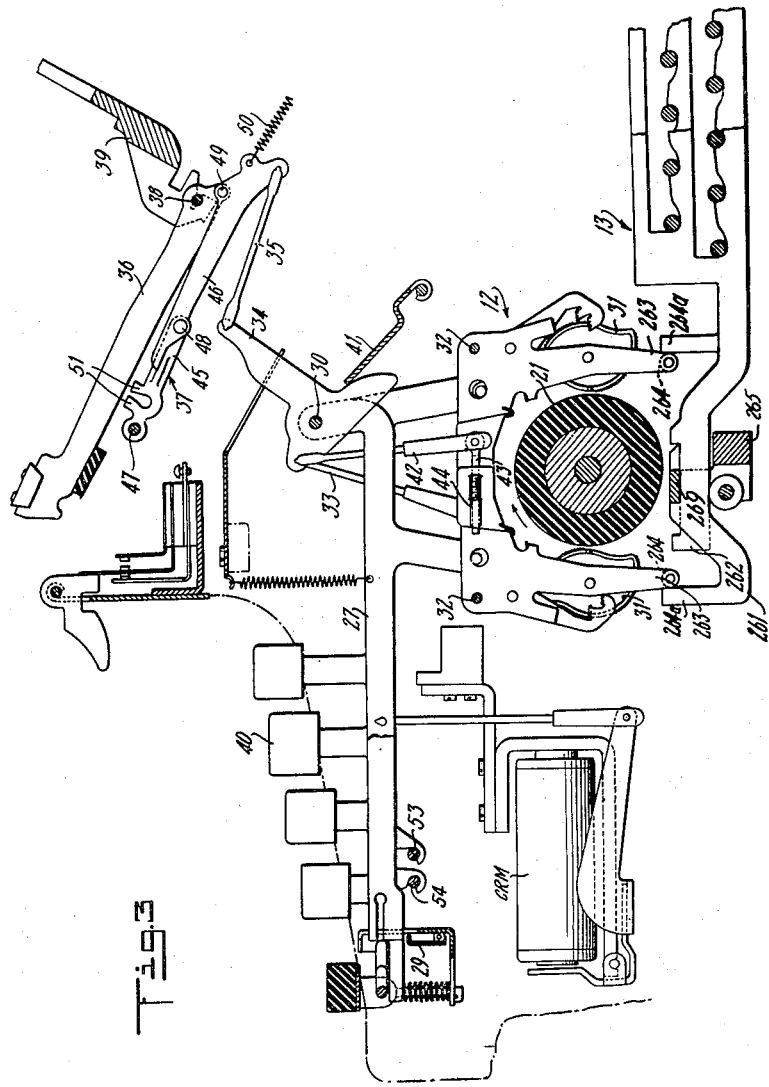

Jan. 25, 1955    E. O. BLODGETT    2,700,447
JUSTIFYING TYPEWRITER
Original Filed Oct. 13, 1950    52 Sheets-Sheet 5

INVENTOR.
EDWIN O. BLODGETT
BY Robert S. Dunham
ATTORNEY

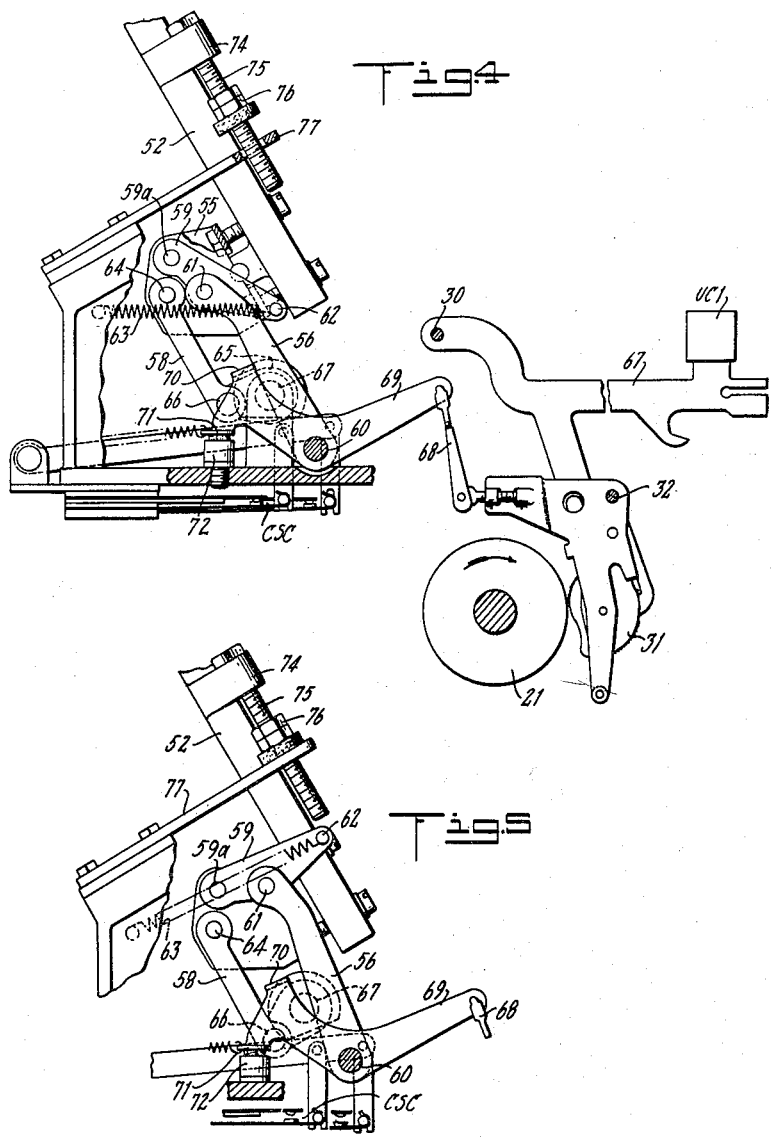

Jan. 25, 1955
E. O. BLODGETT
2,700,447
JUSTIFYING TYPEWRITER
Original Filed Oct. 13, 1950
52 Sheets-Sheet 7
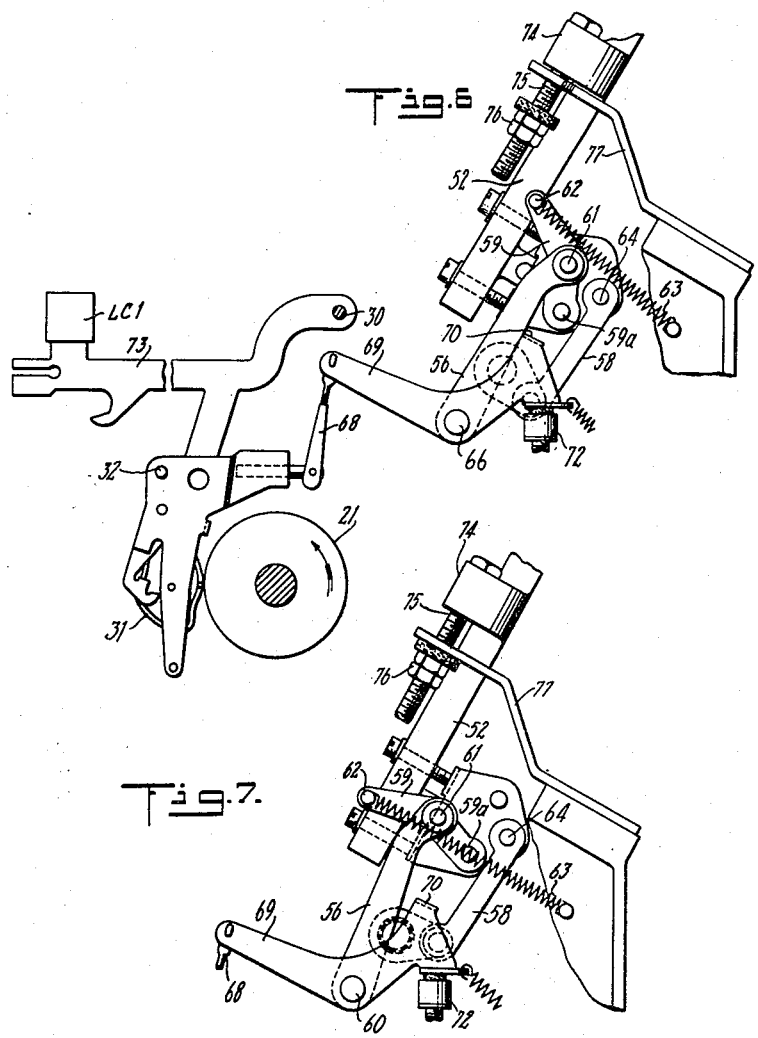
INVENTOR.
EDWIN O. BLODGETT
BY Robert S. Dunham
ATTORNEY Jan. 25, 1955 — E. O. BLODGETT — 2,700,447
JUSTIFYING TYPEWRITER
Original Filed Oct. 13, 1950 — 52 Sheets-Sheet 8

INVENTOR.
EDWIN O. BLODGETT
BY Robert S. Dunham
ATTORNEY

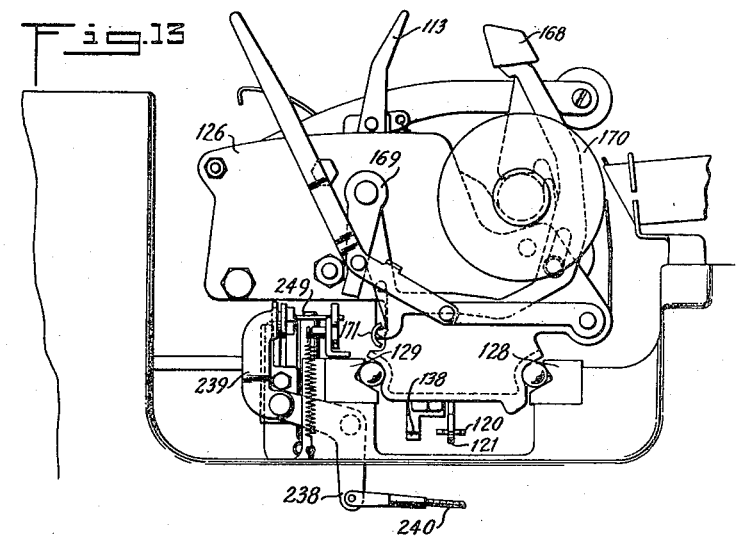
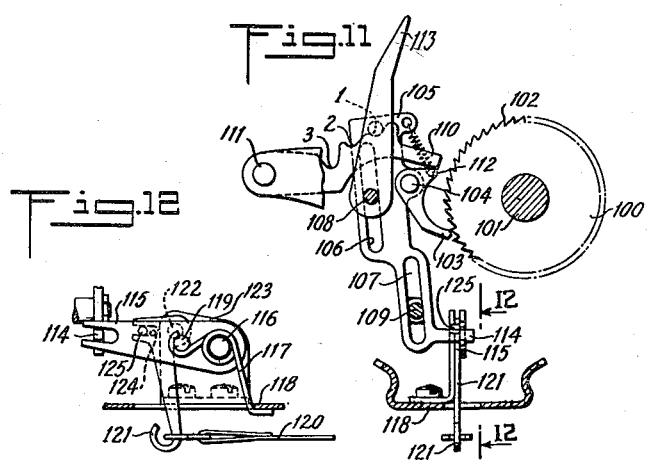

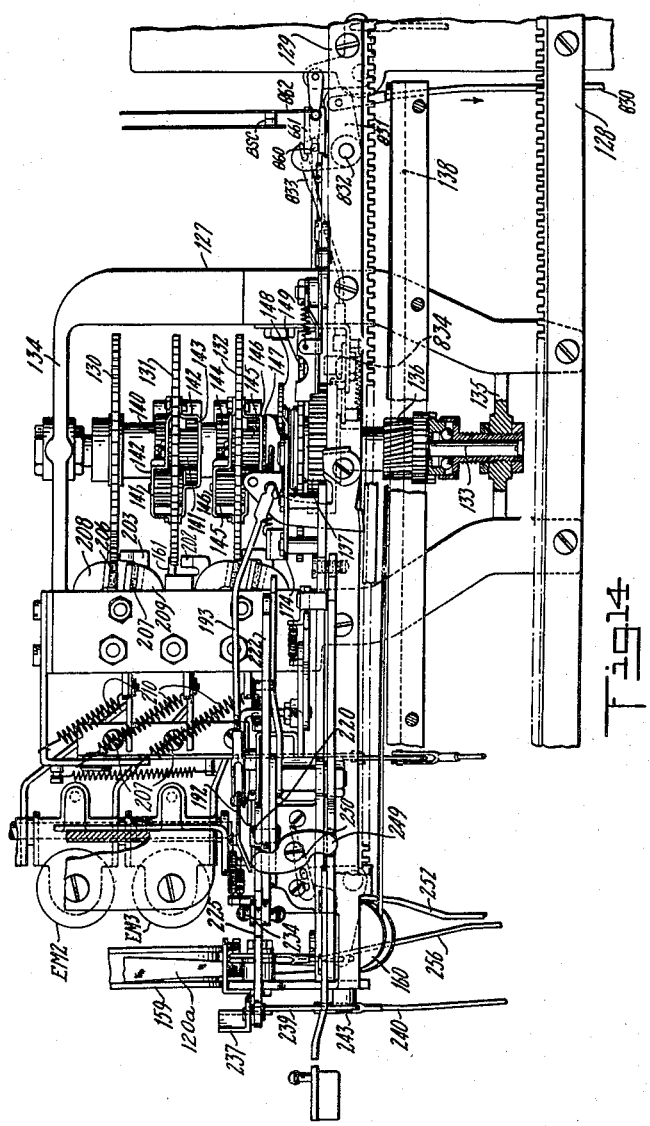

Jan. 25, 1955   E. O. BLODGETT   2,700,447
JUSTIFYING TYPEWRITER
Original Filed Oct. 13, 1950   52 Sheets-Sheet 12
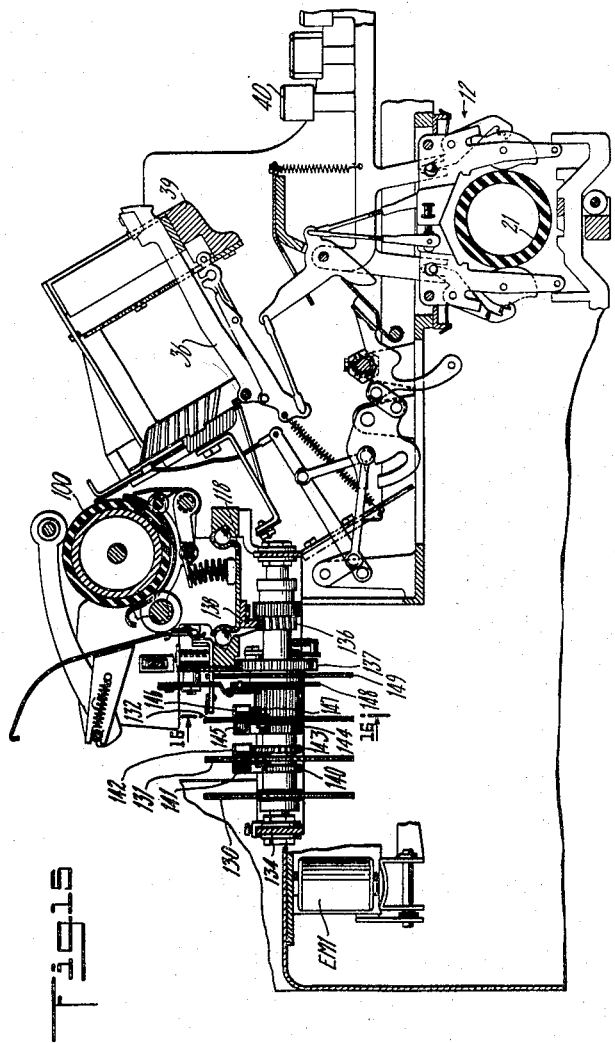
*INVENTOR.*
EDWIN O. BLODGETT
BY Robert S. Dunham
ATTORNEY Jan. 25, 1955   E. O. BLODGETT   2,700,447
JUSTIFYING TYPEWRITER Original Filed Oct. 13, 1950   52 Sheets-Sheet 13

*INVENTOR.*
EDWIN O. BLODGETT

BY *Robert S. Dunham*

ATTORNEY

Jan. 25, 1955
E. O. BLODGETT
2,700,447
JUSTIFYING TYPEWRITER
Original Filed Oct. 13, 1950
52 Sheets-Sheet 14
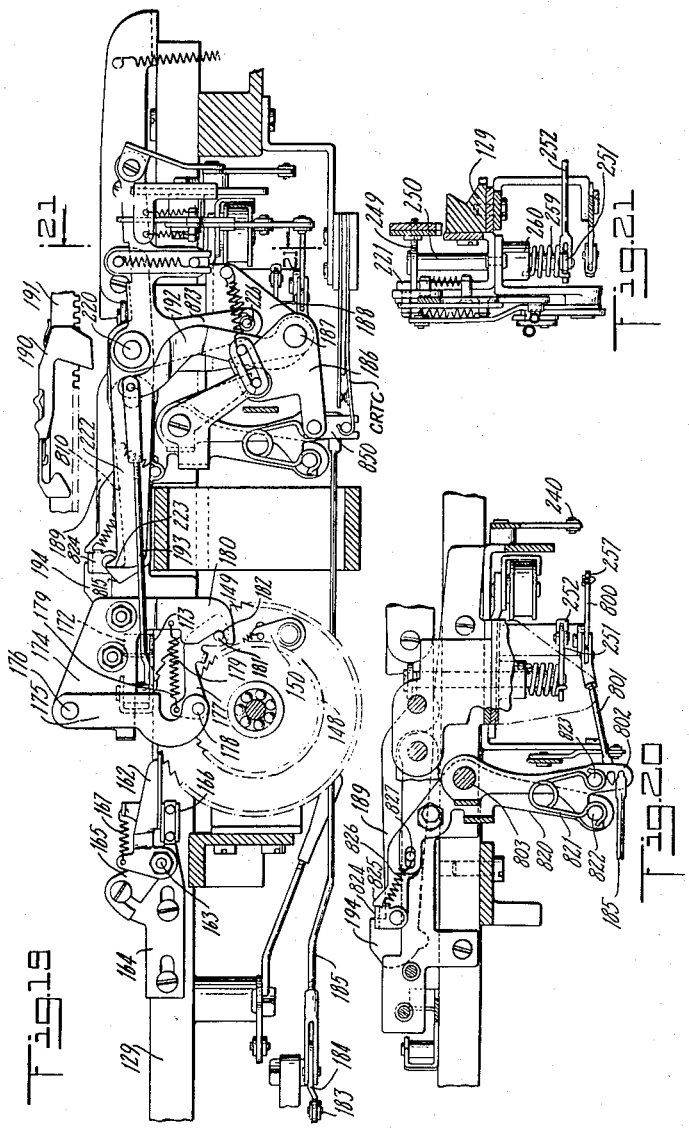
*INVENTOR.*
EDWIN O. BLODGETT
BY Robert S. Dunham
ATTORNEY Jan. 25, 1955  E. O. BLODGETT  2,700,447
JUSTIFYING TYPEWRITER
Original Filed Oct. 13, 1950   52 Sheets-Sheet 15
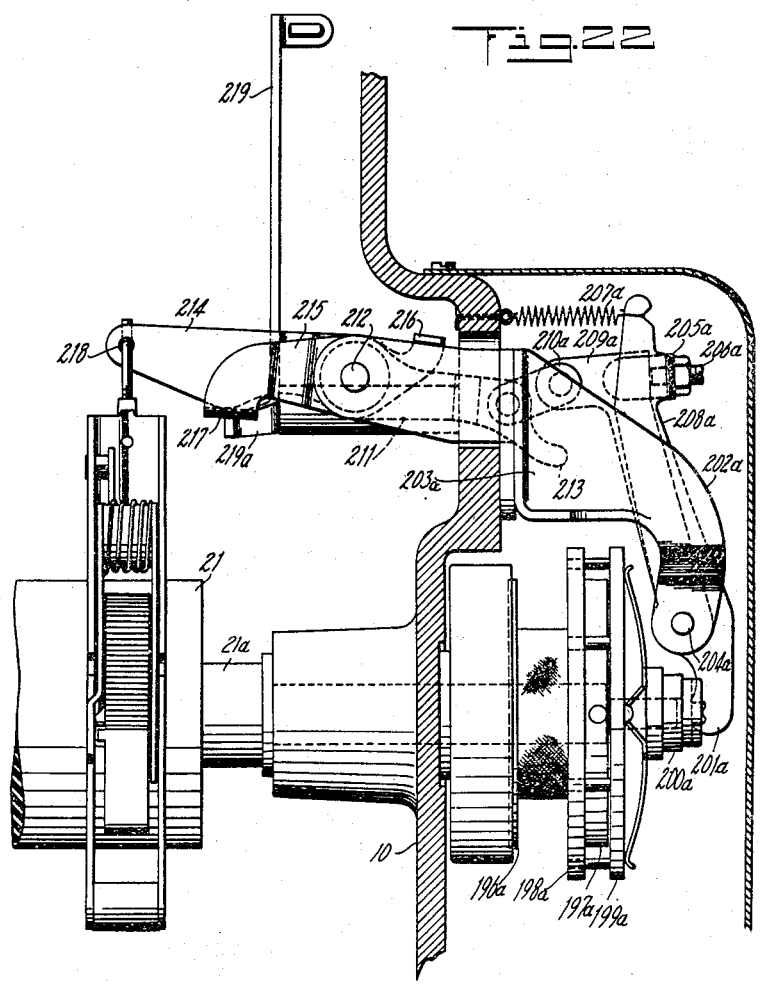
INVENTOR.
EDWIN O. BLODGETT
BY Robert S. Dunham
ATTORNEY Jan. 25, 1955 E. O. BLODGETT 2,700,447
JUSTIFYING TYPEWRITER
Original Filed Oct. 13, 1950 52 Sheets-Sheet 16
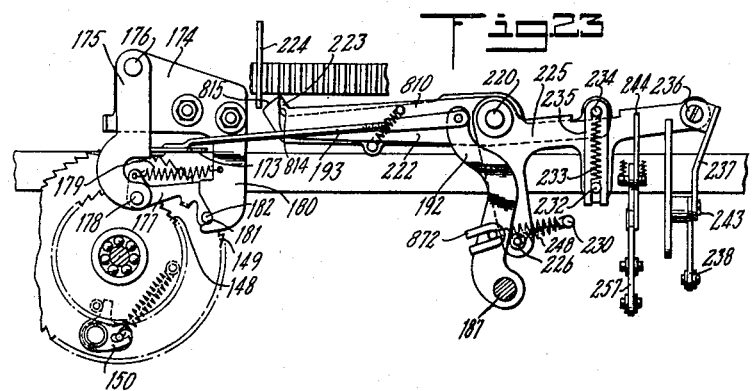
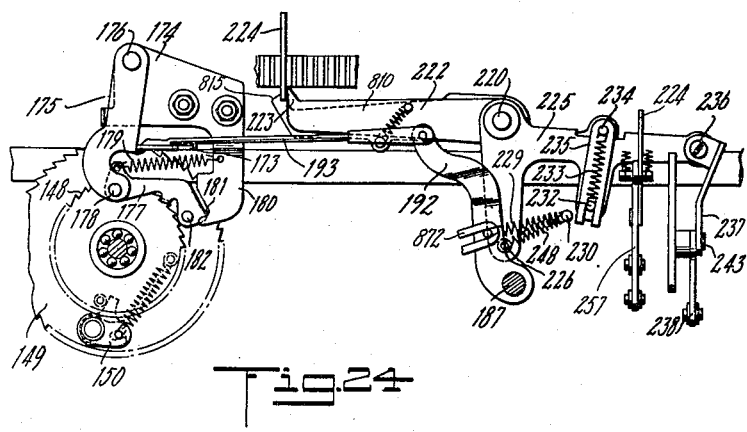
*INVENTOR.*
EDWIN O. BLODGETT
BY *Robert S. Dunham*
ATTORNEY

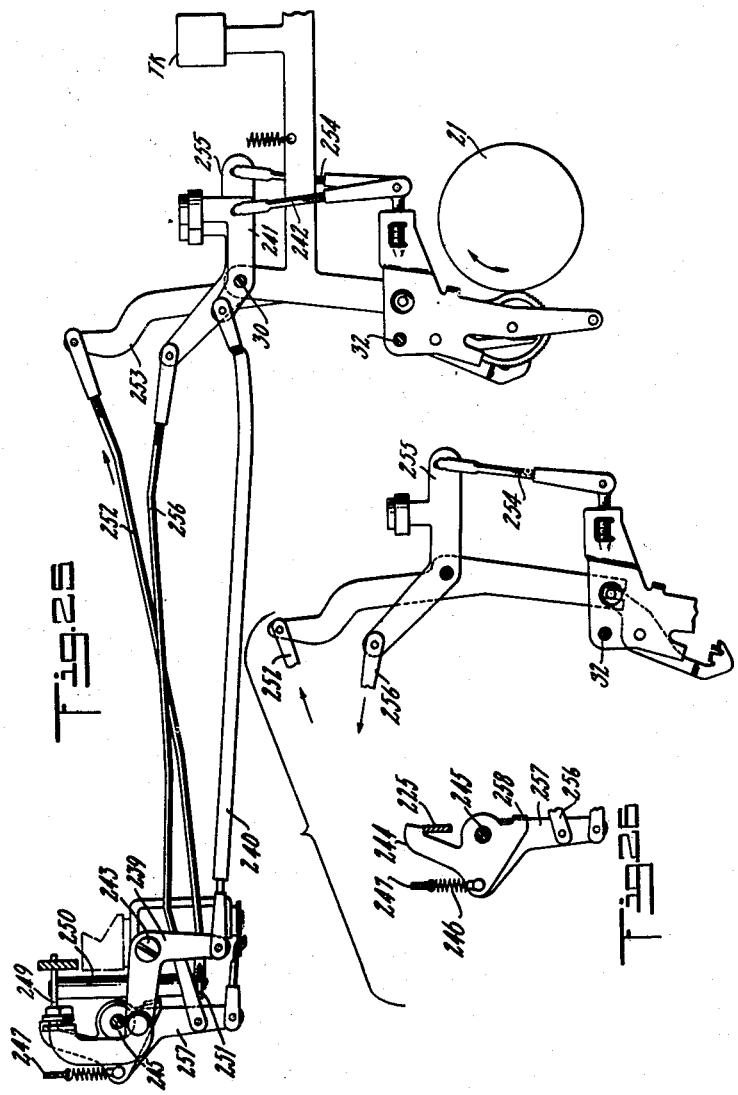

Jan. 25, 1955     E. O. BLODGETT     2,700,447
JUSTIFYING TYPEWRITER
Original Filed Oct. 13, 1950     52 Sheets-Sheet 18
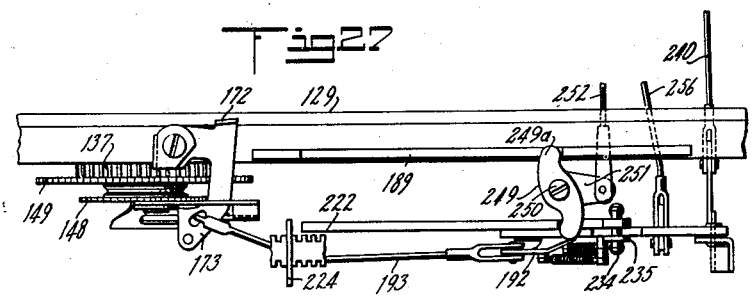
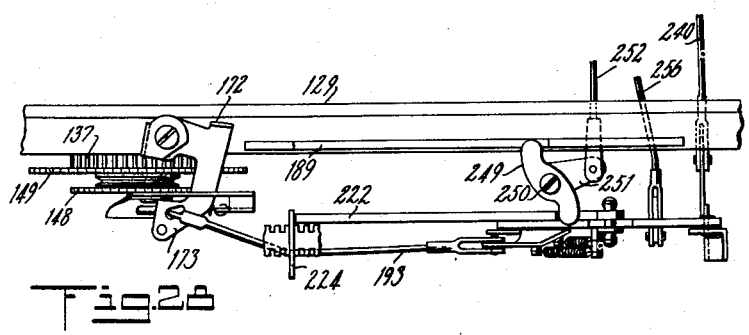
INVENTOR.
EDWIN O. BLODGETT
BY Robert S. Dunham
ATTORNEY

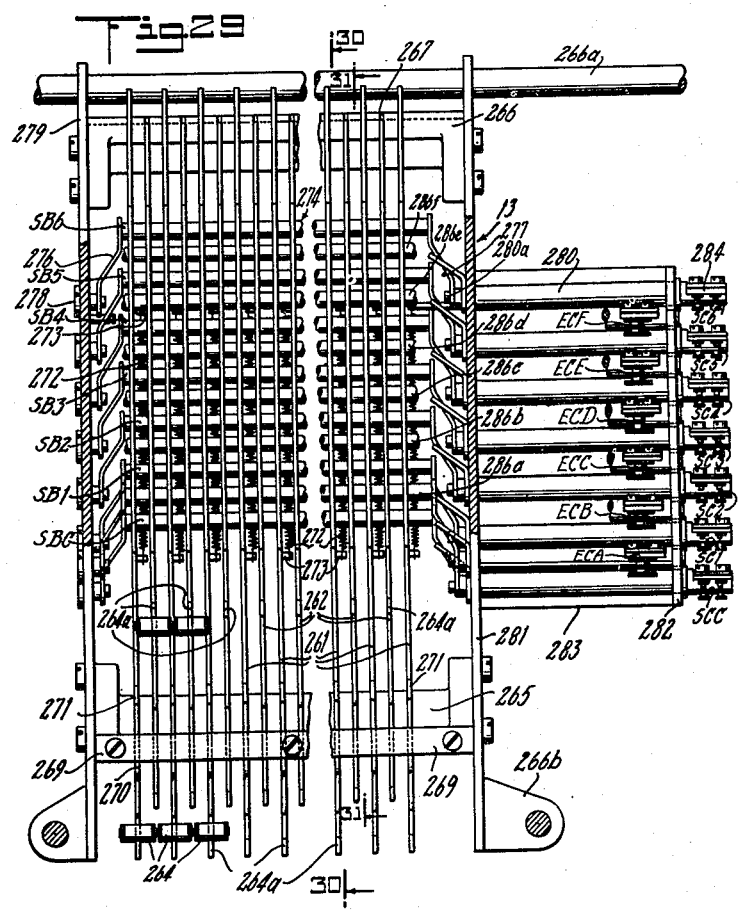

Jan. 25, 1955 E. O. BLODGETT 2,700,447
JUSTIFYING TYPEWRITER
Original Filed Oct. 13, 1950 52 Sheets-Sheet 20
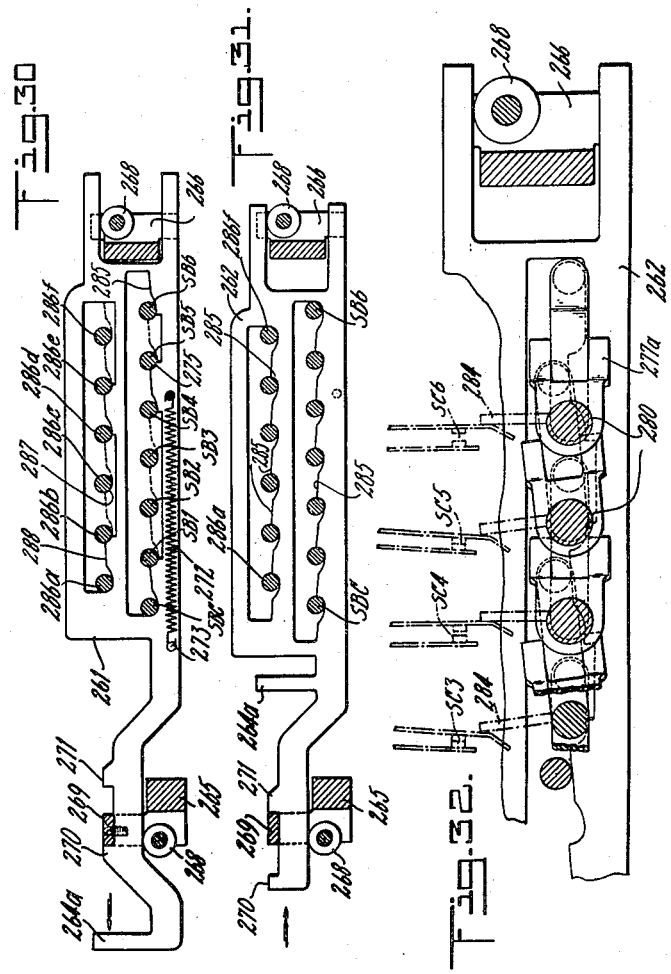
INVENTOR.
EDWIN O. BLODGETT
BY Robert S. Dunham
ATTORNEY Jan. 25, 1955     E. O. BLODGETT     2,700,447
JUSTIFYING TYPEWRITER
Original Filed Oct. 13, 1950     52 Sheets-Sheet 21
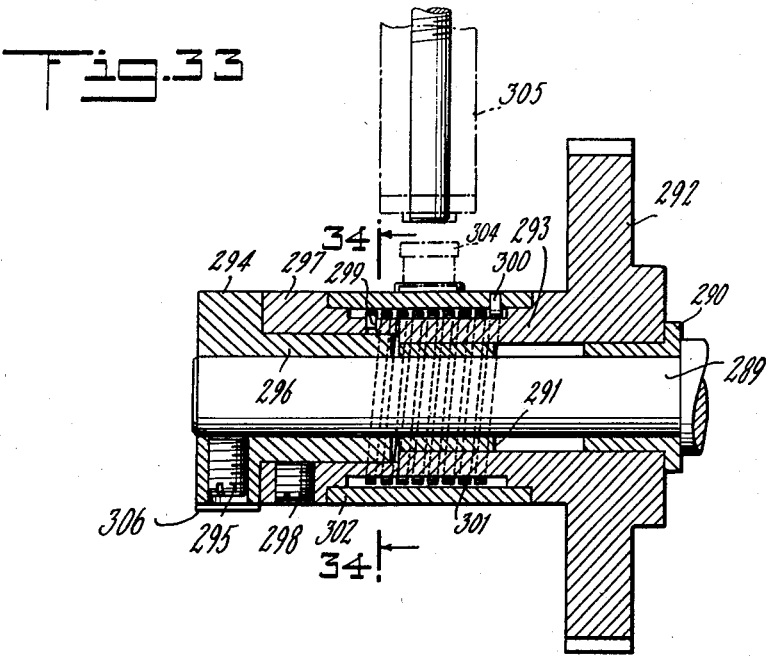
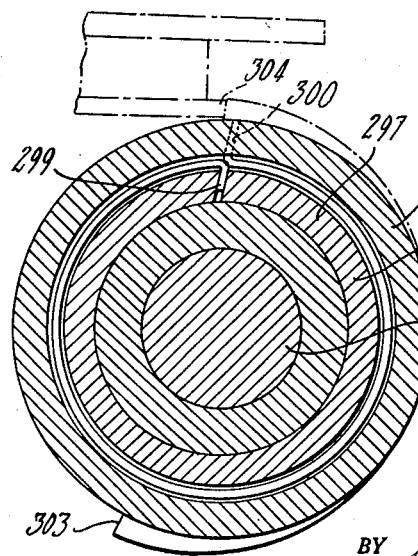
*INVENTOR.*
EDWIN O. BLODGETT
BY Robert S. Dunham
ATTORNEY

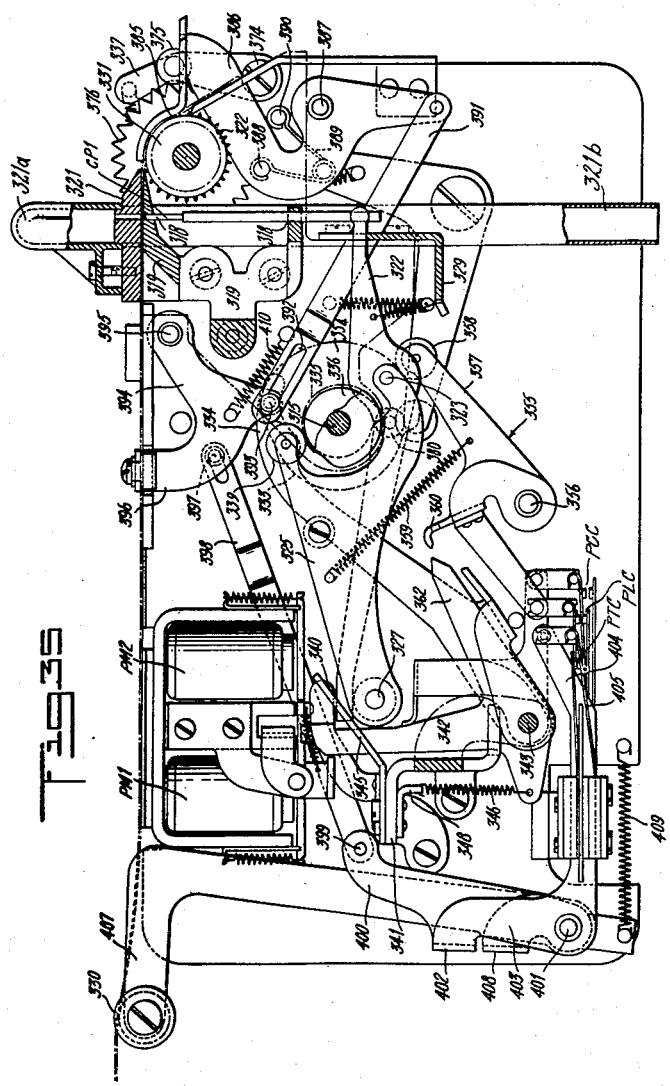

Jan. 25, 1955 E. O. BLODGETT 2,700,447
JUSTIFYING TYPEWRITER
Original Filed Oct. 13, 1950 52 Sheets-Sheet 23
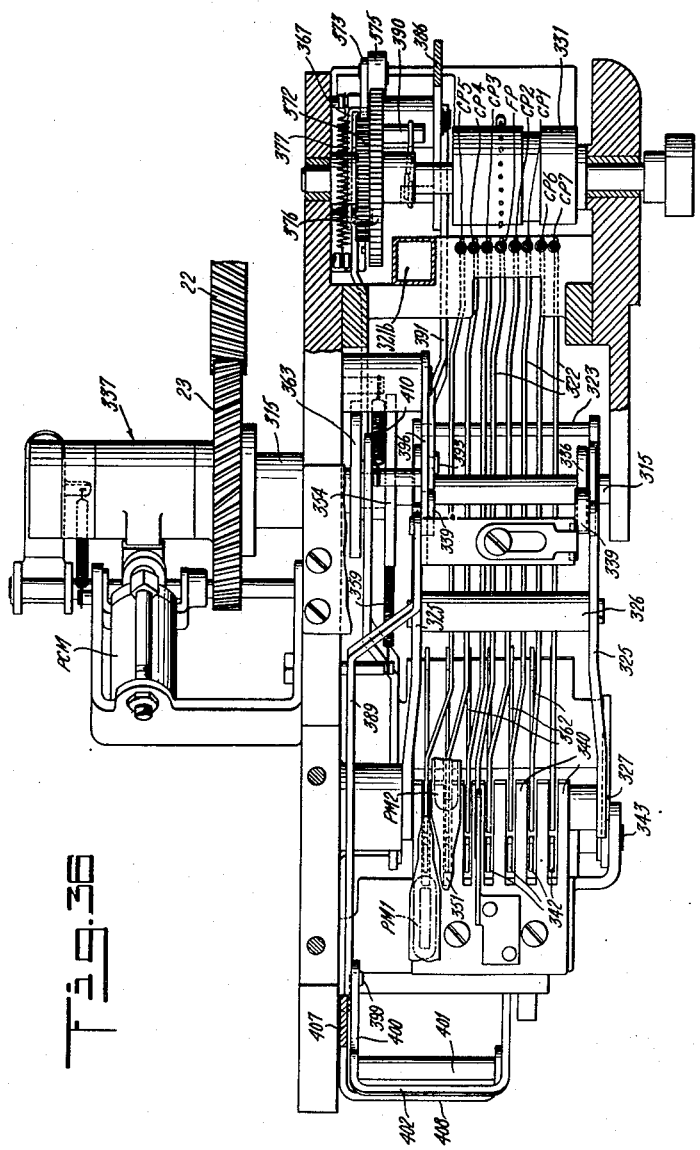
INVENTOR.
EDWIN O BLODGETT
BY Robert S. Dunlam
ATTORNEY Jan. 25, 1955 E. O. BLODGETT 2,700,447
JUSTIFYING TYPEWRITER
Original Filed Oct. 13, 1950 52 Sheets-Sheet 24
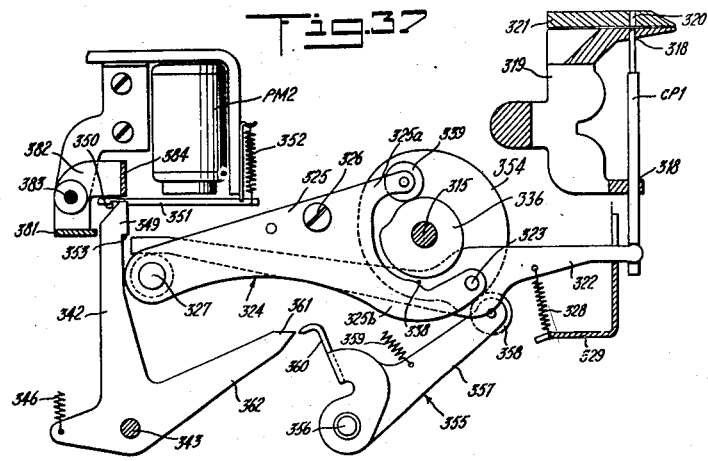
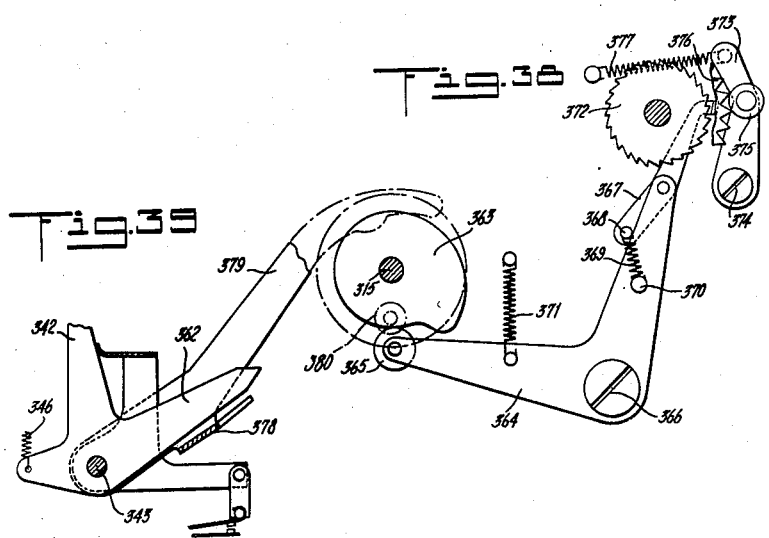
*INVENTOR.*
EDWIN O. BLODGETT
BY Robert S. Dunham
ATTORNEY INVENTOR.
EDWIN O. BLODGETT
BY Robert S. Dunham
ATTORNEY

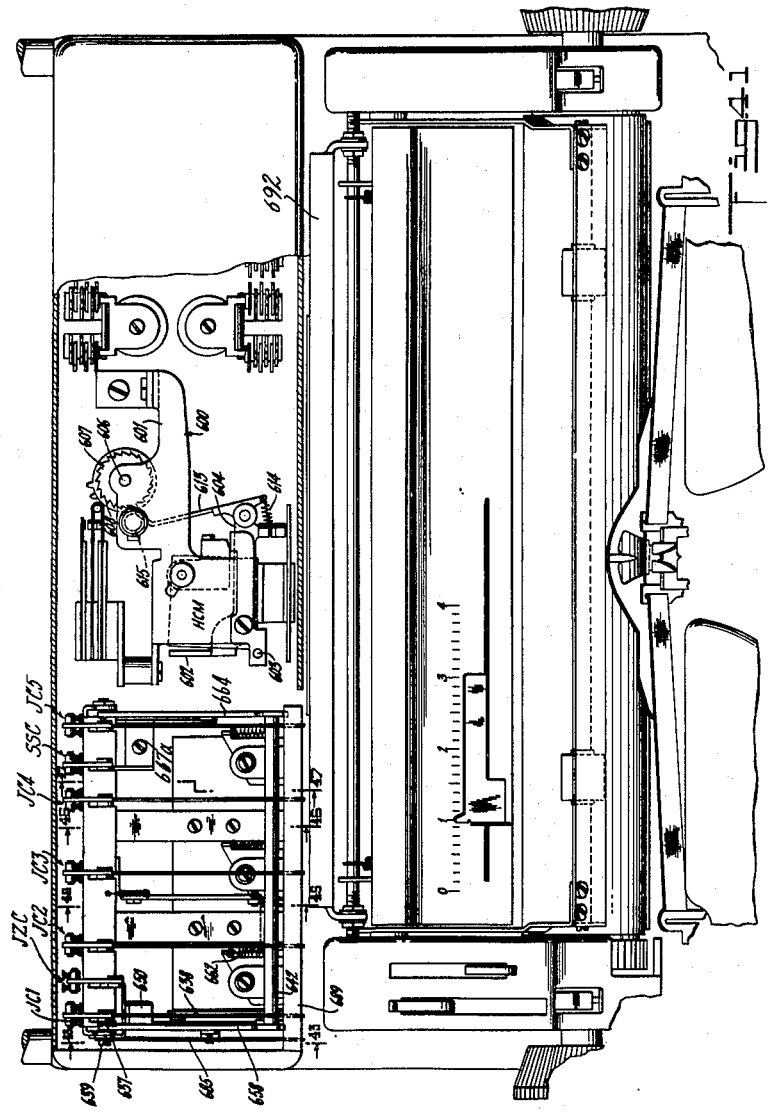

Jan. 25, 1955 E. O. BLODGETT 2,700,447
JUSTIFYING TYPEWRITER
Original Filed Oct. 13, 1950 52 Sheets-Sheet 27
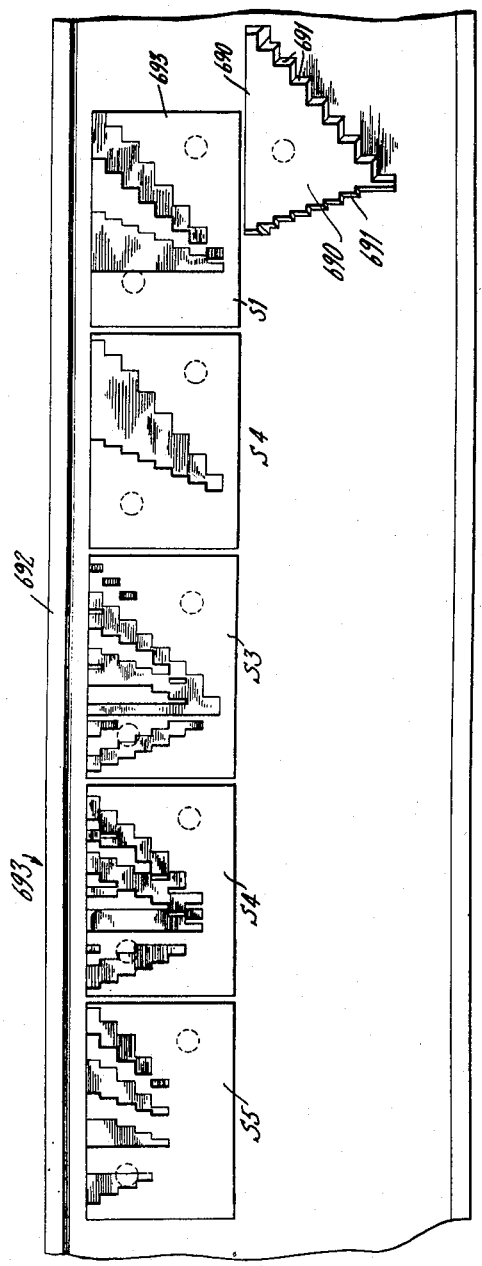
*INVENTOR.*
EDWIN O. BLODGETT
BY Robert S. Dunham
ATTORNEY

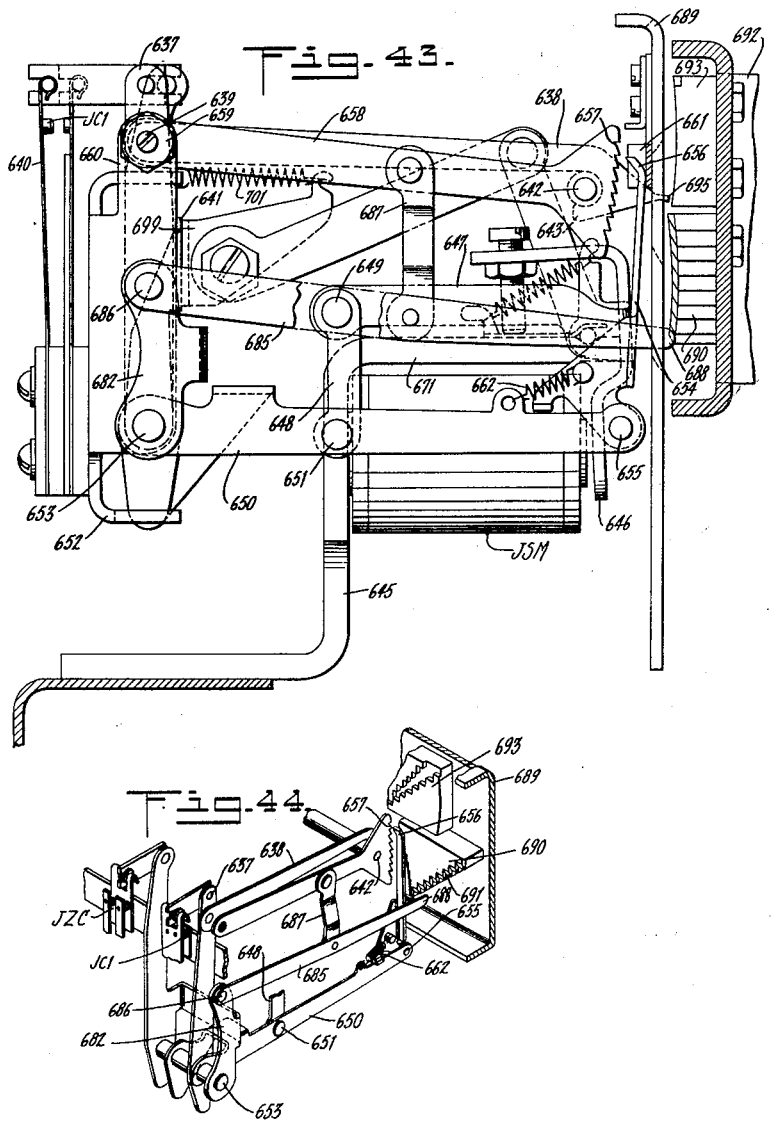

Jan. 25, 1955
E. O. BLODGETT
2,700,447
JUSTIFYING TYPEWRITER
Original Filed Oct. 13, 1950
52 Sheets-Sheet 29
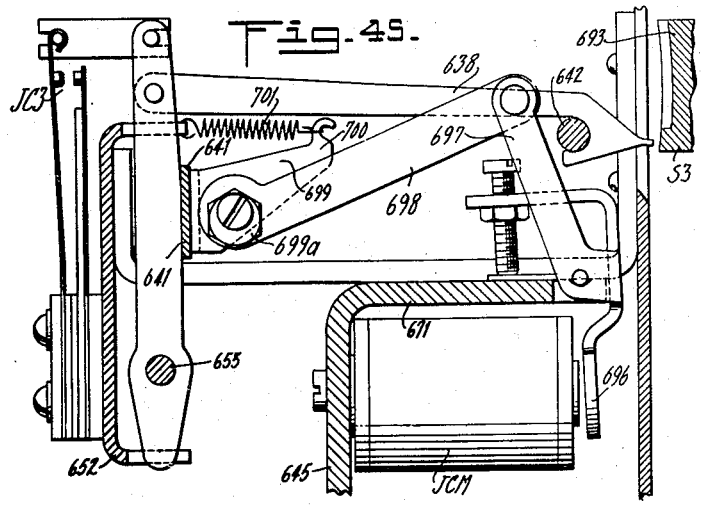
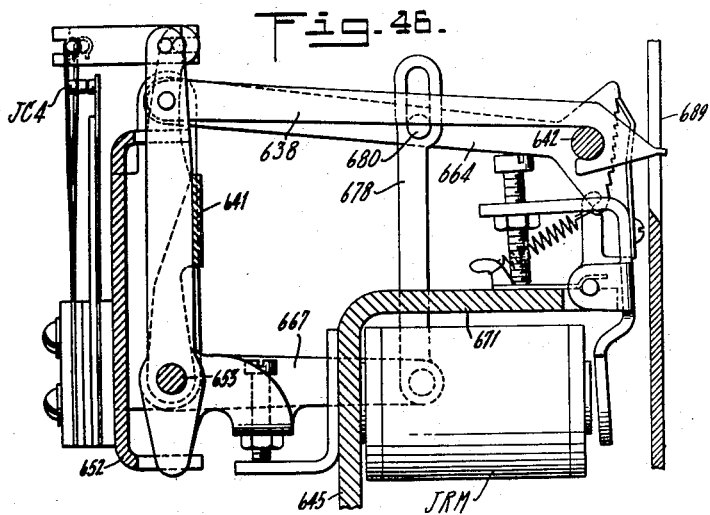
INVENTOR.
EDWIN O. BLODGETT
BY *Robert S. Dunham*
ATTORNEY

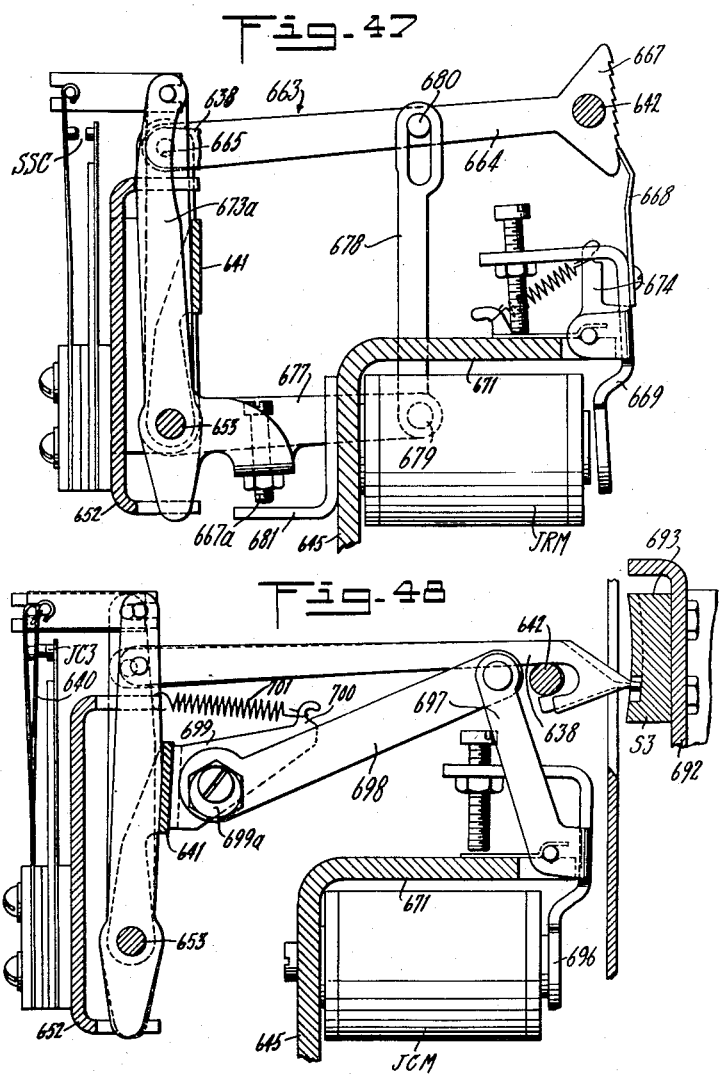

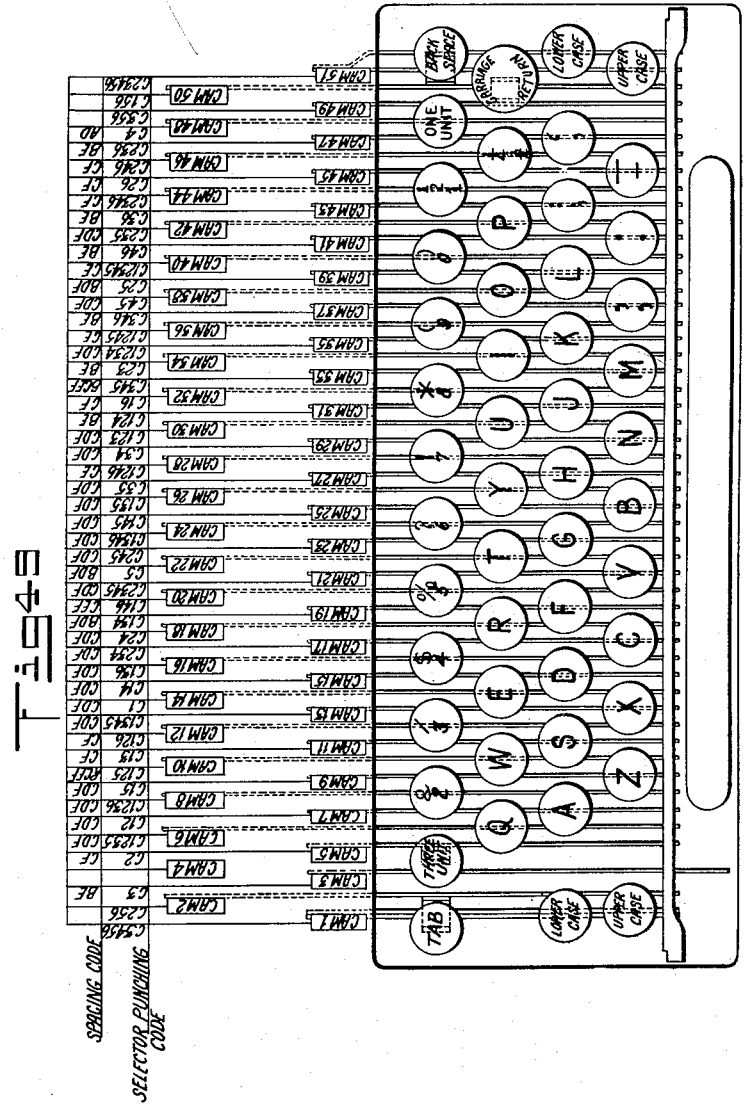

Jan. 25, 1955 E. O. BLODGETT 2,700,447
JUSTIFYING TYPEWRITER
Original Filed Oct. 13, 1950 52 Sheets-Sheet 32
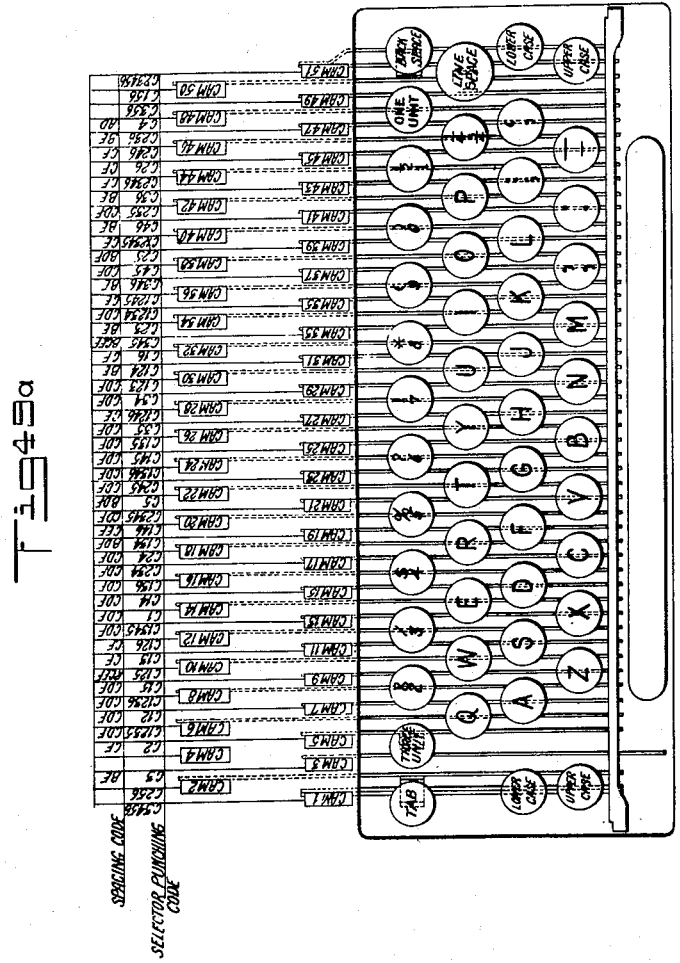
INVENTOR.
EDWIN O. BLODGETT
BY Robert S. Dunham
ATTORNEY Jan. 25, 1955  E. O. BLODGETT  2,700,447
JUSTIFYING TYPEWRITER Original Filed Oct. 13, 1950  52 Sheets-Sheet 33

Fig. 50

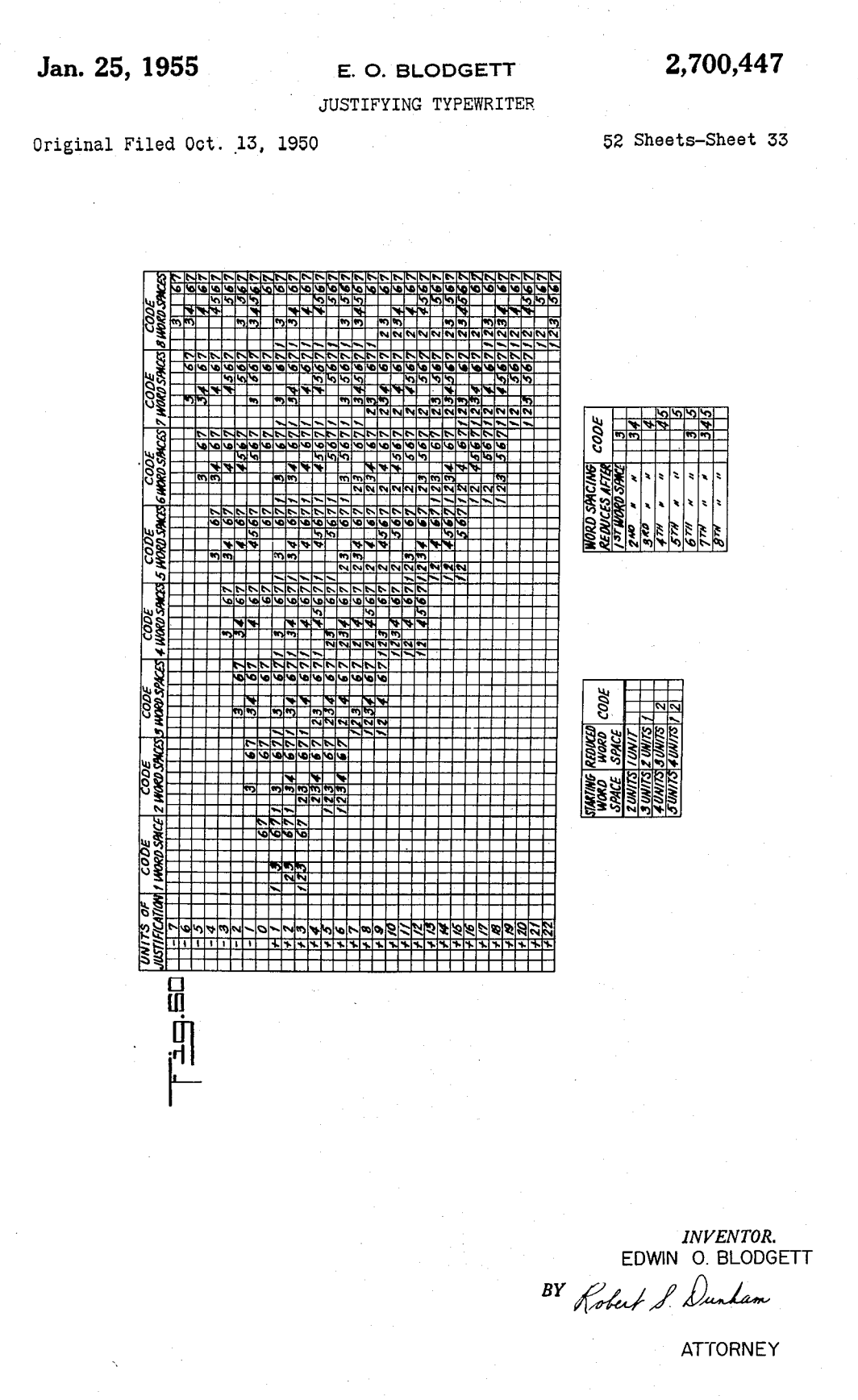

INVENTOR.
EDWIN O. BLODGETT
BY Robert S. Dunham
ATTORNEY

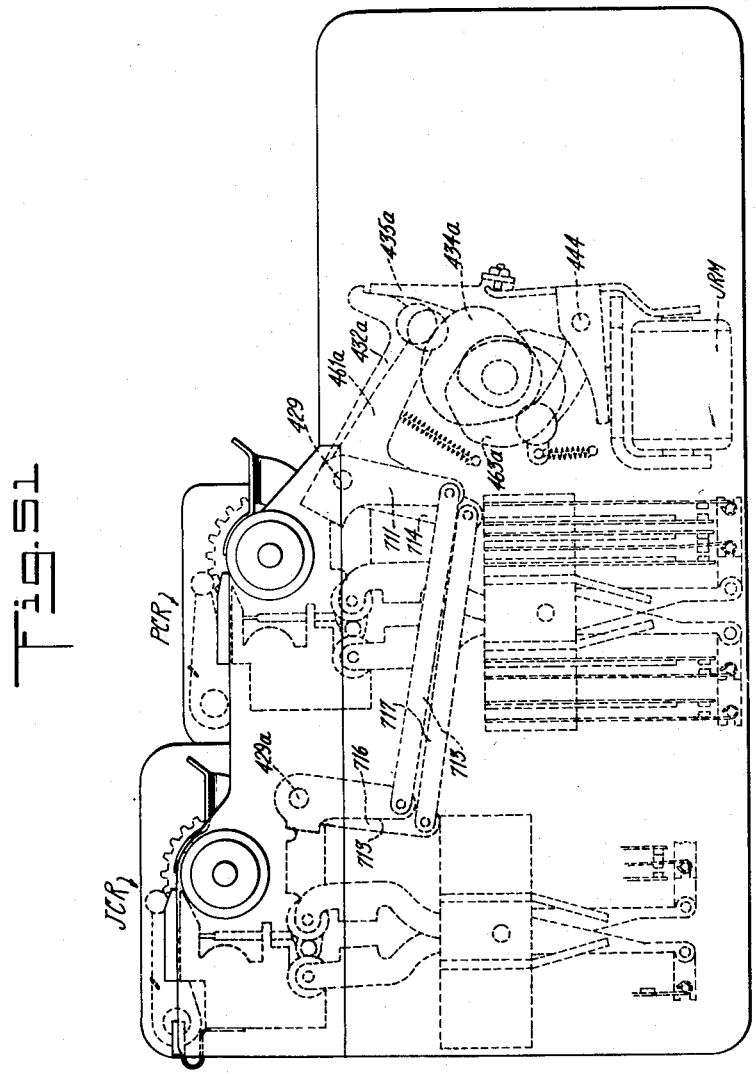

Jan. 25, 1955  E. O. BLODGETT  2,700,447
JUSTIFYING TYPEWRITER
Original Filed Oct. 13, 1950  52 Sheets-Sheet 35
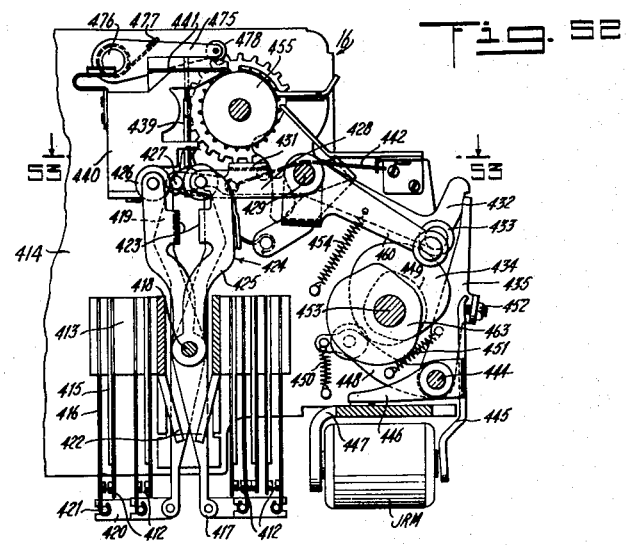
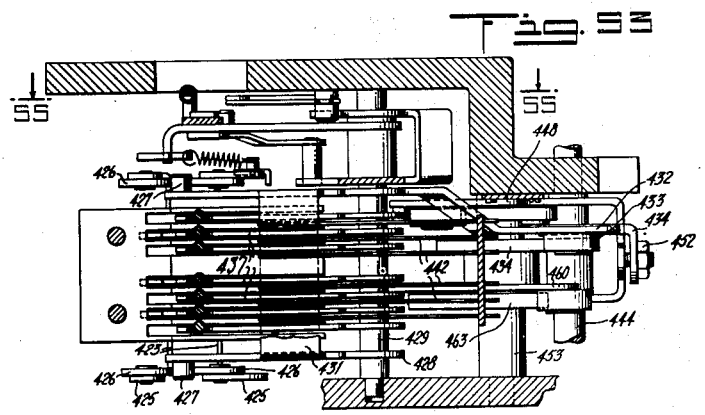
INVENTOR.
EDWIN O. BLODGETT
BY Robert S. Dunham
ATTORNEY

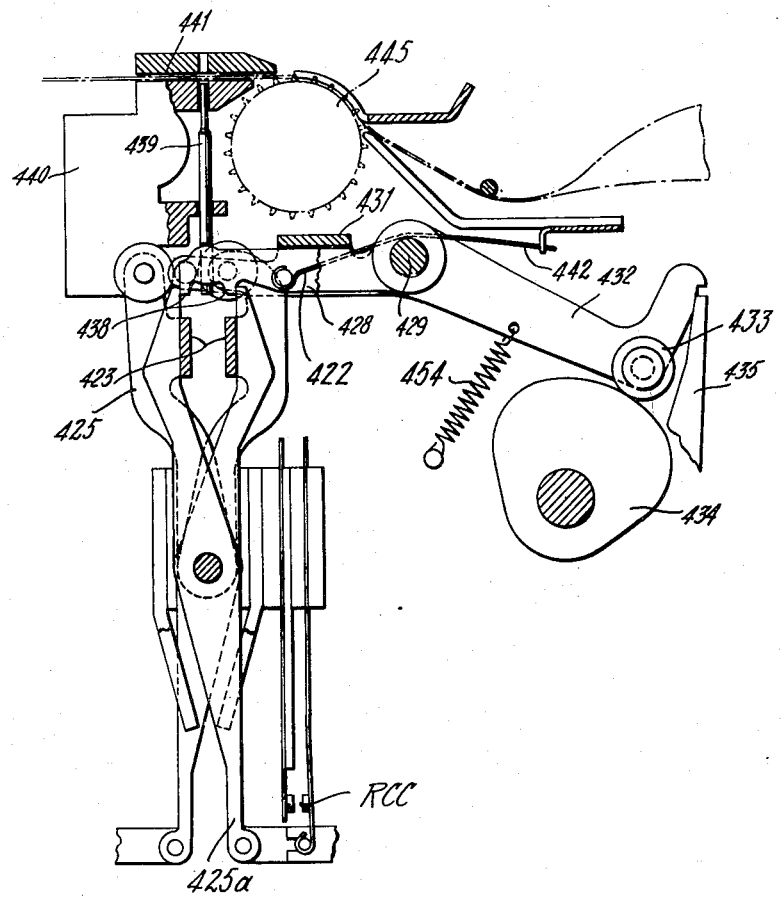

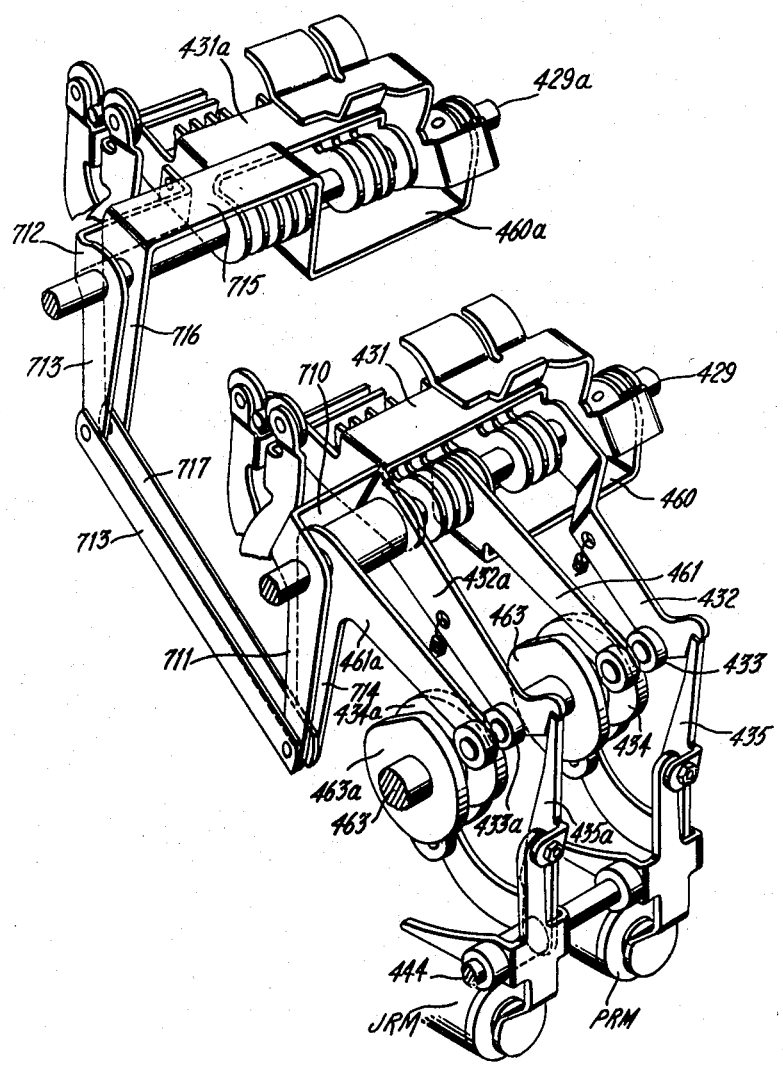

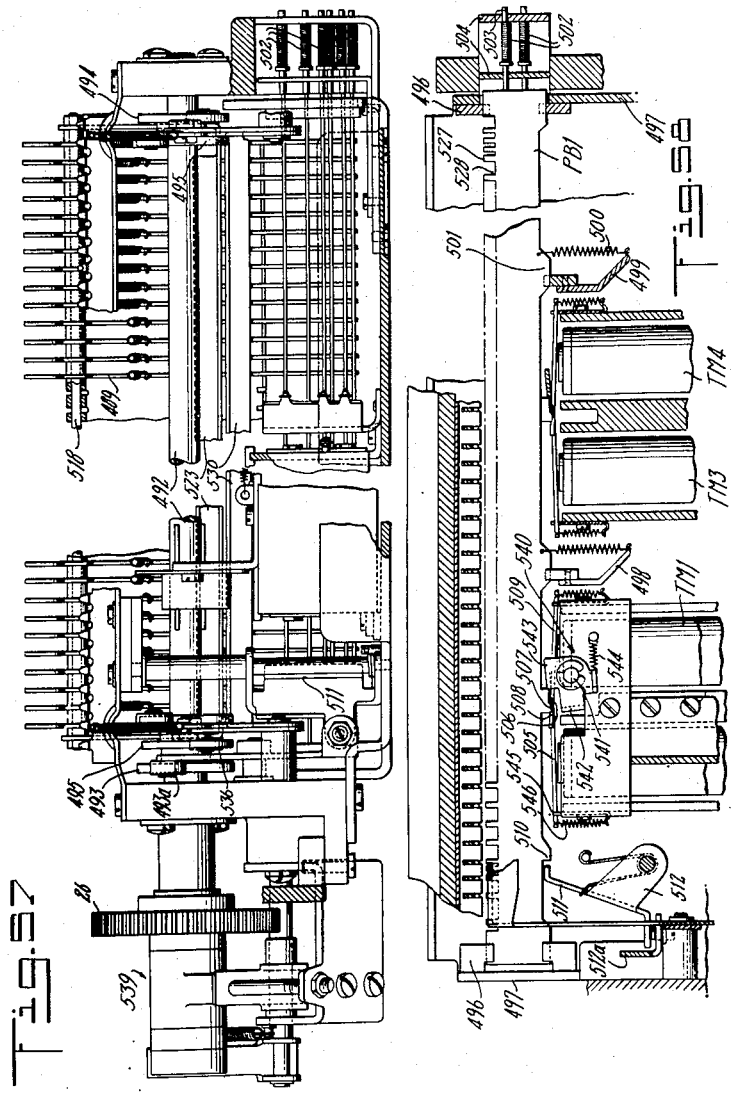

Jan. 25, 1955   E. O. BLODGETT   2,700,447
JUSTIFYING TYPEWRITER
Original Filed Oct. 13, 1950   52 Sheets-Sheet 40
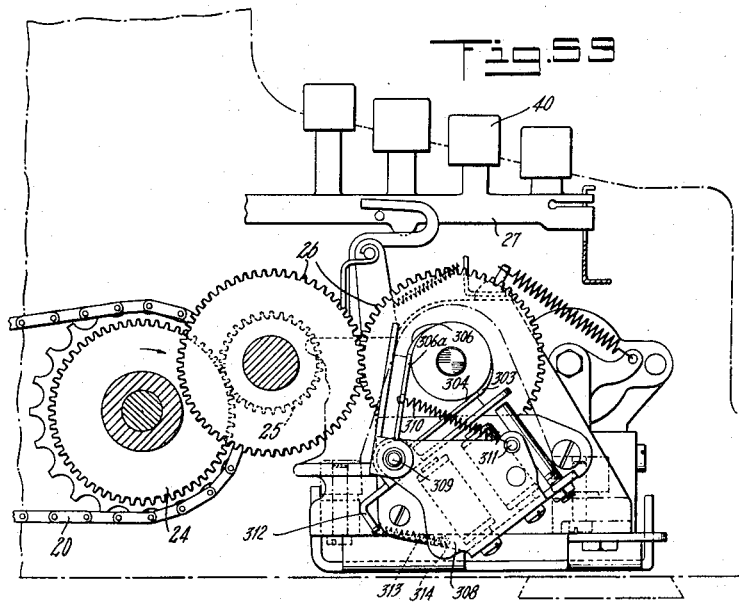
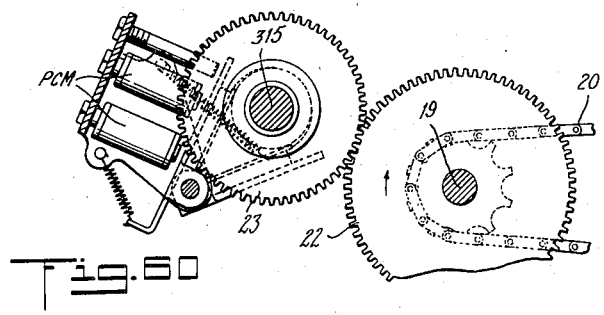
INVENTOR.
EDWIN O. BLODGETT
BY Robert S. Dunham
ATTORNEY Jan. 25, 1955  E. O. BLODGETT  2,700,447
JUSTIFYING TYPEWRITER
Original Filed Oct. 13, 1950  52 Sheets-Sheet 41
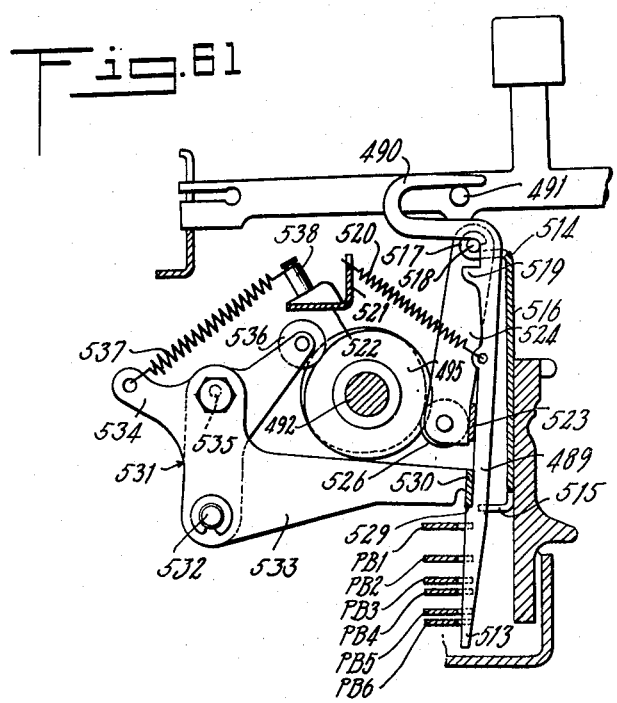
INVENTOR.
EDWIN O. BLODGETT
BY Robert S. Dunham
ATTORNEY

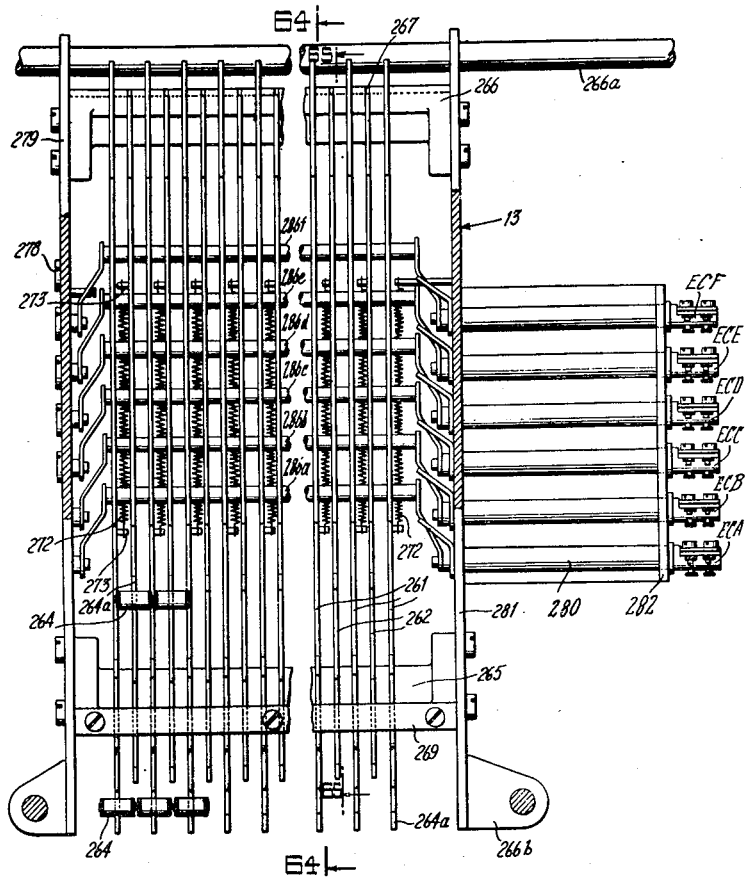

Jan. 25, 1955 E. O. BLODGETT 2,700,447
JUSTIFYING TYPEWRITER
Original Filed Oct. 13, 1950 52 Sheets-Sheet 43
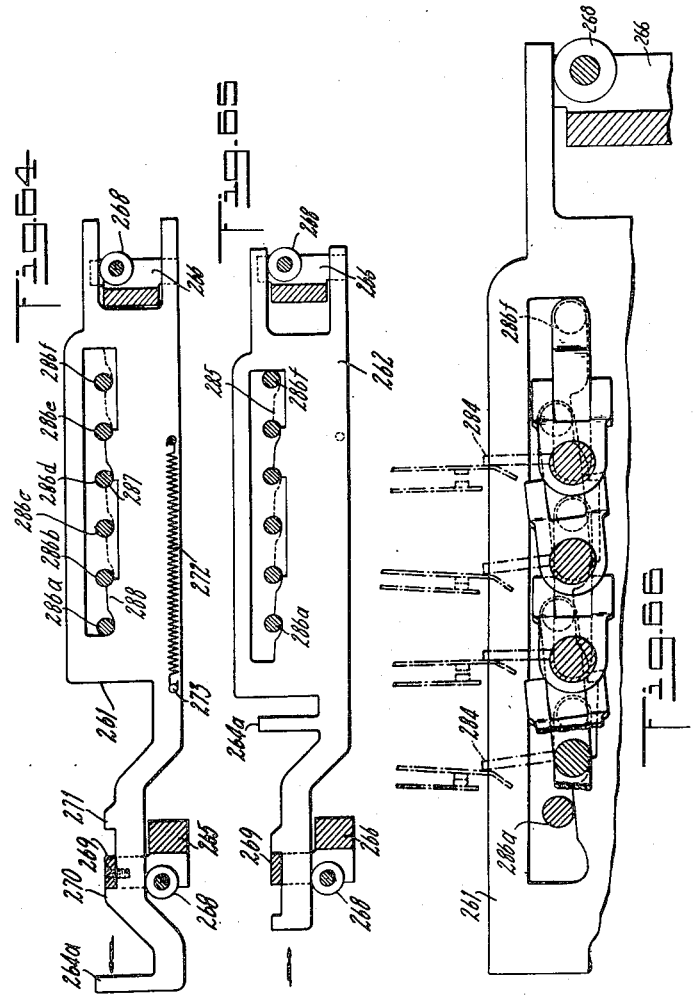
INVENTOR.
EDWIN O. BLODGETT
BY Robert S. Dunham
ATTORNEY Jan. 25, 1955     E. O. BLODGETT     2,700,447
JUSTIFYING TYPEWRITER
Original Filed Oct. 13, 1950     52 Sheets-Sheet 44
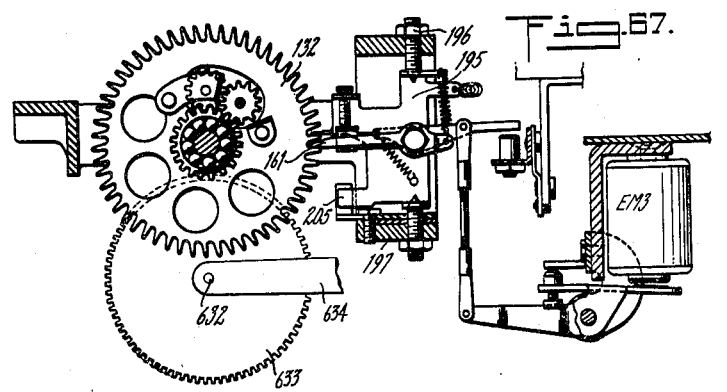
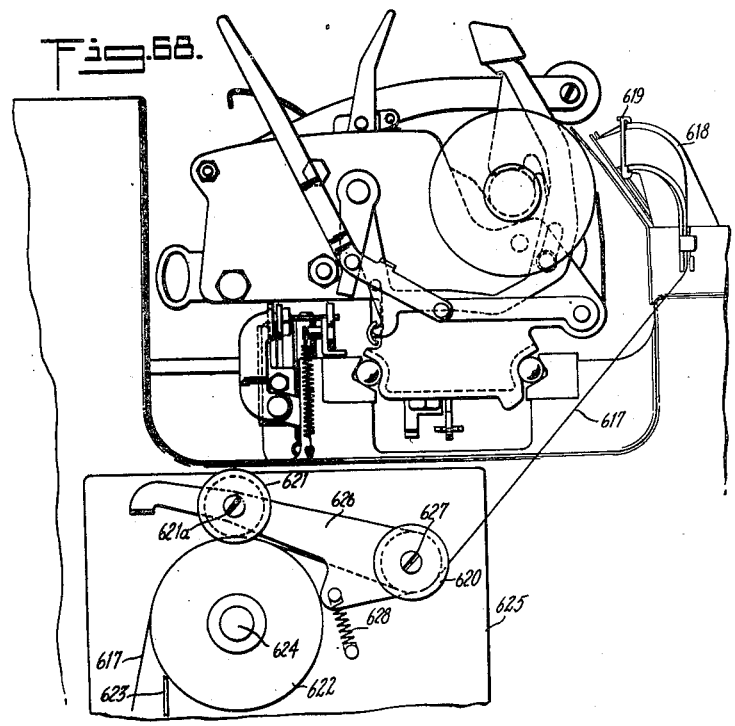
INVENTOR.
EDWIN O. BLODGETT
BY Robert S. Dunham
ATTORNEY

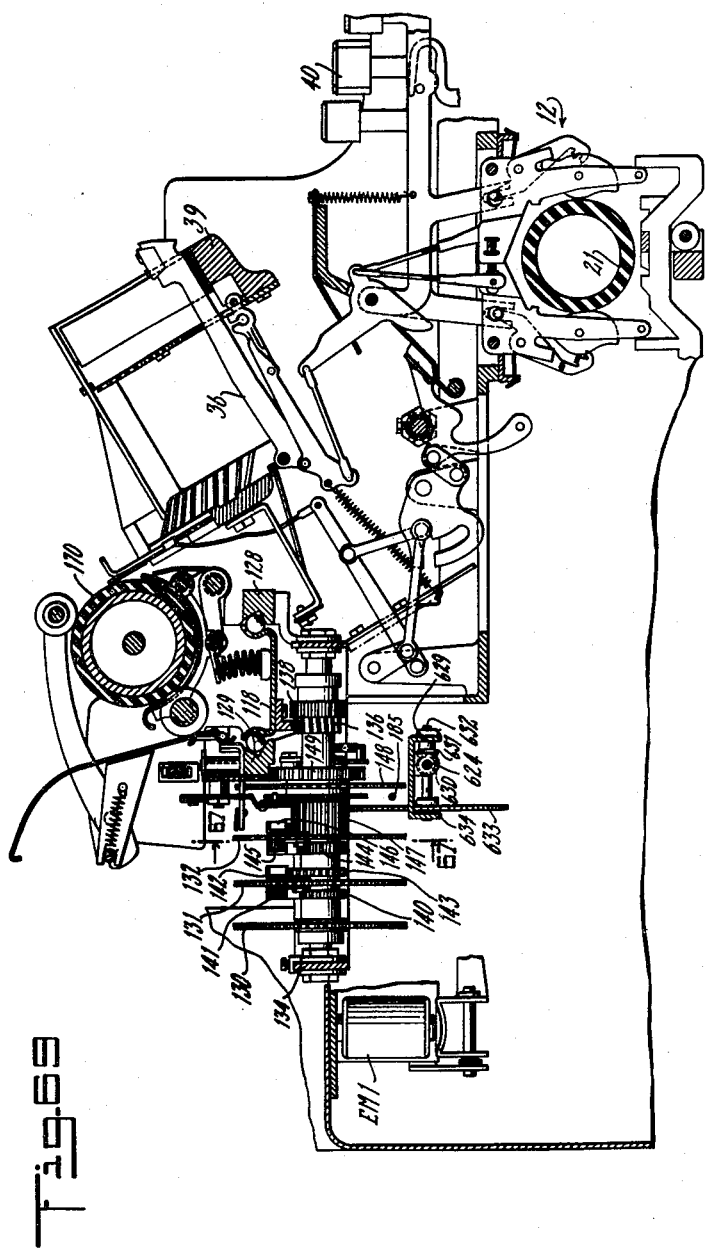

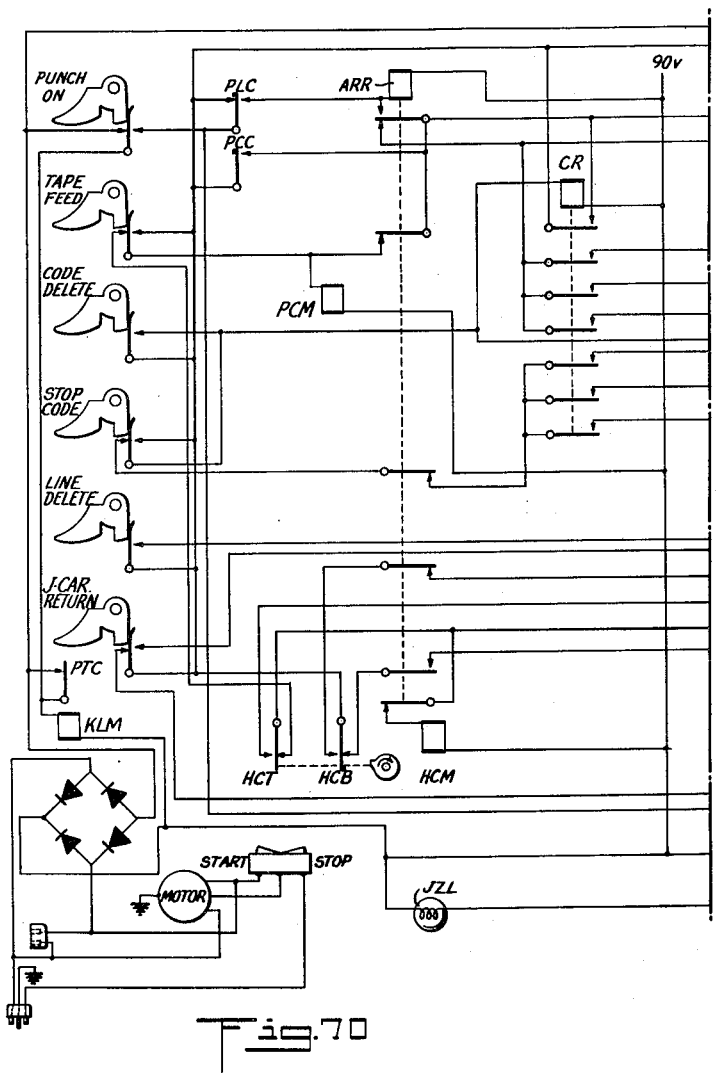

Jan. 25, 1955  E. O. BLODGETT  2,700,447
JUSTIFYING TYPEWRITER

Original Filed Oct. 13, 1950  52 Sheets-Sheet 47

*INVENTOR.*
EDWIN O. BLODGETT
BY *Robert S. Dunham*
ATTORNEY

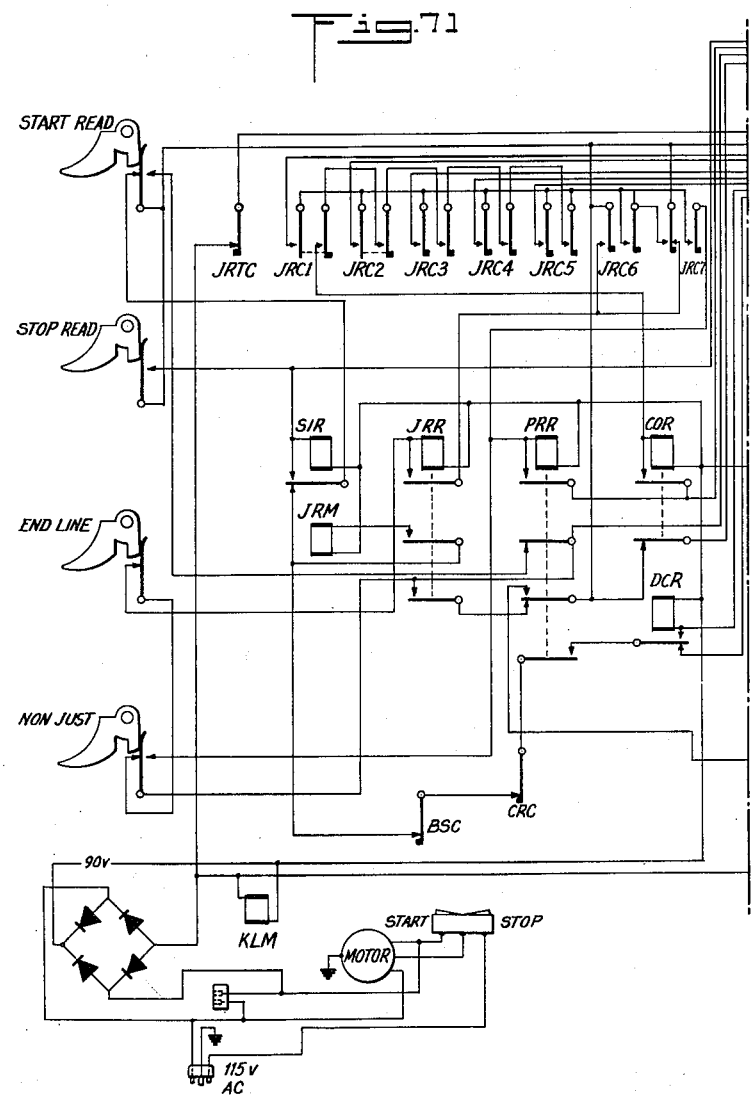

Fig. 72

| 7612 345 | | 7612 345 | | 7612 345 | |
|---|---|---|---|---|---|
| | A | | N | | & 2 |
| | B | | O | | / 3 |
| | C | | P | | $ 4 |
| | D | | Q | | % 5 |
| | E | | R | | ? 6 |
| | F | | S | | ! 7 |
| | G | | T | | * 8 |
| | H | | U | | ( 9 |
| | I | | V | | ) 0 |
| | J | | W | | , |
| | K | | X | | . |
| | L | | Y | | — - |
| | M | | Z | | : ; |
| | LOWER CASE | | LINE SPACE | | CODE DELETE |
| | UPPER CASE | | BACK SPACE | | STOP CODE |
| | | | SPACE BAR | | |

Fig. 72a

| 7612 345 | |
|---|---|
| | ½ 1 |
| | ¼ ¾ |
| | ( ) |
| | THREE UNITS |
| | ONE UNIT |
| | LINE DELETE |

Jan. 25, 1955  E. O. BLODGETT  2,700,447
JUSTIFYING TYPEWRITER
Original Filed Oct. 13, 1950  52 Sheets-Sheet 52
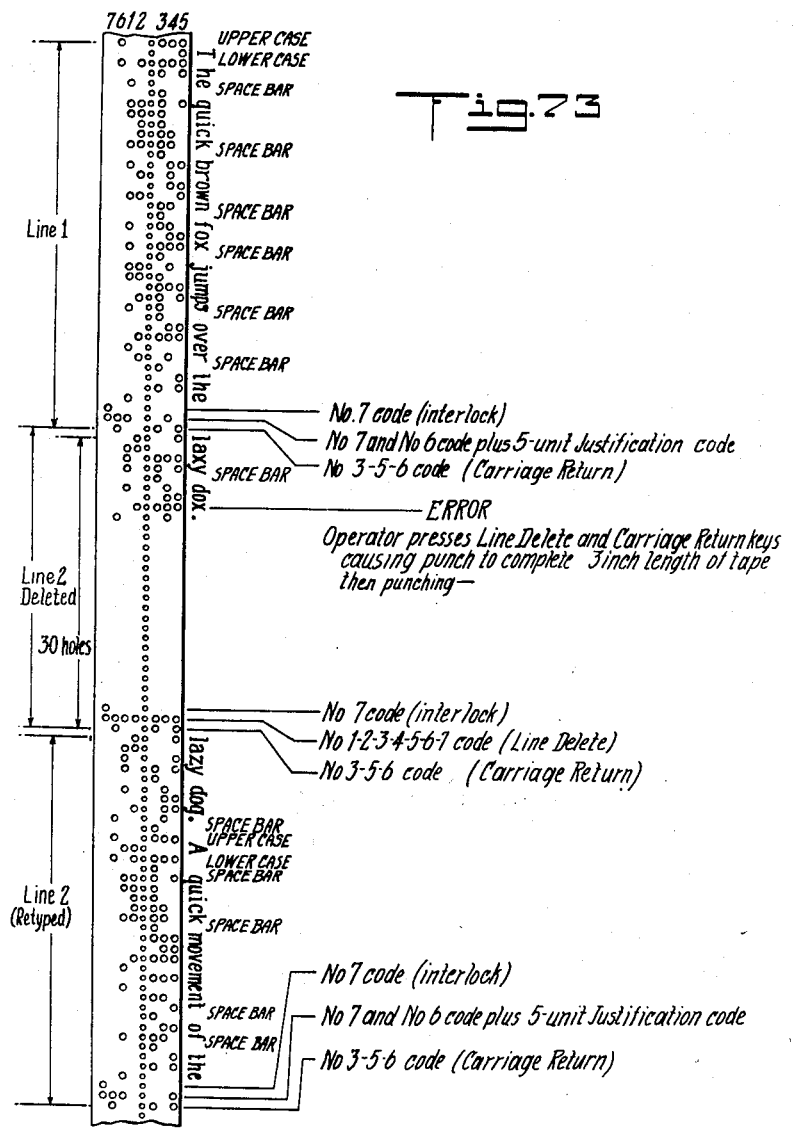
INVENTOR.
EDWIN O. BLODGETT
BY Robert S. Dunham
ATTORNEY

United States Patent Office 2,700,447
Patented Jan. 25, 1955

2,700,447

JUSTIFYING TYPEWRITER

Edwin O. Blodgett, Rochester, N. Y., assignor to Commercial Controls Corporation, Rochester, N. Y., a corporation of Delaware Original application October 13, 1950, Serial No. 189,979. Divided and this application March 21, 1952, Serial No. 277,747

26 Claims. (Cl. 197—20)

This invention relates to a tape controlled writing machine. More particularly, it relates to mechanism in which a control tape may be coded by perforating and in which such control tape may then be used for the automatic reproduction of justified copy. This application is a division of my application Serial No. 189,979, filed October 13, 1950.

It is the principal object of the invention to provide a mechanism for the composition of justified lines wherein the spacing between words is either increased or decreased to achieve complete justification. To this end it is the purpose of the invention that a justification control code be punched in a control tape which is the quotient of the unit shortage in a line divided by the number of word spaces in the line.

It is a further object of the invention to provide in a writing machine of the kind described a control code computing mechanism which automatically determines the proper number of units of word spaces to be inserted between words in the first part of the justified line and also automatically determines the point, if any, where such word spacing value is reduced to the next lesser number of units, whereby complete justification of a line may be secured.

It is a purpose of this invention to provide a machine for the composition of justified lines wherein either a line delete signal or a justification control signal is recorded at the end of the line of character codes and wherein such recording is used to reproduce each line in justified form or to omit the line according to the control signal recorded at the end of the line.

It is a specific object of the invention to provide a control tape reader which has an interlock arrangement positively avoiding the reading of a character line prior to the reading of its justification control code. In this connection it is a feature of the invention to provide a reader interlock which permits the reading of lines of different lengths without manual adjustment of the tape in the reader mechanism. Furthermore, in this regard it is an object of the invention to provide a control tape reader having two reading stations which are driven from the same power shaft.

It is a further object of the invention to provide in a reproducer under coded tape control a tape reader having two reading stations and wherein the justification section of the control tape is always read automatically before the line printing section of the code is read, regardless of difference in the number of codes in different lines.

It is a further object of the invention to provide a line justification system having a line delete control wherein a code read by one section of the tape reader in place of the justification control code will cause the reader to skip the entire preceding line of character codes and thereby prevent operation of the justifying reproducer insofar as such delete line is concerned.

To this end that the general objectives of the invention may be attained, the mechanism herein comprises a power operated writing machine having code selecting means operative upon depression of a key lever to select a code representative of the character controlled by such lever, together with a tape punch controlled by the key control selector for producing in a tape combinational code perforations. The tape preparing mechanism is provided with means for computing the amount of unit spacing between words necessary to produce justified lines and is adapted to cause the punching of a justification code in the tape at the end of each justifiable line of character perforations. The mechanism with which this divisional application is mainly concerned includes means for sensing a tape perforated as stated and for translating such perforations to the end that power operated type action may be under the control of the perforated tape for transcribing the coded substance into justified printed form.

Specific objects, features and advantages of the invention will become clear as the description of the machine is read in light of the drawings in which:

Fig. 1 is an exterior perspective view of a trial copy recorder for preparing a perforated control tape;

Fig. 1a is an exterior perspective view of a justified copy reproducer adapted to be controlled by the perforated control tape produced in the recorder;

Fig. 2 is a horizontal sectional view through the trial copy recorder at a point just above the keyboard;

Fig. 3 is a vertical sectional view through the keyboard, the power roll, the type basket and part of the code selecting mechanism of the trial copy recorder;

Fig. 4 is a detailed view of toggle mechanism used in the recorder and the reproducer for shifting the type basket to lower case position;

Fig. 5 is a view similar to Fig. 4 and shows the toggle linkage in the released position assumed when the type basket is in upper case position;

Fig. 6 is a detail view of the toggle mechanism for shifting the type basket to upper case position;

Fig. 7 is a view similar to Fig. 6 but shows the toggle linkage in the released position which it assumes when the type basket is shifted to lower case position;

Fig. 11 is a detail view of platen indexing mechanism of the recorder and the reproducer;

Fig. 12 is a view taken on line 12—12 of Fig. 11;

Fig. 13 is an end elevational view of the carriage used in both the recorder and in the reproducer;

Fig. 14 is a plan view of the carriage escapement mechanism used in both the recorder and in the reproducer;

Fig. 15 is a vertical sectional view through the power roll, the type basket, the carriage and the escapement mechanism;

Fig. 19 is a rear elevation of tabulating and carriage release mechanism applicable to both the recorder and to the reproducer;

Fig. 20 is a rear elevation of a part of the carriage release and tabulating mechanism, certain parts having been removed to show underlying structure;

Fig. 21 is a sectional view on line 21—21 of Fig. 19;

Fig. 22 illustrates a carriage return control clutch and its associated operating mechanism;

Fig. 23 is a rear plan view of the tabulating mechanism showing the parts in one position of operation;

Fig. 24 is a rear plan view of the tabulating mechanism shown in Fig. 23 but showing the parts thereof in a different position of operation;

Fig. 25 is a vertical section transversely of a platen carriage and includes portions of the keyboard and power mechanism, including a tabulation key and its associated linkage, this mechanism being applicable to both the recorder and reproducer;

Fig. 26 shows a tabulating release lever latch and its associated operating linkage;

Fig. 27 is a plan view of the tabulating mechanism shown in Fig. 23;

Fig. 28 is a plan view of the tabulating mechanism shown in Fig. 24;

Fig. 29 is a top plan view of a code selector mechanism and associated code selecting contacts forming part of the trial copy recorder;

Fig. 30 is a longitudinal sectional view through the code selector mechanism of Fig. 29 showing one of the selector slides;

Fig. 31 is a view similar to that of Fig. 30 showing, however, a different selector slide;

Fig. 32 is an enlarged fragmentary sectional view through the selector mechanism and indicates its relation to code selecting contacts;

Fig. 33 is an axial sectional view through an electromagnetic clutch, used in connection with the tape punch of the trial copy recorder, the same clutch structure also being employed in connection with the translating unit of the justified copy reproducer;

Fig. 34 is a transverse vertical section on line 34—34 of Fig. 33;

Fig. 35 is a longitudinal view in elevation through a tape punch forming part of the trial copy recorder, some portions being shown in section;

Fig. 36 is a top plan view of the tape punch shown in Fig. 35;

Fig. 37 is a detail view of the punch control mechanism;

Fig. 38 is a detail view of the tape feeding mechanism constituting part of the punch unit;

Fig. 39 is a detail view of certain of the punch mechanism;

Fig. 41 is a top plan view of the rear portion of the trial copy recorder with a portion of the cover plate broken away to show the justification code computer and the tape hole counter;

Fig. 42 is a plan view of a justification code computing bar located in the trial copy recorder, and a justification zone indicating cam;

Fig. 43 is an end elevational view of a justification computer forming part of the trial copy recorder on line 43—43 of Fig. 41;

Fig. 44 is a perspective view of the right hand end portion of the justification computer;

Fig. 45 is a sectional view through the justification computing mechanism on line 45—45 of Fig. 41;

Fig. 46 is a sectional view through the justification computing mechanism on line 46—46 of Fig. 41;

Fig. 47 is a sectional view on line 47—47 of Fig. 41 and corresponds generally to Fig. 46 but shows the seeker bail in its elevated position;

Fig. 48 is a view generally similar to Fig. 45 but shows the seekers released for a contact with the code bar;

Figs. 49 and 49a are keyboard layout diagrams of the trial copy recorder and the justified copy reproducer, respectively;

Fig. 50 is a diagram showing the manner in which line justification is computed;

Fig. 51 is an elevational view of a double tape reader forming a part of the justified copy reproducer;

Fig. 52 is an elevational view of one of the tape reading stations of Fig. 51;

Fig. 53 is a plan view of the tape reading station shown in Fig. 52 and taken on line 53—53 of Fig. 52;

Fig. 54 is a detail view of the control mechanism for the tape reading pins of one of the tape readers;

Fig. 56 is a perspective view of the operating connections for the two tape reading stations;

Fig. 57 is a front elevational view along the axis of a code translator forming a part of the justified copy reproducer;

Fig. 58 is a plan view of the mechanism shown in Fig. 57, portions being shown in section;

Fig. 59 is an end elevational view of the code translating unit of the justified copy reproducer;

Fig. 60 is an elevational view of the punch drive and its magnetic clutch control;

Fig. 61 is a transverse sectional view through the code translator of the justified copy reproducer;

Fig. 62 is a detail view showing code bar restoring mechanism of the code translator forming a part of the justified copy reproducer;

Fig. 63 is a plan view of a letter space control selector of the justified copy reproducer;

Fig. 64 is one of the selector slides of Fig. 63;

Fig. 65 is another selector slide of Fig. 63;

Fig. 66 shows the letter space selector control in its relation to letter space selecting contacts;

Fig. 67 is a sectional view on line 67—67 of Fig. 69 showing the carbon ribbon drive gear;

Fig. 68 is an end elevational view of the justified copy reproducer in the region of the carriage showing carbon ribbon mechanism;

Fig. 69 is a transverse sectional view of the justified copy reproducer showing the escapement mechanism and the carbon ribbon drive gear;

Figure 70A:
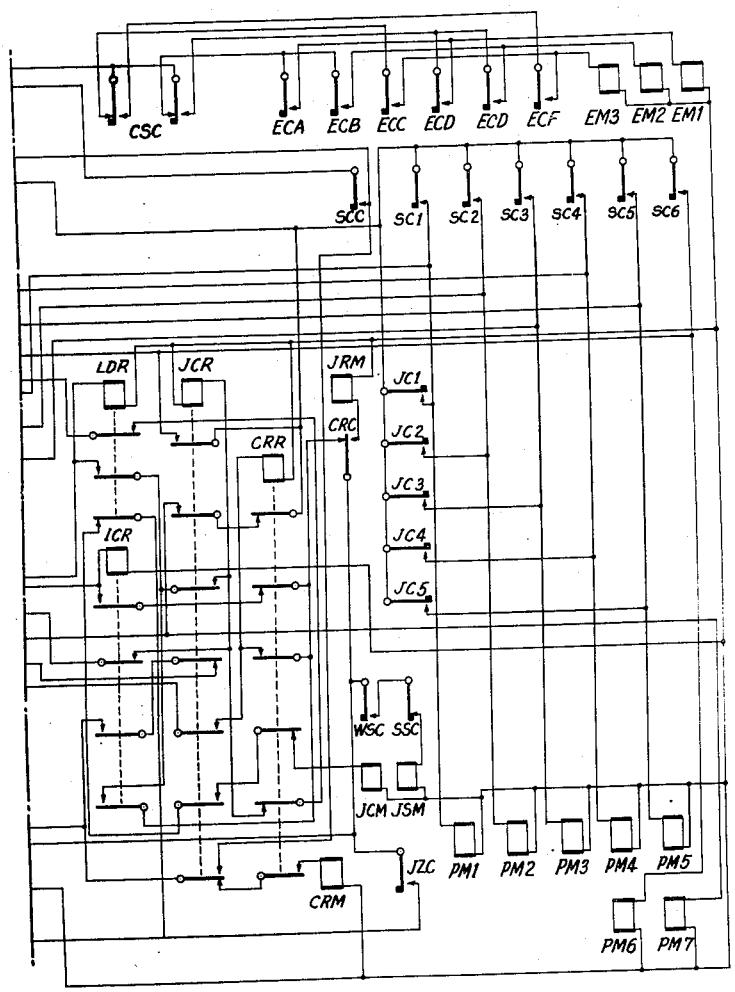
Figure 71A:
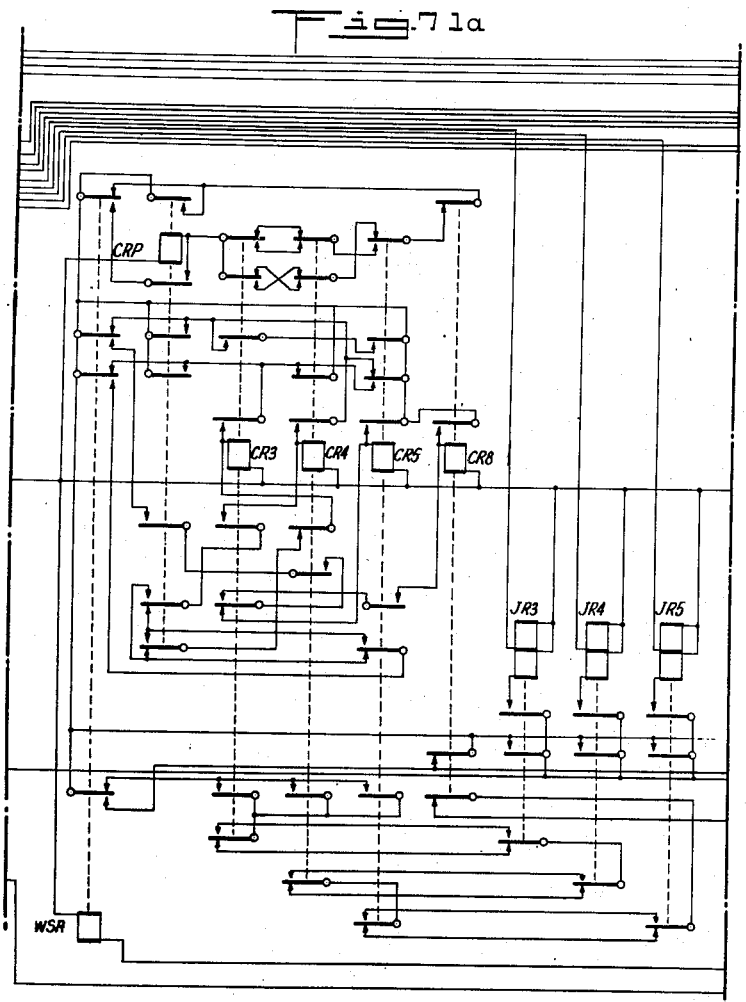
Figure 71B:
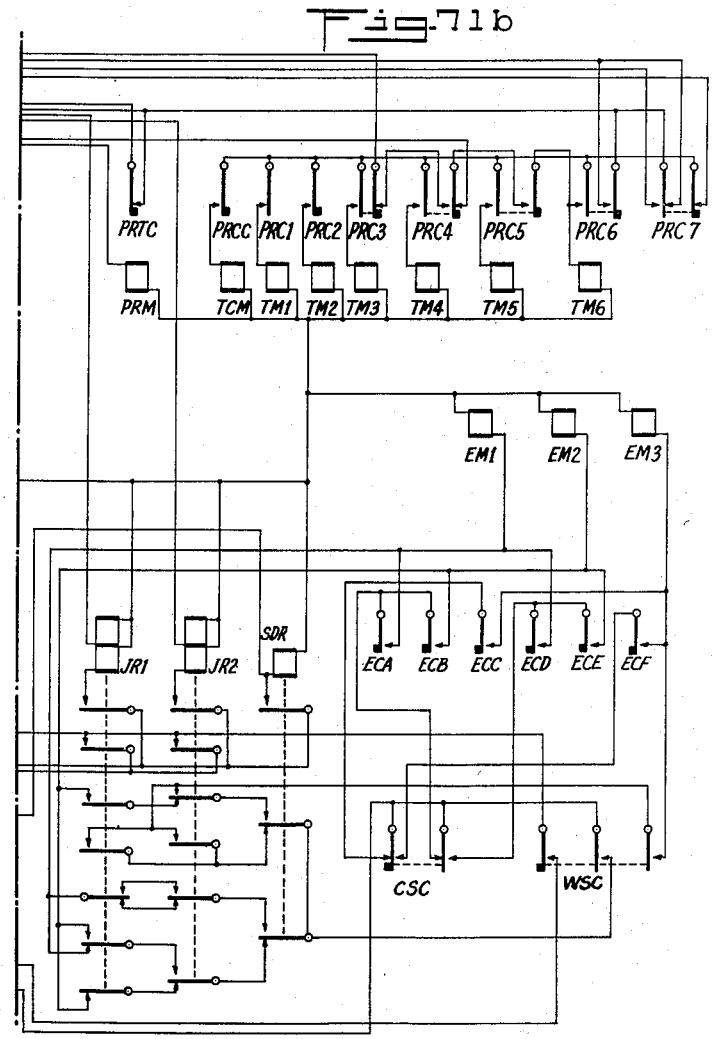

Figs. 70 and 70a together constitute the electrical control system for the trial copy recording unit;

Figs. 71a and 71b together constitute the electrical control system for the justified copy reproducing unit;

Figs. 72 and 72a show sections of the control tape prepared in the trial copy recorder for use in the justified copy reproducer; and Fig. 73 is an exemplary section of control tape showing various control codes and character codes as produced in the trial copy machine.

In order to render a detailed description of the mechanism herein easier of understanding it is perhaps appropriate to first describe generally the structure and function of the mechanism.

*General*

The writing mechanism herein involves two machines, a trial copy recorder and a justified copy reproducer. The trial copy recorder is operated manually to print a trial copy in order to determine the normal length of lines. During this trial printing, a tape is punched, and, at the trailing end of each line, a justifying code is also punched in the tape which enables that line to be expanded or contracted to the desired length upon retyping. This retyping is done automatically on the justified copy reproducer, and the justifying information in the tape automatically conditions apparatus to alter the extent of spacing between words as required for justification on each line.

Word spacing in both the recorder and in the reproducer is effected by differential wheel escapement mechanism that is used for proportional letter spacing. The normal extent of word spacing in making the trial copy is two units, and in justifying the extent of word spacing may be one, two, three, four or five units as required.

The expansion or contraction of lines is accomplished by selecting a unit value of word spacing which will be as uniform as possible throughout the line. However, inasmuch as the word spacing is not infinitely variable but must be in multiples of one unit spacing, it is impossible in every instance to make the word spacing exactly the same throughout a justified line as this would sometimes require spacing in fractional parts of a unit. Also, the number of word spaces in which justification is accomplished is limited to eight, so that in any unusually long lines having more than eight word spaces, the extent of spacing is always the normal two units after the eighth word space.

For example, if it is necessary for justification to expand the length of a line 21 units and the line has 12 word spaces, the first five word spaces will be five units each, the next three will be four units each and the last four will be two units each. All this is accomplished automatically by apparatus in the trial copy recorder which selects a particular justification control code to be punched in the tape, and later the apparatus in the justified copy reproducer is conditioned by this control code to automatically select the proper number of units of word spacing in the first part of the line and the point, if any, where this word spacing value changes to the next lesser number of units.

The trial copy recorder and justified copy reproducer are each assembled around a four-sided base 10 which supports a power frame assembly 12. In the case of the recorder (Fig. 1), there is provided a code selector 13, a tape punch 15, and a justification code computer (Figs. 42 through 48). In the case of the reproducer (Fig. 1a) there is provided a power frame assembly 12, a double tape reader 16 and a code translator 14. In each machine an electric motor 17 is adapted to drive a power shaft 19. Gears 22 and 23 furnish power to the tape punch 15 of the recorder. A chain 20 transmits power to a power roller 21 from which the type action is operated. In the case of the reproducer a gear 24 on the end of the power roll shaft transmits rotary motion through a gear 25 from which the tape reader 16 is driven. Gears 26 supply power to the code translating unit 14 of the reproducer.

A die-cast power frame 39 is mounted within the base casting of each unit. Assembled on the power frame of both the recorder and reproducer are the key levers 27 and the power operated type actions comprising levers 34, 35, 45 and 46. Each key lever 27 is operable to control an associated power cam 31 with a minimum of effort. A normally energized magnetic lock 28 is provided for the keyboard in each machine to prevent effective operation of the keys when the power is off or when the keys should not be operated for any other reason.

Each key lever 27 controls a cam assembly 12 coacting with a continually running power roll 21. Each cam 31 furnishes the power for operating the type bar 36 through a bell crank arrangement consisting of levers 34, 35 and toggles 45—46. The cam in the case of the recorder also operates a slide of a code selector mechanism 13 when required. The extent of movement imparted to each type bar 36 by its associated cam 31 is variable by a turnbuckle adjusting arrangement 43 so that exactly the right printing impression may be obtained for each character.

In both the recorder and reproducer there is provided a selection between upper and lower case printing by shifting the type basket 52 as shown in Figs. 4 through 7 of the drawings. A key lever 67 and its associated cam are provided for shifting the basket to upper case position, and a separate key lever 73 and its associated cam are provided for shifting the basket to the lower case position. This provides positive fast automatic operation of the case shifting mechanism by the code translator of the reproducer as will be more specifically pointed out hereinafter. Two oppositely arranged toggle mechanisms consisting of levers 56, 58, 59 and 69 (Figs. 4 and 6) adjustably hold the basket in its two shifted positions, and the power from each of the shifting cams is applied to move the basket by breaking its associated toggle. This results in an easy, accelerated motion of the basket, which greatly reduces power roll wear and makes the shift operation so fast that in automatic operation the tape reader of the reproducer does not need to be delayed during case shifting movement.

All letter spacing movements of the carriage in both the recorder and in the reproducer are controlled by letter spacing mechanism shown in Fig. 14 of the drawings. This includes a rotary ratchet wheel 136 which is operated by the segment universal bar 138. For producing proportional letter spacing, three differentially connected escapement wheels 130, 131 and 132 are used in combinations to provide from one to six units of space. The selection of the proper combination of operations of the three wheels is made for each character by three magnets EM1, EM2 and EM3 under control of the code selector 13 insofar as the recorder is concerned and under control of a letter space selector 13a insofar as the reproducer is concerned. Three contacts ECA, ECB and ECC on the selectors control the lower case spacing, and three other contacts ECD, ECE and ECF control the upper case letter spacing. Case shift contacts CSC (Fig. 4) operated by the type basket select which of the two groups of three contacts are effective to control the three magnets.

A carriage return control clutch (Fig. 22) operated by a toggle mechanism consisting of levers 201, 202, 210 and 211 returns the carriage and line spaces the platen. The toggle linkage for operating the clutch is straightened by a carriage return cam which is controlled by a key lever. At the end of the carriage return movement, a carriage margin stop engages and moves a stop lever 189 on the frame (Fig. 19) to trip a second cam which furnishes the power for disengaging the clutch by breaking the toggle.

The code selector unit 13 of the recorder comprises a rectangular frame (Fig. 19) which carries coded slides 261 and 262 which are operated by downward extensions 264 of the cam units 12. There is one slide for each of the cam units, the slides 261 for the front row of cams moving forwardly and the slides 262 for the rear row of cams moving rearwardly. The forwardly moving slides 261 are interspaced with the rearwardly moving slides 262, and a single return spring 272 between adjacent pairs of slides normally holds the slides against a common stop bar 269. Provision is made for pivotally mounting thirteen bails 274 transversely across the slides, there being seven bails in a lower row and six bails in an upper row (Figs. 30, 31 and 32). Each slide 261—262 may be provided with a cam portion 285 for operating each of the thirteen bails, but certain of these cam portions are removed in dotted lines in Fig. 30 so that only the bails involved in the code for each particular slide are operated by the moving of that slide; thus, all slides 261—262 are different, because of the removal of different combinations of the cam portions 285.

The bails 274 are connected to companion contact operating shafts 280 which carry actuators for operating associated contacts SC1 through SC6 and SCC mounted on a casting 282 (Fig. 29). Six of the lower row of bails SB1 through SB6 and their associated contacts SC1 through SC6 select a six unit code and control the punching of the selected code in a tape. The seventh bail SBC controls the contact SCC which is common to the code selecting contacts. The upper row of six bails 286a through 286f operate contacts ECA through ECF for selecting the unit spacing of the carriage for securing proportional letter spacing, as noted before. The bails 286a, 286b and 286c control the contacts for lower case printing while bails 286d, 286e and 286f control the contacts for upper case printing.

The rear portion of the code selector assembly 13 is pivotally mounted on a cross shaft 266a carried by the main frame 10, and the front end is held to the main frame by screws extending through lugs 266b. This permits the selector unit to swing away from the power roll about the shaft 266a, and, in doing so, the contacts mounted on the frame 282 are not disturbed. The selector unit 13 may be completely removed from the machine by removing the pivot shaft 266a.

Figure 2A:
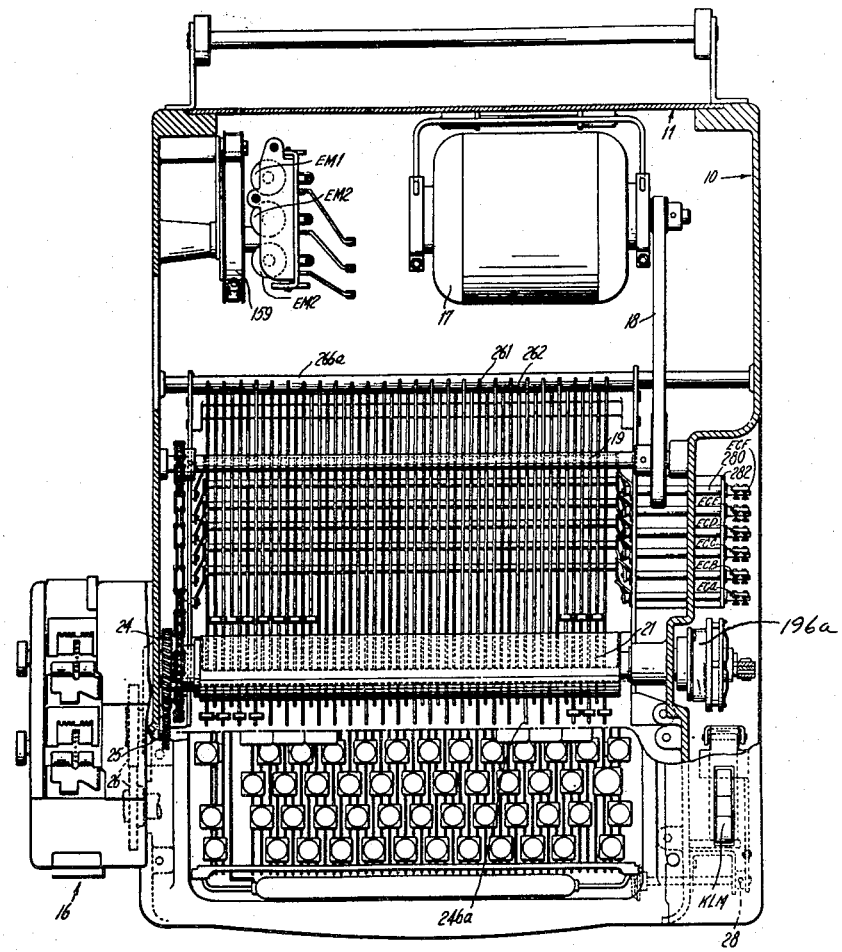
Fig. 2a is a horizontal sectional view through the justified copy reproducer at a point just above the keyboard.

The tape punch 15, which is part of the recorder, is driven from the power shaft 19, through gears 22 and 23 (see Figs. 36 and 60), and is removably mounted at the left hand rear portion of the main frame 10. A normally stationary rotary shaft 315 (Fig. 35) makes one revolution under control of a magnetically operated clutch for each punch cycle (Figs. 33 and 34). The tape to be punched is obtained from a supply spool 316 (see Fig. 2) removably mounted at the rear of the machine, the tape passes over the top of the punch unit, and the holes are punched upwardly at the front of the unit for convenient manipulation and observation of the tape by the operator. The tape is fed for spacing of the holes by a pin wheel 331 during each punch cycle, but the pin wheel may be manually turned to move the tape in either direction. The tape may be easily inserted edgewise into the punch block 319 (Fig. 37).

The selector contacts SC1 through SC6 and SCC determine the code holes to be punched in the tape by energizing the associated ones of six code magnets PM1 through PM6, which, by attracting their armatures 351 release associated punch lever latches 342 (Fig. 37). The punch clutch magnet is jointly controlled by a contact operated by the release of any one or more of these latches, and by the common selector contact SCC. During the initial rotation of the punch shaft 315, the latches which were released are locked in their released position and the ones which were not released are locked in their normal position by means of a locking bail 360.

The punches CP1—CP7 (Fig. 37 and Fig. 36) are each operated upwardly through the paper tape by an associated punch lever 322 pivotally mounted between its ends on a shaft 323. The shaft 323 is positively raised and lowered during the punch cycle by identical cams 335 and 336 at each end of the shaft 323. The front end of each punch lever 322 is connected to its punch CP, and the rear end of each lever coacts with an associated latch 353. When the latch 353 is released, due to energization of its code magnet PM, the rear end of the punch lever is restrained from moving upwardly so that upward movement of the operating shaft 323 forces the punch through the paper. However, when a latch is not released because its code magnet PM was not energized, the rear end of the punch lever 322 is free to move upwardly, thereby allowing the front end of the lever and its punch to remain stationary while the operating shaft 323 moves upwardly. The cams 335 and 336 are arranged to quickly and positively withdraw the punches from the paper after a punching operation, and, during this part of the cycle, the latches 342 are mechanically restored to their normal position and the armatures are forcibly moved away from their code magnets. At the end of the punching cycle, a feed pawl 367 operated by a cam 363 (Fig. 38) operates a ratchet wheel 372 on the pin wheel shaft to feed the tape one space.

As a line is being written in the recording unit, a justification computing mechanism (Figs. 42 through 48) counts the word spaces and when the length of a line being written and coded into the control tape has reached a justifiable length a signal is given which indicates that the line may be justified. Depression of the J carriage return key automatically results in the final computation of the number of unit spaces required between each of the word spaces to achieve justification. This information is automatically punched into the tape as a justification control code.

The tape reader 16 which is part of the reproducer is mounted at the left hand side of the main frame 10. The tape reader includes two reading stations which are operated from a single, continuously operating cam shaft 453 (Figs. 51–56) and its reading operation is controlled by a pair of magnets JRM and PRM (see Fig. 56), which, when energized, allow rollers 433 and 433a to follow the rise and fall of cams 434 and 434a, respectively, but when deenergized, hold the rollers 433 and 433a from following their cams. The cams and rollers control movement of code sensing pins 439 and 439a (Fig. 51) under the relatively light pressure of a spring associated with each reading pin.

The tape which has been prepared in the tape punch 15 is inserted edgewise into the reading throats 441 and 441a of the tape reader 16, and, during operation, the tape is fed by pin wheels 455 and 455a intermittently past the sensing pins 439 and 439a. The pin wheels 455 and 455a may also be turned manually to move the tape either forwardly or backwardly. The sensing pins of each reading station are each connected to a pivoted interposer 428–428a (Fig. 51). The pins 439 are connected to interposers 428 and the pins 439a (Fig. 51) are connected to interposers 428a. The cams 434 and 434a operate respectively on interposer bail arms 432 and 432a to control the movement of all of the associated interposers and, in turn, allow all of the pins to move against the tape when in movement an interposer bail is rocked out of contact with its associated interposer.

The pins 439 and 439a as previously mentioned are urged toward the tape by light springs so that the motion of a pin will be stopped by the tape, but this motion will continue, if there is a hole in the tape opposite the pin. As the interposers and the sensing pins move toward the tape, contact arms 417 and 417a are allowed by the interposer bails to move toward the interposers in a direction at right angles to the direction of movement of the interposers. These contact arms are operated by the force of their respective contact springs 416 and 416a, and if the motion of an interposer is stopped by its associated pin engaging the tape, the associated contact arm is in turn stopped by engaging its interposer. However, if a pin passes through a hole in the tape, the associated interposer moves out of the path of travel of its contact arm, allowing such contact to operate effectively.

The interposer bails 431 and 431a are then positively rocked by their cams to first restore all the contact levers and then move the interposers and pins away from the tape to normal position. As soon as the pins are withdrawn clear of the tape, spring operated feed pawls (Fig. 55) move ratchet wheel shafts to feed the tape one space. Feed cams positively return the feed pawls, and a latch associated with each pawl allows an effective feeding movement of its pawl only when the associated interposer bail operates. This prevents feeding of the tape when the previously mentioned control magnets JRM and PRM are deenergized.

The arrangement of the contact arms 417 and 417a, operating at right angles to the interposers 428 and 428a, allows a heavy contact load to be controlled by each pin and yet retain a light pressure of the pin against the tape. Thus, a group of any number and arrangement of contacts required may be controlled by each code hole group in the tape, and yet the tape may be run through the reader an indefinite number of times without damage by the pins.

The contacts of the tape reader 16 control the translating unit 14 of the reproducer in its selection of the key levers that are to be operated. The cam shaft 492 of the translating unit is driven from the gear wheels 26 and it is under the control of a one-revolution magnetic clutch 539. The unit is removably mounted beneath the keyboard of the writing machine. The clutch control magnet is energized by the common reader contact PRCC. The speed of the translator shaft 492 is the same as the speed of the reader shaft 456, and although the translator clutch 539 is a single revolution clutch, the energization of the clutch magnet by the reader is so timed that the translator shaft rotates continuously while the reader is operating continuously.

The translator operates the key levers by vertically disposed seekers 489 (Fig. 61), each seeker being operably connected to one of the key levers. The seekers are mounted for both a horizontal pivoted motion for selection and a vertical sliding motion for key lever operation.

The selection of the proper one of the seekers 489 is determined by six permutation bars PB1, PB2, PB3, PB4, PB5 and PB6 which are mounted for horizontal sliding motion transversely of all the seekers 439. Each permutation bar is differently notched (Fig. 57) opposite the seekers 489 so that for any combination of positions of the six bars PB1–PB6, only one seeker will be allowed to move forwardly into a position to be operated downwardly by a seeker operating bail 533 and in turn operate its key lever. Each permutation bar is operated by a spring 502 from its normal position upon energization of a corresponding magnet TM controlled by the reader contacts RC1–RC6.

In addition to the seeker operating bail, a cam operated seeker restoring bail 523 (Fig. 61) is provided for controlling the pivotal motion of all the seekers 489 into and out of cooperative relation with the permutation bars. Another cam 493 (Fig. 62) operates a permutation bar restoring bail 512. When the permutation bars are restored, the downwardly projecting lugs 501 rock armature knock-off bails 540 and force the armatures 509 away from the permutation bar magnets.

When a 7 and a 6 code hole along with a five-unit justification code (or various combination of the 1 through 5 holes) are read in the reading station JCR a circuit is completed to energize storage relays JR1 through JR6 in accordance with the five-unit justification code read along with the 6 and 7 code holes. The extent of spacing between words upon automatic operation of the space bar key lever in the reproducer is varied between one and five units to effect justification. Accordingly, in the mechanism the slide selector operated by the space bar cam does not directly select the energization of the escapement magnets EM1, EM2 and EM3 but this selector slide controls three auxiliary contacts WSC. Two of the three contacts WSC control the energizing circuits for the escapement magnets, and the other controls a word space repeater relay WSR. The extent of word spacing resulting from operation of contacts WSC is under the joint control of the two storage relays JR1 and JR2 and the step-down relay SDR.

In the more specific description of the mechanism which is now to follow, the features that are common to the trial copy recorder and the justified copy reproducer will be dealt with first. These features include the power frame and type action, the case shift mechanism, platen indexing mechanism, the variable letter spacing devices, the manual carriage release, the carriage return mechanism, and the tabulating mechanism. The same reference numerals will be used to designate parts that are identical in structure and operation in the recorder and reproducer. Thereafter, there will follow a specific description of the elements that are specific to the trial copy recorder. These elements include a code selector unit, a tape punch, a tape hole counter, a justification code computer, and the control circuits for the code selector and tape punch. Finally, there will be described the features that are peculiar to the justified copy reproducer. These features include the tape reader, the code translator, the control circuits for the double reader, the control circuits for effecting word spacing, and a carbon ribbon feed device.

Power frame and type action

The trial copy recorder and the justified copy reproducer are each assembled around a sturdy four-sided base 10 formed by a right and left aluminum casting joined at the front by another aluminum casting and at the rear by an angular steel plate 11 extending over the top rear portions of the side castings to brace the entire assembly. A power frame assembly 12 is mounted between the two side castings. A carriage and rail assembly is mounted between the top rear portions of the two side castings, and a space at the rear of the carriage is provided for auxiliary apparatus.

A single, constant speed 1/20 H. P. motor 17 is mounted on the inner face of the rear frame plate 11, and this motor is connected by a V-belt 18 to the power shaft. The power shaft 19 is connected by means of a chain drive 20 to a continuously rotating power roll 21 which is adapted to operate the type bars through a conventinal cam arrangement as will be more fully pointed out.

The power frame 12 which is mounted within the base 10 has assembled thereon the key levers 27 and the power operated type actions. The key levers 27 are operable to control their associated power cams with a minimum of effort. The manner in which the operating cam are energized by the power roll 21 will appear more fully hereinafter. A normally energized magnetic lock KLM (Figs. 2, 2a and 70) adapted to rock a key lever locking bail 29 (see Fig. 3) is provided to prevent effective operation of the keys when the power for any reason is off, or when the keys should not be operated for any other reason.

Each key lever controls a cam assembly contacting with the constantly running power roll 21 whereby each lever control cam furnishes the power for operating a type bar through a bell crank.

The manner in which power is imparted to the operative mechanism of the machine will be only briefly described since the arrangement is generally shown in the International electric writing machine formerly known as the "Electromatic." It is in connection with electric writing machines of this type that the invention has been disclosed. However, it will be understood that the invention is not limited in application to the specific machine selected for purpose of illustration, but may be applied to other power operated writing machines.

Figure 3A:
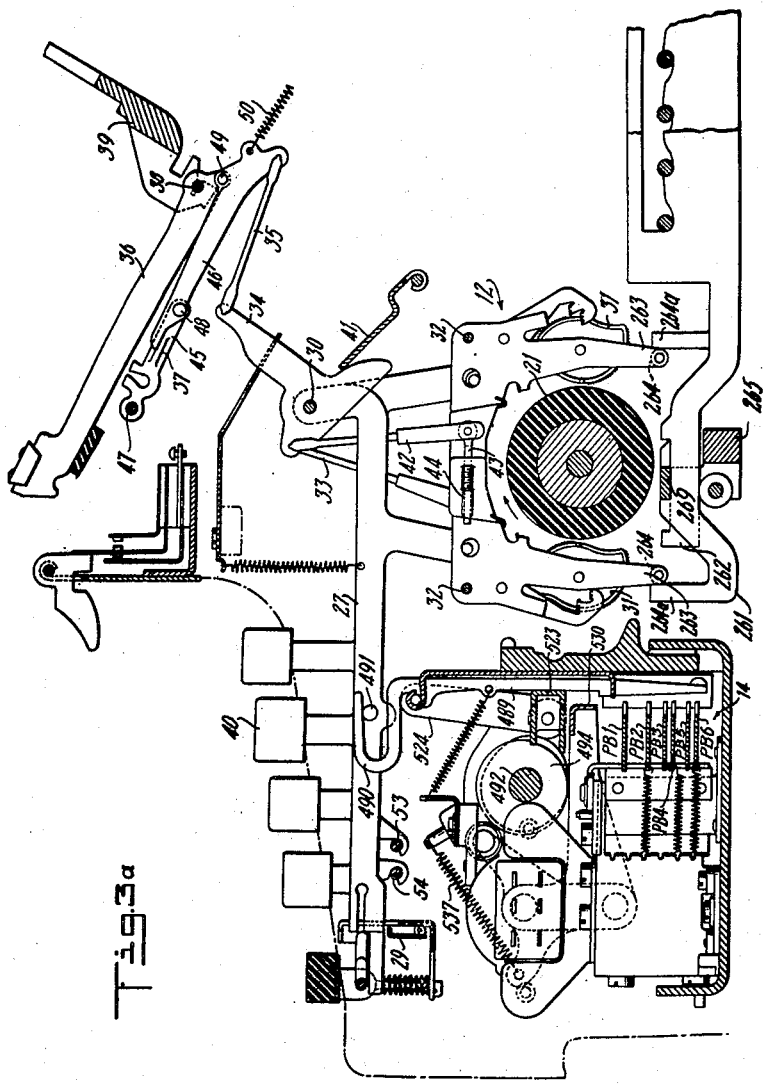
Fig. 3a is a vertical sectional view through the keyboard, the translating unit, the power roll, the type basket and part of the letter spacing control selector of the justified copy reproducer.

As shown in Fig. 3 of the drawings the key levers 27 are pivoted on a rod 30 which is supported by a cross member of the power frame assembly. The power roller 21 is mounted under the power frame assembly for rotation in the direction of the arrow (Fig. 3) by means of the drive connections to the motor previously described.

Cooperating with the power roll 21 are cam units 31 which are pivotally mounted on rods 32 extending parallel with the power roller 21. There is a cam unit 31 associated with each key lever 27 and each cam unit in control of a type bar is connected by a link 33 with a bell crank 34 pivoted on rod 30. The bell cranks 34 are connected by links 35 to the type bars 36 through the medium of toggles 37. The type bars 36 are pivoted on the usual wire segment 38 provided on a type bar segment 39 located in front of the conventional platen. The platen, as will appear hereinafter, is rotatably mounted in a carriage which is supported on front and rear rails by means of suitable anti-friction roller trucks.

When any character key 40 is depressed, its cam unit 31 is caused to operably engage the power roller 21 in a well known way, thereby rocking the cam unit 31 clockwise or counterclockwise, according to whether the operative cam unit is pivoted on the left or on the right hand rod 32, respectively. The rocking of the cam unit causes its link 33 to be drawn downwardly, thereby rocking the corresponding bell crank 34. This movement of the bell crank 34, through the corresponding link 35 and toggle 37, causes type bar 36 associated with the selected key to rock in a printing stroke and to make an impression of the type upon a work sheet carried about the platen. The type bar, near the end of its operative stroke, engages the usual universal bar 41 and causes the same to rock.

It may be pointed out that the operating linkage for the type bars 36 which has just been described includes several novel features which render the linkage system adjustable to secure an optimum and a uniform impression of the type. In Fig. 3 of the drawings, it will be noted that the downwardly depending link 42 is connected to its cam assembly 31 at the forward or keyboard side of the power roll by means of a turnbuckle 43, which is pivoted at one end to the link 42 and which is adjustably threaded at its other end into a socket 44 in the horizontal leg of the cam unit frame. The links depending downwardly from the bell crank 34 are composed of two sections which are screwed into each other, thereby providing an adjustment by means of which the associated cams may be accurately spaced with respect to the power roll. It will appear, therefore, that the leverage asserted through the link and the cam unit may be adjusted through the turnbuckle 43. It may also be pointed out that the toggle 37 consisting of arms 45 and 46 is so arranged as to effectively inhibit rebound action of the type bars 36. One end of the arm 45 of the toggle is mounted on a fixed pivot rod 47, while the other end is pivoted to the arm 46 by means of a pivot pin 48. The operative connection of the arm 46 of the toggle to the type bar 36 is at a pivot pin 49. The operation of the toggle mechanism is stabilized by a spring 50 which is attached to the toggle arm 46 at one of its ends and to a fixed frame member at its other end. It will be observed that when the toggle linkage 45—46 is in its extended position the points 47, 48 and 49 are in a substantially straight line so that upon return of the type bar 36 to its position of rest, as shown in Fig. 3 of the drawings, the toggle linkage will in effect constitute a lock against the rebound action of the type bar 36. A fine adjustment of the toggle linkage may be obtained by either slightly shortening the arm 45 or by lengthening it. Such alteration of the arm 45 is easily achieved by either springing apart, or closing a pair of ears 51 which constitute the legs of a generally U-shaped portion of the arm 45.

Case shift mechanism

The type basket 52 of both recorder and reproducer, see Figs. 4, 5, 6 and 7, is mounted for selective shifting between upper and lower case printing positions by mounting the same on two sets of parallel leaf springs in the well known manner. For the purpose of shifting the type basket, there has been provided herein improved power operated mechanism. A key lever and cam assembly is provided for shifting the basket to one position, and a separate key lever and cam assembly is provided for shifting it to the other position. This provides positive, fast, automatic operation of the type basket shift for selectively printing upper or lower case characters under the control of the code translator mechanism 14. Two oppositely disposed toggle mechanisms adjustably hold the basket in its two shifted positions, and the power from each basket shift cam unit is applied to move the basket by breaking its associated toggle. This imparts an easy, accelerated motion to the basket. Specifically, the manner in which the type basket is shifted from one position to another will be seen by reference to Figs. 4–7, wherein Figs. 4 and 5 illustrate the shifting mechanism at the left side of the type basket and Figs. 6 and 7 illustrate the shifting mechanism at the right side of the basket. Furthermore, Figs. 4 and 7 show the position of the shifting mechanism at the left and right side of the basket, respectively, when the basket has been moved upwardly for printing lower case characters, while Figs. 5 and 6 show the position of the mechanism at the left and right side, respectively, when the basket has been moved downwardly for printing of upper case characters. A lower case key LC1 is disposed at the right hand side of the keyboard, and depression of this key will operate a cam assembly as will be pointed out hereinafter. The key LC1 is connected by means of a transverse bail 53 (Fig. 3) with a lower case shift key LC2 disposed at the left hand side of the keyboard. An upper case shift key UC1 is disposed at the left hand side of the keyboard and depression of this key will operate an associated cam assembly, as will be pointed out hereinafter. The upper case shift key UC1 is attached to an upper case shift key UC2 which is disposed at the right hand side of the keyboard by means of a transverse bail 54. It will appear, therefore, that depression of either of the case shift keys LC1 or LC2 on the one hand or UC1 or UC2 on the other hand will effect a shifting movement of the type basket.

Fig. 4 of the drawings shows the type basket 52 in its upper position in which lower case characters are printed. To the rear face of a side frame member of the basket 52 is attached a bracket by means of a pair of screws, and to the bracket 55 are pivoted three toggle levers 56, 58 and 59. One end of the toggle lever 56 is pivoted on a shaft 60 while the other end is pivoted to the lever 59 at an intermediate point thereof by means of a pivot pin 61. The free end of the lever 59 has a stud 62 extending from a face thereof to which is attached a spring 63 which is anchored at its other end to a fixed frame member. The other end of the lever 59 is pivoted to the bracket 55 by means of a pivot pin 59a. The lever 58 of the toggle system has one end thereof pivoted on a pivot pin 64 carried by the bracket 55. The opposite end of the arm 58 is pivoted to a short lever 65 by means of a pivot pin 66, the short lever 65 being secured to a rock shaft 67.

The toggle system as it is disposed in Fig. 4 when the type basket is elevated to its lower case position has the pivot points 59a, 60 and 61 of the toggle system in substantial alignment and the spring 63 under substantial tension, and is effective to exert considerable turning force on finger 70 which holds the toggle arms 59 and 56 in their straightened relation, as shown in Fig. 4, wherein lever 56 engages the finger 70 of the release lever 69 which is in turn stopped by extension 71 and stop 72. This positively holds the basket in its upper position. The arrangement at the other side of the basket has a like function.

In order to release the basket 52 to its lower position for the printing of upper case characters it is merely necessary to depress either key UC1 or UC2 to rock the key lever 67 about the rod 30, whereby its associated cam assembly is brought into contact with the power roll 21 and a connecting link 68 is thereby drawn downwardly. A toggle release lever 69 is pivoted for rocking movement about the rock shaft 60 and the upper free end of the release lever 69 has an inturned finger 70 which abuts the edge of the lever 56 to rock the same in a clockwise direction to break the toggle linkage into the position shown in Fig. 5 of the drawings. The release lever 69 has an extension 71 which is adapted to contact a stop member 72 when the release lever and its associated cam assembly are in normal or non-operated position.

As viewed in Fig. 5 of the drawings the case shift toggle linkage is in its released position wherein the force of the spring 63 is directed along a line from its point of anchorage 62 through the pivot point 59a of the lever 59. In this position the effect of the spring is substantially neutralized.

When the type basket is in its upper case position the operating toggle at the right hand side of the basket is as shown in Fig. 6 of the drawings, while its position at that side of the basket for lower case printing is shown in Fig. 7 of the drawings. The toggle linkage at the right side of the basket which controls the shifting of the basket into the lower case position is in all respects similar to the shifting mechanism at the left hand side of the basket with the exception that the position of the lever 59 is reversed. That is to say, the pivot point 59a is disposed at the bottom edge of the bracket 55 while the free end of the lever 59 extends upwardly when the toggle system is in its extended or operative position. If, therefore, the basket is in its upper case position and it is desired to shift the same to lower case position, it is merely necessary to depress the lower case shift key LC1 and its associated key lever 73 to rock the lever downwardly about the rod 30. This will effectively release its cam assembly for contact with the power roll 21 with the result that the link 68 is moved downwardly and the release lever 69 will be rocked into contact with the toggle lever 56 so that the toggle system will be broken into the position shown in Fig. 7 of the drawings where the force of the spring 63 extends substantially from its point of connection 62 with the lever 59 through the pivot point 59a whereby its effect on the toggle linkage is substantially nullified.

The type basket 52 has lugs 74 extending forwardly from each side thereof, and these lugs carry stop screws 75 on which stop nuts 76 are threaded. The stop nut 76 at the left side of the basket is adapted in its upper case position to contact the face of a stop bar 77 fixed to and extending forwardly from a portion of the power frame. The stop nut 76 at the right hand side of the basket is adapted in its lower case position to contact the lower face of the stop bar 77 at the right hand side of the basket. The movement of the type basket 52 may, therefore, be accurately limited by adjusting the stop nuts 76, the one at the left hand side of the basket for limiting downward movement of the basket and the one at the right hand side of the basket for limiting upward movement of the basket.

When one set of toggles is operated to shift the basket a slight compression force is exerted on the stop members 75—76 (Fig. 7) at the opposite side of the basket. Thus, the force applied at one side of the machine is resisted to some extent at the other side. This is effective to take up all the play that may be in pivots 64, 66 and in the bearings of rock shaft 67.

The importance of the foregoing case shift control lies in the fact that the toggle linkage system is broken by power roll energy, whereby a mechanical advantage is realized and wear on the power roll is minimized. Furthermore, the movement of the type basket is rapid and positive under the influence of the breaking of the toggle linkage and the spring 63.

*Platen indexing*

The platen of both the recorder and the reproducer is indexed about its longitudinal axis for the purpose of feeding the copy paper through the type impression zone by conventional mechanism which need, therefore, be only briefly described. In Figs. 11 and 12 is illustrated the mechanism by which the platen is indexed. The platen 100 is rotatably mounted on its axis 101 and has attached to one end thereof a ratchet wheel 102 which is adapted to be engaged by a feed pawl 103 for rotating the platen. The feed pawl 103 is pivoted on a pin 104, the pin 104 being carried by a sliding supporting member. The supporting member 105 has a pair of spaced slots 106 and 107 which embrace fixed guide studs 108 and 109, respectively. A finger 110 pivoted on the carriage frame at 111 has its free end resting on the top edge of the feed pawl 103. The upper edge of the finger 110 has a series of notches 1, 2 and 3 representing line spaces, and when the operating lever 113 which is mounted on the pivot pin 108 is moved into one of the line space notches 1, 2 or 3, the free end of the finger 110 bears on the top of the feed pawl 103 and alters the relation of the feed pawl 103 in respect to the ratchet wheel 102 by moving the supporting member 105 upward or downward so as to cause the feed pawl 103 to engage either every tooth, every second tooth or every third tooth of the ratchet wheel 102 in accordance with the setting of the hand lever 113.

The lower end of the support 105 has a laterally extending lug 114 which engages in the slotted free end of an operating lever 115. The operating lever 115 is pivoted on a fixed pivot stud 116 and is normally held in its raised position by means of a spring 117 which is wound about the pivot stud 116 and has one end thereof anchored to the carriage 118 and the other end to stud 119 extending from one face of the operating lever 115.

The platen indexing mechanism thus far described is operated through an indexing movement when the carriage is returned under the force of a carriage return tape 120. The end of the carriage return tape is attached to a downwardly projecting T-shaped lever 121 which is pivoted on a pivot stud 122. The studs 116 and 122 are carried by a fixed, upstanding bracket 123 secured to the carriage 118. One arm of the T-shaped lever 121 has a bifurcation 124 in which is received a pin 125 extending laterally from a face of the lever 115.

It will appear from the foregoing, therefore, that when the carriage is returned under the influence of the carriage return tape 120, the T-shaped lever 121 will be rocked in a counterclockwise direction about its fixed pivot 122 with the result that the bifurcated end 124 of the lever will move downwardly, and as a consequence of the connection between the bifurcation of the lever and the pin 125, the lever 115 will also be rocked downwardly thereby drawing the supporting member 105 downwardly to the point where the slots 106 and 107 will engage with their upper extremities with the pins 108 and 109, respectively. Thereupon, in accordance with the setting of the control lever 113, the platen will be indexed 1, 2 or 3 line positions as the carriage is being returned.

Variable letter spacing

It is contemplated that both the recorder and the reproducer be equipped with a standard carriage 126 (Fig. 13) and that all of the spacing movements of the carriage be controlled by a rotary wheel escapement mechanism operated by the segment universal bar 41 (Fig. 3). Herein is disclosed proportional spacing mechanism wherein three differentially connected escapement wheels are used in combinations to provide from one to six units of spacing. The selection of the proper combination of operations of the three wheels is made for each character by three magnets EM1, EM2 and EM3 (Fig. 2), under the control of the code selector 13. Three contacts on the code selector control the lower case spacing and three other contacts on the code selector control the upper case spacing as will be pointed out hereinafter. Case shift contacts CSC operated when the type basket is raised and lowered select which of the two groups of the three code selector contacts are to be effective to control the three magnets EM1, EM2 and EM3. Spacing between words and the like is controlled by dummy or non-printing type actions so that the same timing is retained as in printing.

The carriage escapement mechanism is designed to letter space in proportion to the width of the respective characters employed, and this mechanism is mounted in a frame casting 127 which is secured to the undersides of the front and rear rails 128, 129 (Fig. 14). The frame 127 supports three wheels which are designated 130, 131 and 132. A rod 133 on which the wheels 130, 131 and 132 are rotatably mounted is supported in parallel spaced frame members 134 and 135. A pinion 136 which is attached to a ratchet 137 meshes constantly with a spiral rack 138 which is secured to the underside of the carriage 118.

Figure 18:
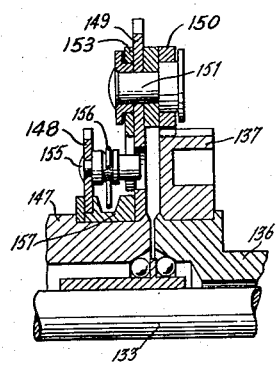
Fig. 18 is a sectional view on line 18—18 of Fig. 17.

The rear end of the pinion 136 is formed as a ball race (see Fig. 18) in cooperation with balls 139 whereby the pinion 136 and ratchet 137 rotate on the rod 133. The latter is relatively fixed in the frame members 134 and 135.

The hub of wheel 130 is integral with a pinion 140 located adjacent the hub of the wheel 131. The pinion 140 meshes with one of a pair of intermeshing sun pinions 141 rotatably mounted on brackets 142 carried by the wheel 131 while the other pinion 141 meshes with a pinion 143 which is secured to a pinion 144. The pinion 144 meshes with one of a similar pair of intermeshing sun pinions 145 mounted on brackets 146 carried by wheel 132, while the other pinion 145 meshes with a pinion 147.

Figure 17:
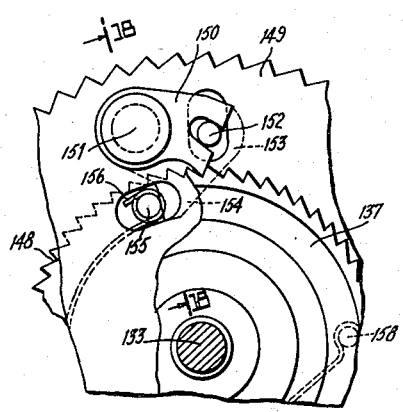
Fig. 17 is a large scale detail view of part of the carriage release mechanism.

Rotatably mounted on the pinion 147 is a ratchet wheel 148 which is of the same diameter as the ratchet 137 while secured to the pinion 147 is a ratchet 149 which is considerably larger in diameter than the ratchets 137 and 148. The ratchets 137 and 149 are normally connected for driving purposes by means best shown in Figs. 17 and 18 comprising a dog 150 pivoted on a stud 151 fixedly mounted on the ratchet wheel 149. The dog 150 normally engages the teeth of the ratchet wheel 137 whereby the ratchet wheel 149 will be rotated in a counterclockwise direction (Fig. 17) whenever the ratchet wheel 137 is similarly rotated by movement of the carriage. The dog 150 is slotted to embrace a stud 152 carried by a member 153 also pivotally mounted on the stud 151. The member 153 has a lug 154 engaging a stud 155 secured to the side of ratchet wheel 148. A torsion spring 156, hooked over the end of stud 155 and lying in a groove formed in a collar 157 on the pinion 147 and also anchored to a stud 158 (Fig. 17) on ratchet 149, normally tends to rotate the ratchet 148 in a counterclockwise direction (Fig. 17).

Movement of the carriage is effected, as usual in typewriting machines, by means of a spring drum 159 partly shown in Fig. 2 on which drum is wound a tape 120a passing over a pulley 160 mounted on the rear rail 129 and thence to the right hand end of the rack 138 at which point the tape 120a is secured. Due to the constant tension produced in the tape 120a by the spring drum 159, the carriage 126 tends to move to the left. Thus the ratchet 137 tends to rotate the ratchet 149 and pinion 147 in a counterclockwise direction (Fig. 17). This rotational tendency of the pinion 147 is communicated to the wheels 130, 131 and 132 (Fig. 14) through the train of connections comprising the pinions 140, 141, 143, 144 and 145. Normally, however, this rotational tendency has no effect so far as movement of the carriage is concerned because the ratchet wheels 130, 131 and 132 are restrained from rotation by means of the loose dogs 161 (Fig. 16) of the escapement mechanism.

Reverse rotation of the ratchet 149 and pinion 147 is prevented by means of a dog 162 (Fig. 19) pivoted on a stud 163 carried by a plate 164 which is adjustably secured to the rear rail 129. Also pivoted on stud 163 is a bracket 165 having a bumper 166 composed of resilient material such as leather against which the dog 162 is normally held by a spring 167. The bracket 165 is adjustably rotated on the stud 163 until the free end of said dog 162 engages one wall of a tooth in the ratchet 149 but does not quite touch the other wall of the adjacent tooth, the object being to silence the clicking noise which ordinarily is experienced with similar ratchet-and-pawl mechanisms due to the end of the dog striking the side of the next succeeding tooth after riding over a given tooth.

The ratchet wheels 130, 131 and 132 have 54, 54 and 36 teeth, respectively, whereby the amount of feeding movement imparted to the carriage may be varied. Due to the method of interconnecting the ratchet wheels by means of intermeshing pinions, the ratchet wheels 130 and 132 rotate in a direction opposite to the ratchet 131. Assuming for the moment that the ratchet wheels 130 and 131 (Figs. 14 and 15) are fixed against rotation, the pinion 144 will be locked against rotation. Therefore, if ratchet wheel 132 is now permitted to rotate one tooth space, one of the pinions 145 will roll around said pinion 144 and by rotating the companion pinion 144 will permit the pinion 147 to rotate in the same direction as the ratchet wheel 132 but twice as much as ratchet wheel 132. Similarly, if the ratchet wheels 130 and 132 are locked against rotation and the ratchet wheel 131 is permitted to move, one of the pinions 141 will roll around the pinion 140 and cause pinions 143 and 144 to be rotated. The rotation of pinion 144 is communicated to pinion 147 through the intermeshing pinions 145. As in the case of ratchet wheel 140, pinion 147 rotates twice as much as ratchet wheel 131. However, when the ratchet wheels 131 and 132 are held against rotation and ratchet wheel 130 rotates, the same amount of movement will be communicated from the ratchet wheel 130 to the pinion 147 through the pinions 141, 143, 144 and 145 acting as idlers. It is possible, however, to permit the ratchet wheels 130, 131 and 132 to rotate in combinations to produce an accumulative effect upon the pinion 136 which, of course, will permit the carriage to move correspondingly.

Since the ratchet wheel 130 has fifty-four teeth the pinion 147 and hence the pinion 136 will be rotated 1/54 of a revolution whenever the ratchet wheel 130 rotates one tooth space. Moreover, since the movement of the pinion 147 is twice that of the ratchet wheel 131 and the latter has fifty-four teeth, the pinions 147 and 136 will be rotated the equivalent of 1/27 of a revolution of the ratchet wheel 131. Likewise, the ratchet wheel 132 having thirty-six teeth, pinions 147 and 136 will be rotated 1/36 of a revolution of the ratchet wheel 132. It will be seen, therefore, that the movements of pinions 147 and 136 produced by the ratchet wheels 130, 131 and 132 are so designed and the spacing of the teeth on their ratchet wheels has been so selected that ratchet wheel 130 causes the carriage to move one unit of spacing, ratchet wheel 131 two units of spacing and ratchet wheel 132 three units of spacing.

It is thus possible to secure six different spacings of the carriage which, in terms of units of carriage spacing, are as follows: 1, 2, 3, 4, 5 and 6. Thus the spacing of the carriage can be accommodated to the different widths of letters employed. The means by which the wheels 130, 131 and 132 are selectively controlled will be described in the following paragraphs.

Figure 16:
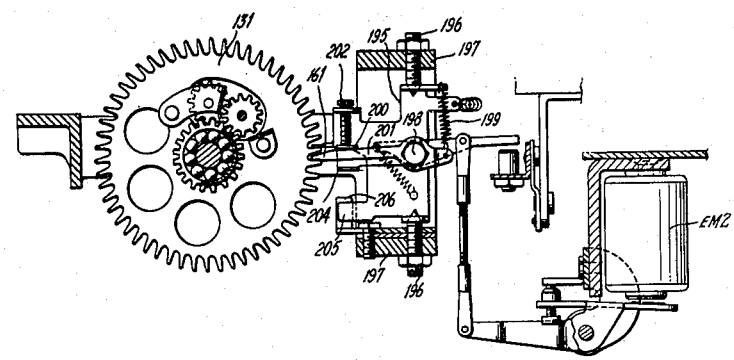
Fig. 16 is a vertical sectional view taken on line 16—16 of Fig. 15.

The rotation of the escapement ratchet wheels 130, 131 and 132 is controlled by means of three dog rocker mechanisms which are selectively controlled by magnets EM1, EM2, and EM3, respectively. Fig. 16 shows the dog rocker mechanism for the ratchet wheel 131. Each dog rocker mechanism includes a dog rocker plate 195 which is pivotally mounted on vertically aligned conical studs 196 screwed into threaded holes in two parallel and horizontal portions 197 of the frame 127. The conical points of the studs are seated in conical holes in lugs formed in the dog rocker plate 195. Pivoted on a stud 198 carried by the rocker plate 195 is the usual loose escapement dog 161 mentioned hereinbefore which is actuated by a spring 199 so as to be urged in a counterclockwise direction (Fig. 16). The left hand end of the dog 161 engaging one of the teeth of the ratchet 131, however, is held in the position of Fig. 16 owing to the tension of the spring drum 159 (Fig. 14) being greater than the tension of the spring 199 (Fig. 16) whereby the dog 161 is forced against a stop 200 mounted on an arm 201 which is rotatably secured to the side of the rocker plate 195 by means of the stud 198. The upper left hand portion of the arm 201 is provided with a bent-over lug against which bears an adjusting screw 202 carried by a lug formed in the rocker plate 195. By turning the screw 202 in one direction or another, the arm 201 may be rotatably adjusted about the stud 198 as a pivot. The dog rocker plate 195 is provided with a lug 203 which is substantially in horizontal alignment with the left end of the dog 161 but does not normally engage the teeth of the ratchet wheel 131.

When the rocker plate 195 is rocked in a counterclockwise direction (Fig. 14), the lug 203 is moved into the tooth space occupied by the dog 161 before said dog is moved free of the ratchet wheel whereby when the dog ultimately clears teeth in the ratchet 131, the ratchet wheel is permitted to rotate counterclockwise a fraction of a tooth space in Fig. 16. The spring 199 then rocks the dog 161 in a counterclockwise direction until said dog strikes a resilient stop 204 mounted on the arm 201. The stops 203 and 204 on arm 201 are so spaced that the end of dog 161 assumes a position in horizontal alignment with the next lower tooth space of ratchet wheel 131.

When the plate 195 is restored to the position of Fig. 14, the end of dog 161 is moved into the path of the next lower tooth on ratchet wheel 131 before the lug 203 clears the teeth in ratchet 131. When the lug 203 finally clears the teeth in ratchet 131, the ratchet wheel 131 will be permitted to rotate in a counterclockwise direction (Fig. 16) the remainder of a tooth space, thereby bringing the end of dog 161 back against the resilient stop 203. Thus, by giving the plate 195 one complete oscillation the escapement ratchet 131 is permitted to turn one full tooth space.

The rocker plate 195 (Fig. 16) is formed with a lug 205 which extends between two resilient stops 206 and 207 (Fig. 14) mounted on adjustable arms 208 and 209, respectively, which arms are pivoted in scissors fashion on one of the conical studs 196. The stops 206 and 207 being located on opposite sides of the lug 205, adjustably limit the oscillatory movements of the plate 195 on the studs 196 as pivots.

Similar mechanism is provided for the other two ratchet wheels 130 and 132 but, owing to the fact that these two ratchet wheels rotate in a direction opposite to the ratchet wheel 131, the rocker plates 195 for the ratchet wheels 130 and 132 are in effect inverted. Normally, the plates 195 are held by torsion springs 210 with their lugs 205 abutting the stops 207, as shown in Fig. 14, with all of the dogs 161 engaging the teeth of their respective ratchets.

The rocker plates 195 are selectively and combinationally operated through power mechanism controlled by the keys 40 and the code selector mechanism 13 which will be described at a later point in this specification.

*Manual carriage release*

It is desirable to be able to release the escapement mechanism from the carriage for the purpose of moving the carriage by hand, or when the carriage is to be returned by the usual power operated carriage return mechanism. For this purpose, there is provided release mechanism which is operated by the usual carriage release levers 168 one of which is shown in Fig. 13, these levers being pivoted on studs 169 on the side plates of the carriage with the free end of levers 168 adjacent the usual platen rotating knobs 170. Each lever 168 abuts one end of a bail 171 pivotally mounted in the side plates of the carriage. When either of the levers 168 is depressed, the bail 171 is rocked clockwise in Fig. 13 thereby causing the bail to move rearwardly of the platen. A lug 172 formed in a lever 173 (Fig. 19), pivoted on the top surface of the rear rail 129, is thereby moved rearwardly of the platen whenever the bail 171 is moved by the release levers 168.

Mounted on a bracket 174 (Fig. 19) is a lever 175 pivoted on a stud 176 carried by the bracket 174. A release dog 177 is pivoted to the lower end of the lever 175 by means of a stud 178. A spring 179, anchored to one end of the dog 177 and to a leg 180 of the bracket 174 normally holds a pin 181 in the outer end of said dog against a stop notch 182 formed in the leg 180. Whenever the lever 173 is moved forwardly in Fig. 19 by the bail 171 as a consequence of the operation of one of the release levers 168, the dog 177 is moved to the left in Fig. 19. By a clockwise pivotal movement of lever 175 on the stud 176 and a resulting movement of the dog 177, the ratchet 148 is moved in a counterclockwise direction relative to the ratchet 149 (Fig. 19).

Through the cooperation of the pin 155 on ratchet 148 with the lug on lever 153, and the cooperation of pin 152 with the slot in the dog 150, the latter is lifted out of engagement with the teeth of ratchet 137, thereby permitting said ratchet to be moved independently of the ratchet 149. Thus the carriage may be moved by hand or by the power operated return mechanism without disturbing the escapement mechanism and without the escapement mechanism interfering with the movement of the carriage.

*Carriage return*

The dog 177 is operated automatically whenever the usual power operated return mechanism operates to return the carriage prior to writing a new line. In the "International" electric writing machine, the carriage is returned by power mechanism very similar to the one described in Patent No. 2,294,722 under control of a carriage return key. This mechanism is not shown in any great detail in the present case, because it is not directly involved in the operation of the invention claimed hereinafter.

A longitudinally yielding lever 189 (carried by the lever 221) ultimately controls the release of the carriage return clutch, when a hooked end 194 of said lever 189 is engaged by the left hand marginal stop 190 carried by the usual marginal stop rack 191 mounted on the carriage. Through an arm 192 and a link 193, which interconnects said arm 192 with the lever 173, the dog 177 is operated to disengage the dog 150 from the ratchet 137. During a carriage return operation, the ratchet 137 rotates in a clockwise direction (Fig. 18) whereby, if the dog 150 were not released a clicking noise would result which is undesirable as it renders the operation of the machine noisy.

When the carriage approaches its left hand marginal position, the left hand marginal stop 190 strikes the hooked end 194 of the lever 189 and pulls said lever 189 to the left in Fig. 19 whereby the linkage system and its associated cam is operated to disengage the carriage return clutch (Fig. 22), as will be explained in greater detail at a later point herein. The dog 177 is then restored by spring 179 to the position shown in Fig. 19.

As noted hereinbefore, the return of the carriage is under control of a friction clutch and carriage return tape reel on one end of the power roll drive shaft. This mechanism is illustrated in detail, Fig. 22. The toggle mechanism is operated by the carriage return cam controlled by its key lever, and the cam immediately returns to normal position even though the clutch toggle may be locked in its straightened position to hold the clutch engaged. At the end of the carriage return movement, the carriage margin stop 190 engages and moves the lever 189 on the frame which in turn trips the cam to furnish the power for disengaging the clutch by breaking the toggle. This provides a closer control of the carriage and allows the clutch to slip momentarily while the cam is operating to disengage the clutch, thereby permitting the rebound force of the carriage to be dissipated before the clutch is disengaged. The carriage return tape reel, the clutch and its operating toggle are shown in Fig. 22 of the drawings wherein an extension 21a of the power roll shaft is journalled for rotation in the side member of the frame casting 10. The shaft 21a extends laterally beyond the outer face of the frame casting 10 where it rotatably carries the carriage return ribbon reel 196a. Immediately adjacent the reel 196a is a clutch disc 197a which is pinned to the shaft 21a for rotation therewith. In the normal non-operative position of the clutch, the adjacent face of the clutch disc 197a has little or no operative influence on the confronting flange 198a of the reel 196a. The opposite face of the clutch disc 197a is adapted for contact by an axially slidable plate 199a so that when pressure is applied to move the plate 199a inwardly against the clutch disc 197a a driving connection will be established between the confronting faces of the clutch disc 197a and the flange 198a of the carriage return tape reel.

Clutching pressure is transmitted to the plate 199a through a sleeve 200a, the outer end of which is engaged by the end of a toggle arm 201a. The toggle arm 201a is pivoted to a downwardly extending leg 202a constituting a part of a bracket 203a which is attached to the outer surface of the frame casting 10. The toggle arm is pivoted to the downwardly extending leg 202a by means of a pivot stud 204a, this pivot being established near the lower end of the toggle arm 201a. The upwardly extending portion of the toggle arm 201a has formed therein a U-shaped portion 205a, the bight of which is threaded to receive an adjusting screw 206a. The extreme upper end of the arm 201a is notched to receive one end of a spring 207a which has its other end anchored to the frame casting 10. Thereby, the toggle arm 201a is retained in normal operative relation with a second link 208a of the toggle system, this link also having its lower end pivoted on the pivot stud 204a. The outer edge of the link 208a is embraced by the U-shaped portion of the toggle arm 201a, and the adjusting screw 206a bears against that edge of the link. The link 208a has a forwardly extending portion 209a to which is pivoted one end of a short link 210a, the other end of said link being pivoted to an arm 211 which is adapted to rock on a pivot pin 212. The arm 211 has an outwardly projecting finger 213 adapted to engage the inwardly extending portion 209a of the lever 208a at a point below its pivotal connection with the short link 210a. As a consequence, the upward movement of the arm 211 is limited. An operating lever 214 is mounted to rock on the pivot stud 212, the pivot stud 212 being carried by an inwardly projecting portion 215 of the supporting bracket 203a. The operating arm 214 has a laterally extending flange 216 which is adapted to contact the upper edge of the inwardly extending bracket portion 215, thereby limiting the rocking motion of the operating lever 214 in a clockwise direction about its pivot pin 212. The arm 211 has an inwardly projecting flange 217 which underlies the bottom edge of the operating lever 214.

The operating lever 214 is provided at its inner free end with an eye 218 to which the cam controlled carriage return linkage is connected. Thus, upon operation of the carriage control cam the operating arm 214 will be drawn downwardly, thereby rocking the lever 211 in a counterclockwise direction through engagement of the lever 214 with the inturned flange 217 of the lever 211. This will be effective to straighten the toggle connection between the lever 211 and the inturned portion 209a of the lever 208a. The lever 208a will consequently be rotated in a clockwise direction, and by virtue of the previously described connection between the lever 201a and the lever 208a, the lever 201a will be rocked in a clockwise direction about its pivot 204a. This movement it will be observed is transmitted by the lower end of the lever 201a to the sleeve 200a and to the pressure plate 199a with the consequent coupling of the clutch disc 197a and the reel flange 198a to cause the reel 196a to rotate and wind the carriage return tape thereon.

The terminal member of the aforementioned stop lever linkage for disengaging by breaking the clutch toggle system is diagrammatically illustrated in Fig. 22 as a pivoted bell crank 219, the foot 219a of which is adapted to engage the bottom edge of the inturned flange 217 of the lever 211. It is clear from the foregoing description how the clockwise motion of the lever 211 will break the toggle system thereby permitting the toggle arm 201a to move in a counterclockwise direction about its pivot to release the clutch disc 197a. A more specific understanding of the several cam controlled operating linkage systems bearing on the engagement and disengagement of the clutch will be acquired as the description of the machine proceeds.

As intimated in the foregoing paragraph once the carriage return clutch toggle has been straightened and the clutch has been engaged for returning the carriage, it is necessary to provide means for breaking the clutch toggle and for disengaging the clutch. Herein the mechanism includes cam controlled levers and links shown in Fig. 25 of the drawings. When the hooked end 194 of the lever 189 (Fig. 19) is engaged by the margin stop 190 the lever 189 is drawn to the left with the result that the end 249a of the finger 249 which engages in a notch in the top edge of the lever 189 is rocked in a counterclockwise direction (Fig. 27). This causes the arm 251 to be similarly rotated, thereby pushing the link 252 to the right in Fig. 25, thus rocking the trip lever 253 for the trip cam unit in a clockwise direction. This causes the trip cam unit to be operatively coupled to the power roller 21. As a consequence the cam trip unit is rocked clockwise, thereby drawing down the link 254 and rocking the lever 255 in a clockwise direction. This draws the link 256 to the right in Fig. 25 and rocks the arm 257 (Fig. 26) in a counterclockwise direction. The arm 257 is connected to a bell crank lever 800 (Fig. 20). The opposite arm of the bell crank lever 800 has a link 801 connected thereto. The link 801 is attached to a lever 802 that is pivoted on a pin 803. One end of the clutch release link 185 is attached to the free end of the lever 802, the other end of the link 185 being pivoted to a bell crank 184. The bell crank 184 has pivoted thereto the rear end of the clutch release rod 183 and the opposite end of the release rod 183 is attached to the top of a bell crank 219 (Fig. 22). It will appear from the foregoing, therefore, that when the lever 189 (Fig. 19) is pulled to the left by engagement with the margin stop 190, the trip cam linkage (Fig. 25) is operated and it, through the intermediate link and lever system, including bell crank 800, link 801, lever 802 and the clutch release linkage 183, 184 and 185, will pull rearwardly on the top of the bell crank 219 (Fig. 22) and rock it about its horizontal pivot to lift its forwardly extending arm 219a into engagement with the inturned flange 217 of the toggle lever. This will serve to rotate the toggle lever 215 about the pivot 212 in a clockwise direction, thereby breaking the toggle link and permitting release of the clutch disc 197a.

*Tabulating mechanism*

The tabulating mechanism is best shown in Figs. 23 and 24. Pivoted on a stud 220 carried by the extension 221 (Fig. 21) is the tabular lever or counter-stop 222 (Figs. 22 and 23), which extends horizontally parallel with the lever 189 (Fig. 19) and is provided with a tooth 223 normally out of the path of movement of the tabular stops 224. Also pivoted on the stud 220 is an operating lever 225 which has one arm extending almost straight downwardly and provided with a pin 226 in the plane of an arm 192 pivoted on a stud 187. The latter is carried by a bracket secured to the underside of the frame. A spring 229, connected to the arm 192 and to a fixed pin 230, holds the arm 192 in contact with pin 226. The arm 192 is connected by the link 193 to the lever 173 pivoted on the top of the rear rail. The lever 173 cooperates with the edge of the arm 175 and is operated by the carriage release levers which are mounted in the carriage, heretofore described.

Whenever the arm 225 is rocked clockwise (Figs. 19, 23 and 24), the pin 226, engaging the arm 192, will cause the latter to rock counterclockwise, thereby pushing the link 193 to the left and operating the arm 173. The arm 173, in turn, operates the arm 175 to disengage the ratchet 137 from the escapement mechanism, this operation being required during tabulating operations in order to release the carriage for free running movement by the spring motor 159.

The lever 225 is resiliently connected to the lever 222, whereby the foregoing movement of lever 225 also causes the lever 222 to be rocked clockwise to elevate the lug 223 into the path of a tabular stop 224. For this purpose, the horizontal arm of the lever 225 has a short downward extension provided with a pin 232 connected by a spring 233 to a pin 234 on the lever 222. A guard plate 235 is loosely pivoted on the pin 234 and slotted to embrace the pin 232 and is placed between the extension of the arm 225 and the spring 233. Opposite the front or upper face of the lever 222, there is provided a similar spring which, with spring 233, causes the lever 222 and 225 to normally move in unison. If the tooth 223 should strike the lower edge of a column stop 224 when the lever 225 is rocked clockwise, springs 233 stretch and prevent damage to any of the parts.

The lever 225 is pivotally connected at 236 to a link 237 (Figs. 23 and 24), having its lower end pivotally connected at 238 to a bell crank 239 (Fig. 25). The downwardly extending arm of the bell crank 239 is connected by a long link 240 to a rock lever 241 pivoted on the rod 30 which fulcrums the key levers including the tabulating key TK. The lever 241 is connected by a short link 242 to a conventional cam unit of the single-lobe type pivotally mounted on the rod 32. The cam unit cooperates with the usual power roller 21. The cam unit is controlled in a well known way by the tabulating key TK which, when depressed by the operator, causes the cam unit to be actuated by the power roller in a well known way, thereby rocking the cam unit in a clockwise direction. This results in drawing down the link 242, rocking the lever 241 clockwise, and drawing the link 240 to the right in Fig. 25, thereby rocking the bell crank 239 counterclockwise on its pivot 243. Link 237 is thus drawn downwardly depressing the right hand end (Figs. 23 and 24) of the horizontal arm of the lever 225. The arm 192 is operated as described above to free the carriage from the escapement mechanism and, at the same time, the lever 222 is rocked clockwise to elevate the lug 223 into the path of the nearest stop 224 immediately to the left of the lug 223.

When operated in this fashion, the lever 225 is latched to hold the lug 223 in the path of the column stop 224. As best shown in Fig. 26, there is provided a latch 244 pivoted on a stud 245 carried by the frame extension 221 and urged in a clockwise direction by a spring 246 which is anchored to a bracket 247 secured to the frame extension 221. Normally the latch 244 bears against the rear face or side of the lever 225 but, when the latter is operated as described above, it snaps over the upper edge of the lever 225 and thereby prevents said lever from returning to the position of Fig. 23. When the lever 225 is rocked as described above, a spring 248 connected to the pin 226 and to the same pin on bracket 230, tends to restore the levers 222 and 225 as a unit to the position of Fig. 23 but the latch 244 prevents this from taking place. Thus, the counter-stop 222 is maintained in the operative position in the path of the column stop 224 until the movement of the carriage brings the column stop into engagement with the lug 223.

Figure 8:
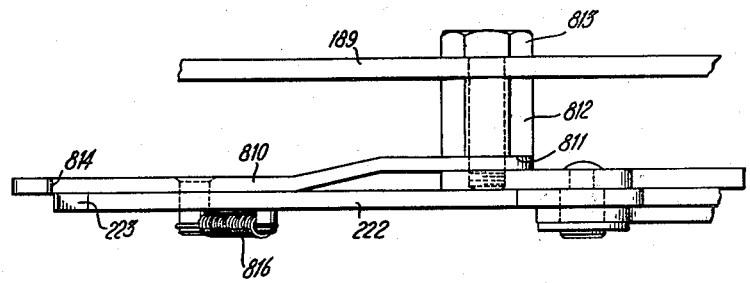
Fig. 8 is a fragmentary plan view showing a carriage rebound latch.
Figure 8A:
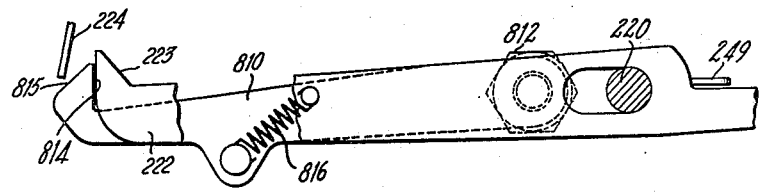
Fig. 8a is a fragmentary elevational view of the rebound latch shown in Fig. 8.

The lever 222 is slotted horizontally at the point where the stud 220 passes through (Fig. 8a) and normally the lever 222 occupies the left hand position of Fig. 19. The lever 222 is held in this position by means which include the finger 249 (Figs. 21, 27 and 28) secured to the upper end of a stub shaft 250 which is rotatably mounted in a horizontal portion of frame extension 221 (Fig. 21). Fixed to the lower end of the stub shaft 250 is an arm 251 connected by a link 252 to a trip lever 253 pivoted on the rod 30. This trip lever extends downwardly and at its lower end is shaped like that portion of a key lever which cooperates with the release lever of a cam unit and controls a trip cam unit (Fig. 25) in the well known manner. The trip cam unit is similar to the other cam units and it is connected by a link 254 to a rock lever 255 somewhat similar to the rock lever 242. The rock lever 255 is connected by a horizontal link 256 to an arm 257 journalled on the stud 245 and engaging a bent-over lug 258 in the latch 244. A torsion spring 259 (Fig. 21) connected to the arm 251 and to a collar 260 secured by set screws to the shaft 250, tends to urge the shaft 250 and finger 249 in a clockwise direction with reference to Figs. 27 and 28, thereby holding lever 222 in its left hand position as shown in Fig. 19.

When the column stop 224 strikes the lug 223, it moves the lever 222 to the right in Fig. 28, thereby rocking the finger 249 in a counterclockwise direction (Fig. 28). This causes the arm 251 to be similarly rotated, thereby pushing the link 252 to the right in Fig. 25, thus rocking the trip lever 253 for the trip cam unit in a clockwise direction. This causes the trip cam unit to be operatively coupled to the power roller 21 in a well known way. As a consequence, the trip cam unit is rocked clockwise, thereby drawing down the link 254 and rocking the lever 255 in a clockwise direction. This draws the link 256 to the right in Fig. 25 and rocks the arm 257 (Fig. 26) in a counterclockwise direction, also, through the lug 258, rocking the latch 244 to disengage it from the depressed horizontal arm of lever 225. This permits the levers 222 and 225 to rock counterclockwise (Fig. 23) under the influence of spring 248, thereby removing lug 223 from engagement with the column stop.

In light of the fact that the machine is designed to space units as small as 1/45 of an inch, it is of course quite important that carriage rebound upon tabulating movement thereof be minimized or avoided entirely. In order that the carriage rebound may be kept within very narrow limits, there has been provided a latch lever 810 shown in Figs. 19 and 8A. The latch lever is mounted for rocking movement on an eccentric sleeve 811 of a hexagonal spacer 812 which is secured by a screw 813 in bracket 221. The free end of the lever 810 is formed with an upwardly opening hooked portion 814 which is positioned substantially flush with the upturned end of the lever 222. The hooked end of the lever 810 has an external surface 815 which engages the tabular stops 224, thereby camming the lever 810 downwardly against the tension of a spring 816 which interconnects the levers 222 and 810. As the carriage proceeds in its tabulating movement the tabulating stop 224 engages the upturned end 223 of the lever 222 and moves such lever to the right as viewed in Fig. 8A. This movement of the lever 222 exposes the hooked portion 814 of the lever 810 and permits such portion to engage behind the tabular stop 224 as the free end of the lever is drawn upwardly behind the tabular stop under the influence of the spring 816. It will be noted that under such conditions the hooked end 814 of the lever 810 engages one face of the tabular stop 224 while the outer upturned end 223 of the lever 222 engages the opposite face of the tabular stop 224. By this means the carriage is afforded positive security against movement in either direction once the tabulating operation has been effected. It follows, therefore, that any carriage rebound is effectively avoided.

In the normal operation of the carriage return there is a line spacing operation of the platen as hereinabove described. The return of the carriage involves the tripping of a carriage return cam and the operation of a carriage clutch release cam. Since in the carriage return structure heretofore described there is no provision for tripping the carriage return clutch release cam a second time, there has been provided special mechanism which permits successive line spaces under the control of the carriage return clutch without the accompanying movement of the carriage; withal, there has been provided means for releasing the carriage return clutch after each such succeeding line spacing operation without resort to the carriage return clutch release cam which is effective during the initial line spacing operation which takes place at the return of the carriage.

Figure 10:
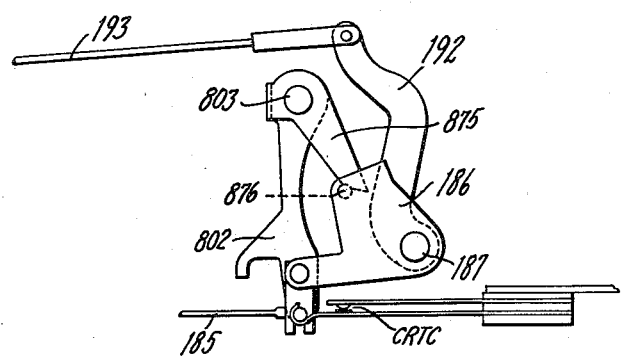
Fig. 10 is a fragmentary detail in elevation of carriage return linkage arranged to operate a carriage return contact.

Reference to Figs. 10, 19 and 20 will perhaps best illuminate the mechanism which is operative upon second and subsequent line spacing operations when the carriage is in its returned position. A lever 820 is pivoted adjacent the lever 802 on the pivot pin 803. The downwardly extending leg of the lever 820 is connected to the lower end of the lever 802 by means of a spring loop 821 which has one end anchored to a pin 822 extending laterally from the lower end of the lever 820, and the other end of the spring 821 is anchored on a stud 823 extending laterally from the lower end of the lever 802. An upper leg of the lever 820 has pivoted thereto an angular shaped catch 824 which is normally held against a shoulder 825 formed in the upwardly extending portion of the lever 820, the force for holding the catch 824 in that position being provided by a spring 826 which has one end attached to the catch and the other end to a pin 827 extending laterally from the lever. The catch 824 has an inturned horizontal lip 828 which normally lies in the path of the margin stop 190. During the return of the carriage the margin stop 190 will engage the inturned lip 828 of the catch 824 and will rock the catch in a counterclockwise direction, thereby simply moving it out of the way so that the margin stop may engage the end of the lever 189 to effect operation of the carriage return clutch release cam as hereinbefore described. At such time the catch 824 will return to its normal position against the stop shoulder 825 and when in such position the horizontal lip 828 thereof will underlie the margin stop 190.

From the foregoing it follows that the lever 820 will be inhibited against rocking about its pivot pin 803. If, therefore, under such conditions the carriage return key is again depressed, the carriage return clutch will be engaged as heretofore described in connection with the return of the carriage. Since, however, the lever 820 is locked against movement, the carriage return clutch toggle linkage will be straightened under the influence of the carriage return control cam, and the link 185 will be drawn to the left in Fig. 20 against the tension of the bow spring 821. At such time the carriage return clutch will be engaged and the tape reel 196a will be rotated sufficiently to effect a line spacing operation as hereintofore described.

The carriage return clutch toggle linkage will be broken immediately after its control cam has been operated by expanding action of the bow spring 821 against the locked lever 820, this tending to move the lever 802 to the right in Fig. 20. The movement of the lever 802 results in drawing the link 185 to the right in Figs. 19 and 20 with the consequent operation of the finger 219 (Fig. 22) and the breaking of the clutch toggle linkage in a manner similar to that described in connection with the return of the carriage.

Back spacing of the carriage is under the influence of a back spacing cam which is not shown since it is identical in structure and function with the cams already described. Herein it is sufficient to say that when the back space key is depressed the associated cam will be released into contact with the power roll 21 and a link 830 (Figs. 14 and 19) will be drawn forwardly. The link 830 is connected to a bell crank 831 which is mounted for rocking motion about a stud 832 supported in the rail 129. One leg of the bell crank 831 is connected to a link 833 and the latter has its opposite end connected to a ratchet 834 which is mounted on the casting 127 adjacent the gear 137. Each time the linkage system now described is operated by its operating cam, the ratchet 834 is carried into engagement with the teeth of the gear 137 and moves said gear the space of one tooth in a retrograde direction to effect back spacing of the carriage.

The automatic control of the machine requires that certain control contacts be opened each time the carriage is returned or the carriage is back spaced. The contacts in question are the carriage return contacts CRTC (Fig. 19) and the back space contacts BSC (Fig. 14). By first referring to Fig. 19 it will be seen that the contacts CRTC are under the immediate control of a contact operator 850 which is under the influence of a stud 851 extending from a face of the plate 186, the plate 186 being pivoted on the pivot stud 187. The normal resilience of the movable leaf of the contact CRTC holds the contact closed and holds the plate 168 in its extreme clockwise rotative position. The lever 192 carries a pin 852 which engages the right hand edge of the plate 186 and which is effective, therefore, when the lever 192 is rocked in a counterclockwise direction during carriage return to rock the plate 186 in a counterclockwise direction about its pivot 187, with the result that the contact CRTC is broken.

By reference to Fig. 14 of the drawings it may be observed how the contact BSC is opened during back spacing movement of the carriage. The bell crank 831 has a stud 860 extending from a face thereof and this stud engages and operates a contact operating link 861, one end of the link 861 being connected to the movable leaf 862 of the contact BSC. Each time, therefore, that the link 830 is drawn forwardly and the bell crank 831 is rocked about its pivot 832 in a clockwise direction, the contact operating link 861 will be moved to the right with the result that the contact BSC will be opened.

Figure 9:
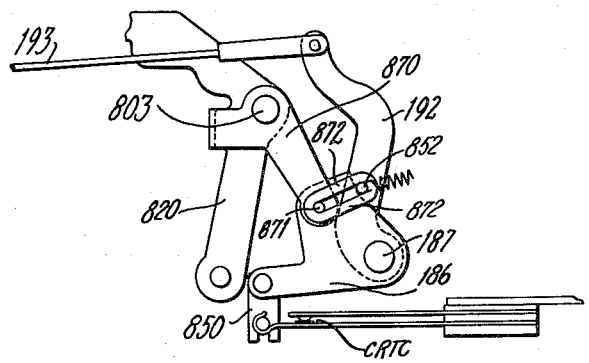
Fig. 9 is a rear elevation of a part of the carriage release and tabulating mechanism, certain parts having been removed to show underlying structure.

It has been generally stated hereinabove that during carriage return the lever 173 is rocked to engage the lever 175 for the purpose of disconnecting the escapement clutch during such return movement. It is now possible to trace the specific mechanism by which this function is performed. The lever 820 (Figs. 9 and 19) has a laterally spaced, generally rearwardly extending finger 870 from the face of which extends a stud 871. The stud 871 and the stud 852 extending from the outer face of the lever 192 (Figs. 9 and 19) are interconnected by means of a loop 872. Consequently, when the connected levers 802 and 820 are rocked about the pivot pin 803 by movement of the link 185 to the left in Figs. 9 and 19, such motion is imparted to the lever 192 because of the pin and loop connection just mentioned. The lever 192 will rock about its pivot 187 in a counterclockwise direction, thereby moving the link 193 to the left in Figs. 9 and 19 and rocking the lever 173 into engagement with the lever 175 with the result that the escapement clutch mechanism is disengaged.

It is contemplated that the carriage return contact CRTC be opened also during tabulation and during extra line spacing operations when the carriage has been fully returned.

During tabulation it will be remembered the bell crank 239 will draw the right hand end of the lever 222 downwardly with the result that a downwardly extending portion 873 of that lever will be rocked in a clockwise direction. The free end of the downwardly extending portion of the lever 873 has a pin 226 which is adapted to engage the right hand edge of the lever 192, thereby rocking the latter lever in a counterclockwise direction and engaging the pin 852 thereon with the right hand edge of the plate 186. This will result in the counterclockwise movement of the plate 186 and the resultant opening of the contact CRTC through downward movement of the operating link 850.

Provision has also been made for opening the contact CRTC during extra line spacing operations when the carriage is in its returned position. In connection with such line spacing operations described before, it has been explained how the lever 820 is locked against movement by engagement between the latch 828 and the lower face of the margin stop 190. In such case only the lever 802 can be rocked about its pivot 803 and accordingly there has been provided a laterally spaced and generally downwardly extending finger 875 (Figs. 10 and 19). The finger 875 extends into the path of a pin 876 which is carried by and extends from the rear face of the plate 186. It follows, therefore, that when the lever 802 is rocked in a clockwise direction about its pivot 803 under the force of the link 185, the finger 875 of said lever will rock into engagement with the pin 876 and thereby rock the plate 186 about its pivot 187 in a counterclockwise direction, thereby opening the carriage return contact CRTC.

*Code selector unit*

In the trial copy recorder letter spacing and control of the punch 15 is under control of the code selector unit. It will be appropriate at this time, therefore, to describe the manner in which the code selector unit controls not only the letter spacing magnets EM1, EM2 and EM3, but also how it controls the punch magnets PM1, PM2, PM3, PM4, PM5, PM6 and PM7 (Fig. 70A). The code selector unit 13 is shown best in Figs. 29 through 32. The unit is operated upon the actuation of each of certain keys of the main keyboard, to energize the punch magnets PM1–PM7, inclusive, singly and in combination so as to punch in a tape the code designation which corresponds to the particular key actuated.

The code selector unit 13 comprises a frame structure which is removably mounted at the base of the machine as shown in Fig. 3, and a plurality of selector slides 261 and 262 are mounted, respectively, for longitudinal sliding movement in the frame structure. The slides 261 and 262 correspond, respectively, to the keys of the keyboard which control the punch 15.

As explained previously, each time a key is depressed, a related one of the cam units 12 is tripped and the cam 31 of the tripped unit then engages the constantly rotating power roller 21. As a result such cam unit is rocked first away from the power roller 21 and then back toward the power roller and relatched in the position shown. The relationship of the several cam units 12 with respect to the power roller 21 is indicated in Fig. 3. The cam units 12 appearing to the right of the roller in Fig. 3 are referred to herein as front cam units and the units appearing to the left of the roller in Fig. 3 are referred to herein as the back cam units.

Each cam unit 12 which is tripped by a key of the main keyboard is equipped with a downward extension 263 carrying a pin 264 and each time such a cam unit is tripped and is operated, its pin effects a sliding movement of the corresponding one of the selector slides. The pins 264 engage upstanding lugs 264a at the forward end of the slides, whereby the slides are adapted for reciprocation by their related cams 31. The selector slides 261 are those which are operated by corresponding front cam units and the slides 262 are those which are operated by corresponding rear cam units. As the cam units 12 are arranged in staggered relation along the power roller 21, the slides 261 and 262 will be arranged alternately in the frame structure, as shown in Fig. 29. The frame structure for the selector unit includes a front guide comb 265 and a rear guide comb 266 and the selector slides are mounted, respectively, in aligned slots 267 formed in the two combs and are supported therein by suitably mounted anti-friction rollers 268 (Figs. 30 and 31). A stop plate 269 overlies the front comb 265 and cooperates with spaced lugs 270 and 271 on the selector slides to limit the longitudinal sliding movement of the latter. Tension springs 272 (Fig. 29) connecting pins 273 projecting from adjacent slides 261 and 262 serve to urge such slides against the stop plate 269 and thereby maintain the slides in their respective positions shown. From the foregoing it will be apparent that each time a slide 261 (Fig. 29) is operated by its related front cam unit 31, it will be moved lengthwise forwardly of the machine and will be returned by the spring 272 attached thereto and that each time a slide 262 (Fig. 29) is operated by its related back cam unit, it will be moved rearwardly thereby and will be returned to the position shown by its spring.

The sliding movement of the selector slides 261 and 262, which results from each operation of their related cam units 31, provides for the energizing of the seven punch selector magnets PM1 to PM7, inclusive, and also provides for energizing the punch clutch magnet PCM. This control of the punch by each of the selector slides is effected by the permutative closing of six selector code contacts SC1 to SC6, inclusive (Fig. 29) and by the closing of the common contact SCC. The code contacts SC1 to SC6, inclusive, control, respectively, the energizing of the punch magnets PM1 to PM7, inclusive. These code contacts SC1 to SC6, inclusive, are operated, respectively, by corresponding bails SB1 to SB6, inclusive. The common contact SCC is operated by a corresponding bail SBC.

As shown in Fig. 29, the bails SB1 to SB6, inclusive, and SBC are arranged in horizontally spaced relation and each such bail comprises a bail element 274 extending transversely through aligned elongated slots 275 formed in all of the selector slides. Each bail element 275 is connected at its two outer ends to supporting arms 276 and 277, respectively; the arm 276 being secured at its outer end to a pivot pin 278 carried by one frame 279, and the arm 277 being mounted on a pivot projection 280a extending from a bail shaft 280 which extends through aligned openings in the side frame plate 281 and in a vertical flange 282 of a frame plate 283. A yoke 277a attached to the inner end of the shaft 280 connects the arms 277 with their respective bail shafts 280. An inturned portion of the yoke 277a embraces the arm 277, as best shown in Fig. 32, and provides a positive operating connection between the parts. The right hand end of each bail shaft as viewed in Fig. 29, extends outwardly of the flange 282 and an upstanding contact actuating element 284 is fixed thereto in position to close the corresponding set of contacts of the group SC1 to SC6, inclusive, and the contact SCC.

The bottom of the slot 275 of each of the selector slides 261 and 262 is formed with upstanding cam projections 285 which are permutatively located on the several selector slides and operate corresponding ones of the bails SB1 to SB6 and the bail SBC. Each cam projection 285 functions to cam upward a related bail element when the selector slide on which the cam projection is located is moved lengthwise by the operative movement of its corresponding cam unit 31, and the upward movement of each such bail element results in rotating the related bail shaft 280 to close the related set of selector code contacts of the group SC1 to SC6, inclusive, and the contact SCC.

Each of the selector slides 261 and 262 is provided with a cam projection 285 for raising the bail SBC and closing the common contact SCC each time such slide is operated. The cam projections 285 for operating the remaining bails SB1 to SB6, inclusive, are so located on each selector slide that they provide, when such slide is operated, for the closing of those code contacts of the group SC1 to SC6, inclusive, which correspond to the code hole positions for representing the character or functional operation corresponding to the character key which was actuated to operate such slide. Each selector slide is originally formed with lower cam projections 285 and the projections not to be used are removed by any suitable means. The respective positions of the cam projections which have been removed in the slide 261 of Fig. 30 are indicated by dotted lines.

It is noted that the slide 261 of Fig. 30 contains cam projections which will operate the bails SBC, SB4 and SB6, and the latter will therefore close the related contacts SCC, SC4 and SC6, repectively, when such slide is operated. From the previous description, it will be obvious that the closure of such contacts will energize the punch clutch magnet PCM and the punch selector magnets PM4 and PM6 and thereby operate the punch 15 to punch the 4—6 code designation in the tape. As shown in Fig. 72 the 4—6 designation represents the period.

The foregoing is a description of how the selector unit operates to select the proper punches for punching a code in a tape in response to the depression of either a character key or a functional key on the keyboard of the machine. It will be remembered that it was generally stated hereinbefore that the selector slides are also operative to energize the letter space selecting magnets EM1, EM2 and EM3. The following will, therefore, be an explanation of the structure resulting in these functions. Each of the selector slides 261 and 262 (Figs. 30 and 31) supports a second tier of bails 286a, 286b, 286c, 286d, 286e and 286f. These bails are supported in notches 287 which correspond in their general nature and function to the notches 275 heretofore described. Associated with certain of the bails 286a–286f, inclusive, are cam surfaces 288 which are permutatively arranged in fashion similar to the cam surfaces 285 described in connection with the punch selection bails.

Since the escapement mechanism of the machine is under the control of three magnets EM1, EM2 and EM3, respectively, of one, two and three units of spacing, it is essential of course that these magnets may be energized singly or in combination to obtain a letter space which is proportional to the unit width of the letter being struck. Accordingly, the bails 286a, 286b and 286c control the closure of bail contacts ECA, ECB and ECC. These contacts are operative during the operation of the machine when the type basket is in lower case position. The bails 286d, 286e and 286f control the closure of contacts ECD, ECE and ECF. These contacts are operative during operation of the machine when the type basket is in upper case position. A switch (Fig. 4) CSC which is operated by the shifting movement of the carriage selects either the lower case contacts ECA, ECB and ECC or the upper case contacts ECD, ECE and ECF depending on the position of the type basket.

*Tape punch and translator clutch*

The operation of the code translator 14 and the operation of the tape punch 15, both to be described presently, is each under the control of an electromagnetic clutch. The clutch as it applies to the translating mechanism is shown in Figs. 33 and 34, while its application to the tape punch is shown generally in Figs. 36 and 60. In each of these instances the electromagnetic clutches are identical in structure, and a specific understanding thereof may be attained by reference to Figs. 33 and 34. In these figures the shaft 289 may represent the cam shaft of either the code translating unit or the tape punching unit. The shaft 289 has provided a pair of bearing hubs 290 and 291 which are adapted for the free rotational support of the drive gear 292 (which may be either the drive gear for the translator unit or the tape punch) the latter having a hub extension 293 in contact with the outer bearing 291. The outer end of the shaft 289 is fitted with a bearing sleeve 294 which is affixed for rotation therewith by means of a set screw 295. The bearing sleeve 294 has an inwardly extending hub 296 of reduced diameter to which is fixed a sleeve 297 by means of a set screw 298. The sleeve 297 anchors one end 299 of a helically wound expansion clutch spring which is wound to surround the inwardly extending gear hub 293, as well as to surround a portion of sleeve 297 which is of the same diameter as the gear hub 293. The opposite end 300 of the clutch spring 301 is anchored on a sleeve 302 which is mounted in a recess formed in the gear hub 293 and in the sleeve 297. The gear 292 is constantly driven while the machine is in operation and its power is transmitted to the shaft 289 because the clutch spring 301 normally grips the gear hub 293.

When it is desired to disconnect the shaft 289 from the gear 292, it is merely necessary to block rotation of the sleeve 302 whereby continued rotation of the sleeve 302 will expand the clutch spring 301 to release its grip on the gear hub 293 and the sleeve 297. The outer peripheral surface of the sleeve 302 has a latch shoulder 303 (Fig. 34) extending in an axial direction thereon, and when this shoulder is engaged by an armature 304 of an electromagent 305, the sleeve 296 is held against rotation. When the magnet 305 is energized, the armature 304 will be attracted thereto, thereby permitting rotation of the sleeve 302 under the influence of the spring 301, contraction of the clutch spring 301 into contact with the gear hub 293 and sleeve 297, and the consequent rotation of the shaft 289 with the gear 292.

The outer peripheral face of the sleeve 294 also has an axially disposed latch shoulder 306 formed thereon which is provided for engagement by a pivoted latch 306a, the latch being pivoted on the magnet yoke 308 by means of a laterally extending pivot pin 309. The latch 306a is normally urged in a clockwise direction by means of a spring 310 which has one end attached thereto and the other end to an anchor pin 311 extending from the magnet yoke 308. By reference to Fig. 33 the foregoing arrangement will be clear as well as the fact that the armature 304 is also pivoted on the pivot pin 309 and that it includes a rearwardly projecting extension 312 to which one end of a spring 313 is attached, the other end thereof being attached to a stud 314 extending inwardly from the magnet yoke 308.

From the foregoing it will be seen that both the armature 304 and the latch 306a are spring pressed into engagement with their respective latch shoulders 303 and 306. It will also be seen that the latch shoulders are so disposed in relation to the direction of rotation of the parts that the armature 304 prevents clockwise rotation of the sleeve 302 while the latch 306a prevents counter-clockwise rotation of the sleeve 294.

When the magnet TCM, as in the case of the translator, or the magnet PCM, as in the case of the punch, is deenergized, the armature 304 will be pulled down into contact with the sleeve 302 and will block rotation of the sleeve as soon as the end of the armature and the latch shoulder 303 come into contact with each other. The momentum of the shaft 289 will tend to cause some additional rotation which would result in recoil were it not for engagement of the latch 306a with the latch shoulder 306. The latch shoulder 306 is so positioned in respect to the end of the latch 306a that engagement between the armature 304 and the latch shoulder 303 is effected before the latch shoulder 306 passes beyond the end of the latch 306a. Afetr the latch shoulder 306 is carried beyond the end of the latch 306a under momentum of the shaft 289, the recoil of the shaft is dampened by engagement between the latch 306a and its related latch shoulder 306 as the shaft begins its retrograde movement under the normal tension of the clutch spring 301. The spring will, therefore, be expanded beyond its normal diameter to hold it free of the drive hub 293.

*Tape punch*

The tape punch 15 which forms an important part of the trial copy recorder (Figs. 35, 36, 37, 38 and 39) is a power driven unit, removably mounted at the left hand rear portion of the main frame 10. A normally stationary rotary cam shaft 315 makes one revolution under control of the magnetically operated clutch hereinabove described and illustrated in Figs. 33 and 44 for each punch cycle. A tape from a supply spool 316 (Fig. 2), removably mounted at the rear of the machine, passes over the top of the punch unit 15, and the holes are punched upwardly at the front of the unit for convenient manipulation and observation of the tape by the operator. The tape is fed for spacing of the holes by a pin wheel during each punch cycle, and the pin wheel may be manually turned to move the tape in either direction. The tape may be easily inserted edgewise into the punch.

The selector contacts SC1 through SC6 select the code holes to be punched in the tape by energizing the associated ones of the six punch magnets PM1 through PM6, which, by attracting their armatures, release corresponding punch lever latches. The seventh punch magnet PM7 is energized automatically when certain circuit conditions prevail, as will be explained later. The punch clutch magnet is jointly controlled by a contact operated by the releasing of any one or more of these latches, and by the common selector contact SCC. During the initial part of the punch shaft rotation, the latches which were released are locked in their released position, and the ones which were not released are locked in their normal position.

As stated hereinabove, the structural details of the tape punch 15 are shown in Figs. 35 to 39, inclusive. As shown, the punch comprises seven vertically arranged code hole punches CP1 to CP7, inclusive, which correspond, respectively, to the seven hole positions of the code system employed. As shown in Fig. 36, the vertical code punches are arranged beneath and in a transverse row across the tape punching station where the coded data is recorded. The punch 15 also comprises a vertically disposed feed hole punch FP which is located between the code punches CP3 and CP4, and which functions during each operating cycle of the punch to punch the relatively small tape feed holes which are located in all record columns of the tape and which are engaged by the tape feed pins.

As shown in Figs. 35 and 37, the code punch CP1 is mounted for vertical reciprocatory movement in spaced aligned guide passages 318 in a fixed guide block 319 and in an aligned die opening 320 in a fixed die plate 321. The lower end of the punch CP1 is pivotally connected in a suitable manner to the right hand end of a related punch actuating lever 322, and the lever 322 is pivoted intermediate its ends on a rod 323 which extends transversely of and forms a part of a punch operating frame 324. The operating frame 324 also comprises spaced side arms 325 joined by a spacing sleeve 326 (Fig. 36) and pivotally supported on a transversely extending stop rod 327 which is suitably fixed at its ends to the punch frame structure. The left hand end of the punch lever 322, as viewed in Fig. 37, engages the top of the stop rod 327 when the punch CP1 is in its normal or inactive position shown. It will be appreciated that the remaining code punches CP2 to CP7, inclusive, and the feed hole punch FP are constructed the same as the punch CP1 and are mounted in the same manner in the guide block 319 and die plate 321 and are connected, respectively, at their lower ends to related actuating levers 322. Such related actuating levers are arranged side-by-side in the frame 324 and are pivoted on the transverse rod 323. The ends of all the levers, which are remote from their punches, rest on top of the stop rod 327 with the punches in their normal or inactive position. A tension spring 328 connects the right-hand end, as viewed in Fig. 37, of each punch operating lever to a fixed flange plate 329 and thereby constantly urges the several code punches and feed punch to their inactive or withdrawn positions shown in the drawings.

As shown in Fig. 37, the lower face of the guide plate 321 is spaced from the upper face of the guide block 319 to provide a passage through which a tape is fed lengthwise from left to right. The tape is further guided in its lengthwise movement across the top of the punch by a guide roller 330, shown in Fig. 35. After being punched, the tape passes over a tape feed sprocket 331 having pins 332 fitting within the feed holes formed by the feed hole punch FP. The sprocket 331 is indexed once for each operating cycle of the punch 15 so as to advance the tape to the next blank record column, as will be explained more fully hereinafter.

The punch 15 comprises an operating cam shaft 315 suitably journalled at its ends in the fixed frame structure of the punch and having a plurality of control cams 333, 334, 335 and 336 mounted thereon. Each revolution of the shaft and the cams thereon effects an operating cycle of the punch and each operating cycle is initiated by engaging a punch clutch 337 (Fig. 36) which is the same as the clutch illustrated in Figs. 33 and 44. The clutch 337 connects the constantly running drive gear 23 with the operating shaft 315 for one revolution of the latter and then disconnects the two and stops the operating shaft 315 in its home or inactive position shown in the drawings. The punch clutch is engaged by the energizing of a punch clutch magnet PCM. The structure and mode of operation of the punch clutch 337 has been described in detail hereinbefore.

The cams 335 and 336 are substantially complementary cams and are engaged, respectively, by followers 338 and 339 which are located in spaced relation, as shown in Fig. 35, on the outer end of an arm 325. The follower 339 is a roller carried by the upper fork 325a of the arm 325 while the follower 338 is a slight projection on the lower fork 325b of the arm 325 (Fig. 37).

From an examination of Figs. 35 and 37, it will be apparent that each time a punch operating cycle is effected by rotating the shaft 315 one revolution counterclockwise, the cam 335 engaging the follower 339 will first move the operating frame 324 upward or counterclockwise about its pivot rod 327, the cam 336 being so shaped as to permit such upward movement. Then, the cam 336 by its engagement with the follower projection 338 will insure movement of the operating frame 324 downwardly under the force of the springs 328, or clockwise, and back to the inactive position shown, the cam 335 being so shaped as to permit such return movement of the frame 324. The identical cams 335 and 336 at opposite sides of the frame 324 insure the even movement of the frame and prevent warping of the frame as it moves up and down. During such upward and downward movement of the frame 324, the rod 323, on which the punch actuating levers 322 are pivoted, is also moved upward and then restored to the position shown. It will be apparent that if, during such movement of the rod 323, the left hand ends of all punch actuating levers 322 are not held down against the stop rod 327, such actuating levers will be moved by the rod 323 clockwise about their pivotal connections with their related punches, the springs 328 being sufficiently strong to hold their right hand ends stationary. On the other hand, if the left hand end of any one of the punch actuating levers is held down against the fixed rod 327, the upward movement of the rod 323 will then effect a counterclockwise movement of the lever, or levers, so held, about the stop rod 327 as a pivot and, in so doing, the punch connected to each lever so held will be moved upward against the force of its spring 328 and through the tape, thereby punching a code hole in the corresponding code position of the tape, in the case of the code punches, and punching a feed hole in the tape in the case of the feed punch.

In the construction shown the lever 322 corresponding to the feed punch FP is permanently held down against the stop rod 327 by the outer end of an arm 340 (Fig. 35), the arm 340 being fixed at its other end to a fixed frame member 341. Thus, for each revolution of the shaft 315, a feed hole will be punched in the tape in the manner explained. The code designations are punched in the tape by the selective latching against the stop bar 327 of the adjacent ends of those actuating levers which are connected to the code punches corresponding to the code positions where it is desired to punch the code holes. Selective latching of the left hand end, as viewed in Figs. 35 and 37, of the seven code punch actuating levers 322, against the stop rod 327, is effected, respectively, by the selective releasing of seven corresponding latch levers 342. The releasing of the seven latch levers is controlled by the selective energization of the seven corresponding punch magnets PM1 to PM7, inclusive.

The seven latch levers 342 are arranged in side-by-side relation and are pivoted on a transverse fixed rod 343. The upper ends of the seven latch levers extend, respectively, through corresponding slots 344 of a comb plate 345 fixed to the frame member 341, and such latch levers are aligned, respectively, with the adjacent ends of their respective code punch actuating levers which also extend through the corresponding slots 344. The seven latch levers are each urged clockwise as viewed in Figs. 35 and 37 by tension springs 346 connecting, respectively, projections on the latch levers and the flange of a transverse fixed frame plate 348 (Fig. 35). In the normal or inactive position of the parts as shown, each latch lever 342 of the group is held against clockwise movement by its upper pointed end 349 engaging the right hand end of a latching notch 350 cut in the under face of the pivoted armature 351 of its related selector magnet of the group PM1 to PM7, inclusive. A tension spring 352 holds each armature in the position shown.

When any one of the punch selector magnets of the group PM1 to PM7, inclusive, is selectively energized, in a manner which will be explained hereinafter, its related armature 351 is attracted and moves upward, thereby releasing its related latch lever 342, and the latter is then moved by its spring 346 clockwise as viewed in Figs. 35 and 37, and to a point where a latching notch 353 on the released latch lever engages over the left hand end of its related punch actuating lever, and thereby holds such engaged punch actuating lever down against the stop rod 327 so that upon subsequent rotation of the operating shaft 315, the cams 335 and 336, through the frame 324 will cause the right hand end of such punch actuating lever to move its related code punch of the group CP1 to CP6, inclusive, upward and punch a code hole in the corresponding code position of the tape, in the manner previously explained.

The selector magnets PM1 to PM7, inclusive, are disposed in staggered relation as shown in Fig. 35 so that such magnets and their armatures are aligned with their related latch levers. The armatures of adjacent selector magnets overlap at their outer ends so that their latching notches 350 are aligned in a transverse horizontal plane when the parts are in the inactive position shown.

During each operating cycle of the punch 15, a cam 354 (Fig. 36) on the punch operating shaft 315 functions to lock those latch levers which have been tripped by their related selector magnets, and also functions to lock the untripped latch levers in their inactive positions so that they cannot interfere with the punching during the same cycle of the selected code combination by the tripped levers. To this end, a latch lock bail lever 355 is rotatably mounted on a transverse rod 356 suitably fixed to the frame structure of the punch and includes a follower arm 357 carrying a roller 358 which is constantly urged against the face of the cam 354 by a tension spring 359 (Fig. 35) connecting the arm 357 with a suitable fixed part (not shown) of the punch frame. The bail lever 355 carries a locking bail 360 extending transversely across the spear-shaped ends 361 of arms 362, the latter being integrally formed, respectively, with the six latch levers 342. As the latch levers 342 are released by their associated magnets, the cams 354 and spring 359 move the locking bail 360 counterclockwise, as viewed in Fig. 37, and toward the ends 361 of the levers 342. As a result of such movement, the locking bail 360 will pass beneath the points of the ends 361 of any untripped latch levers and will engage the lower inclined surfaces thereof and thereby lock such untripped levers in their inactive positions. The ends 361 of any latch levers which have been previously tripped will then be so positioned that the locking bail 360 will pass above the points of such ends and will engage the upper inclined surfaces thereof and thereby lock any such tripped levers in latching relation with respect to their related punch actuating levers.

The cam 363 (Figs. 36 and 38) is the tape feed cam and it functions during each punch operating cycle to advance the tape feed sprocket 331 and tape an amount sufficient to move the punched record column out of punching position and to move a blank record column into punching position. A lever arm 364 carrying a follower roller 365 engaging the feed cam 363 is pivoted to a suitably fixed stud 366 and it has pivoted to its right hand end a feed pawl 367. A stud 368 on the pawl 367 engages an edge of the lever 364 and a tension spring 369 connects the stud 368 and a fixed pin 370 on the lever arm 364. A tension spring 371 urges the follower 365 upward and against the face of the feed cam 363. A ratchet wheel 372 is fixed to the tape feed sprocket 331 and is adapted to be engaged by the upper end of the pawl 367, when the latter is moved upward. It will be apparent that when the punch shaft 315 to which the cam 363 is fixed rotates, thereby rotating the cam 363 counterclockwise so that the roller 365 comes into contact with the high portion of the cam 363, the arm 364 will move the pawl into the path of the teeth of the wheel 372 and then downward into engagement with a tooth of the tape feed ratchet 372 and thereby index such ratchet and tape feed sprocket clockwise when the cam 363 again allows the arm 364 to rock in a clockwise direction about its pivot 366.

A detent lever 373, pivoted on a pivot stud 374, carries a detent roller 375 which is adapted to engage the teeth of a detent gear 376 which is fast on the shaft of the tape feed sprocket. Spring 377 keeps the detent roller 375 in contact with the teeth of the detent gear 376 and thereby stabilizes the operation of the tape feed mechanism.

Immediately after a punching operation the latch levers are restored to their inactive or latched positions shown where they are held by the latching notches 350 of the armatures 351 of their related magnets of the group PM1 to PM6, inclusive. This is effected by a restoring bail 378 (Figs. 35 and 39) extending across the lower side of the right hand arms 362 of all latch levers 342. The bail 378 is formed integral with an arm 379 and the latter is fulcrumed at one end on the fixed rod 343 and is adapted to be engaged at its other and outer end by an eccentrically mounted roller 380 extending between and fixed at its ends to the tape feed cam 363 and the locking bail cam 334. During the mid-part of the punch cycle, the locking bail 360 having been restored to ineffective position, the eccentric stud 380 engages the outer end of the lever arm 379. As a result, the arm 379 and bail 378 are moved counterclockwise about the rod 343. Thus, the bail 378 engages any previously tripped latch levers 362 and moves them counterclockwise and slightly past the latching position shown in Figs. 35 and 37. In moving the previously tripped latch levers past their latching position, the bail 378 will also engage and move the remaining or untripped latch levers counterclockwise. As the latch levers are thus moved counterclockwise, one of the levers engages a bail element 381 forming a part of a knock-off bail lever 382 which is pivoted on a rod 383. The knock-off lever 382 also includes a second bail element 384 which is arranged above and extends across the outer ends of all armatures 351 of the punch magnets PM1 to PM7, inclusive. Thus, the lever 381 is rocked clockwise and the bail element 384 thereof will engage and release any of the armatures 351 that may be stuck with the result that all armatures will be positioned against the ends 349 of their related latch levers and held there by their related springs 352. The restoring bail 378 is then permitted by the further rotation of the eccentric roller 380 to return to the position shown, and in so doing the springs 346 move their respective latch levers 342 clockwise until their upper pointed ends 349 again engage the right hand wall of the notches 350 in their related armatures and are thereby held in latched position.

Provision has been made for disabling the tape punch in case of abnormal condition of tape being punched therein, as for example, tape failure or excessive tape tension. Furthermore, the disabling mechanism includes a connection to a tape hold-down plate which cooperates with the tape feed sprocket so that the punch will be disabled should for any reason the hold-down plate be moved away from the tape feed sprocket.

Specifically, a tape hold-down plate 385 is mounted to cooperate with the tape feeding sprocket 331. The hold-down plate 385 has an arcuate portion which is adapted to overlie a segment of the tape feeding sprocket which serves to guide the tape about the sprocket. The plate 385 is carried by a lever 386 which is pivoted on a stud 387 extending from a wall of the punch frame. The lever 386 has a pin 388 extending from a face thereof, and this pin anchors one end of a spring 389. The spring 389 is looped and has its opposite end anchored at a fixed pin 390 which extends from one of the walls of the punch. The pivot points of the spring 389 are so arranged as to cause the spring to exert an over-center action against the lever 386. Consequently, when the lever 386 is moved in a clockwise direction about its pivot 387, the spring 389 will cause the lever to have a positive action as it approaches its limit of movement in a clockwise direction, and it then exerts a force on the lever to hold it open. In the counterclockwise movement of the lever 386, a similar action results from the spring 389 whereby the arcuate portion of the hold-down plate 385 is held against the feed sprocket 331. The lower end of the lever 386 has pivoted thereto a rearwardly extending arm 391 which by means of a slot 392 at its opposite end is connected with a stud 393, the stud being located in a downwardly projecting portion of a curved lever 394. The lever 394 is mounted for rocking movement about a pivot pin 395, and its free end 396 includes a laterally bent arm which is adapted to lie in contact with the upper surface of a tape passing through the punch. The lever 394 is connected by means of a pin 397 with the slot of a rearwardly extending lever 398. The connecting slot in the lever 398 affords a limited amount of lost motion between the lever and the pin 397. The rear end of the lever 398 is connected by means of a pin 399 to a bail lever 400. The bail lever 400 is mounted for rocking movement about a pivot pin 401 extending from the lower rear corner of the punch frame. The bail lever 400 has a transversely extending cross member 402 which terminates in a downwardly extending arm 403 which is apertured to embrace the pin 401. A forwardly extending arm 404 of the bail lever is connected to a flexible contact carrying leaf 405 whereby rocking movement of the arm 404 will make and break a contact PTC.

The tape guide roller 330 is carried by an upstanding lever 407 which is also pivoted on the pin 401 at the rear lower corner of the punch frame. The lever 401 has a laterally extending bail 408 which extends over the rear edge of the bail lever 400, the arrangement being such that clockwise rocking movement of the upstanding lever 407 about the pivot pin 401 will engage the left hand end of the lever 398 connected to lever 400 and rock the lever 400 in a clockwise direction as viewed in Fig. 35. This rocking motion of the bail lever 400 is possible by virtue of the pin and slot connection at the forward end of the lever 398. The upstanding lever 407 is normally urged in a counterclockwise direction by a spring 409 which connects the lower end of the lever with a fixed frame member. The lever 394 is urged in a counterclockwise direction about its pivot pin 395 by a spring 410 which interconnects that lever with a pin carried by a fixed frame member.

It will appear from the foregoing that when the hold-down plate 385 is rocked away from the tape sprocket 331 by moving the same in a clockwise direction about its pivot 387, the lower end of the lever will force the rearwardly extending arm 391 toward the rear of the punch until the forward end of the slot 392 engages the stud 393. When the arm 391 has engaged the stud 393, the lever 394 will be rocked about its pivot 395, thereby pulling forward on the lever 398 and thereby effectively rocking the bail lever 400 about its pivot 401. The clockwise movement of the bail lever 400 and its associated arm 404 will serve to open the contact PTC. Furthermore, when the tape hold-down plate 385 is rocked away from the sprocket 331, the plate 396a will be lifted and thereby positioned so that a tape may be readily inserted in the punch. It will appear, therefore, that a controlled circuit to the punch may be opened when the hold-down plate is rocked away from the tape feed sprocket 331. Should the supply of tape under the free end of the lever 394 for any reason fail, the lever 394 will drop under the influence of its spring 410, rocking about its pivot pin 395 in a counterclockwise direction. This likewise will exert a pull on the rearwardly extending lever 398 and cause the opening of the contact PTC in manner similar to that described before. The tension of the tape in contact with the tape roller 330 is normally insufficient to overcome the tension of the spring 409. Should, however, the tension in the tape be increased to the point where the lever 407 is rocked in a clockwise direction about its pivot pin 401 and against the tension of the spring 409, the bail 408 of the lever 407 will operate the bail lever 400 as described and rock the latter in a counterclockwise direction, thereby breaking the contact PTC.

*Tape hole counter*

The trial copy recorder (Fig. 1) is provided with a hole counter 600 which is adapted to count the holes being punched into the tape so as to insure that a minimum amount of tape will be punched for each line. It will appear from a consideration of the duplicate tape reader which is used in connection with the justified copy reproducer (Fig. 1a) that the distance between the reading stations in said reader is substantially three inches. It is important that the justification code designations for a line be read in the justification code reading station before the character code reading station begins to read the print code for such line. For this reason a minimum amount of tape, i. e. substantially three inches, containing at least thirty columns of perforations must be provided. The hole counter 600 controls the foregoing function in connection with the tape punch.

Figure 40:
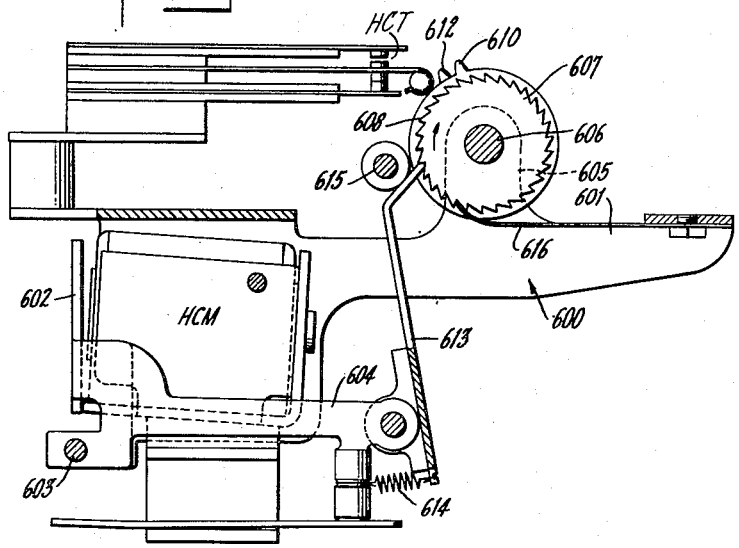
Fig. 40 is an elevational view, parts being in section, of a hole counter used in connection with the tape punching operation of the trial copy recorder.
Figure 40A:
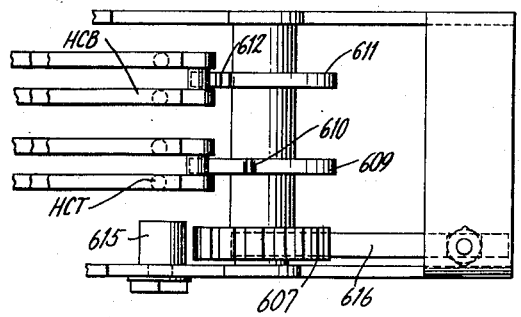
Fig. 40a is a plan view of the hole counter of Fig. 40.
Figure 55:
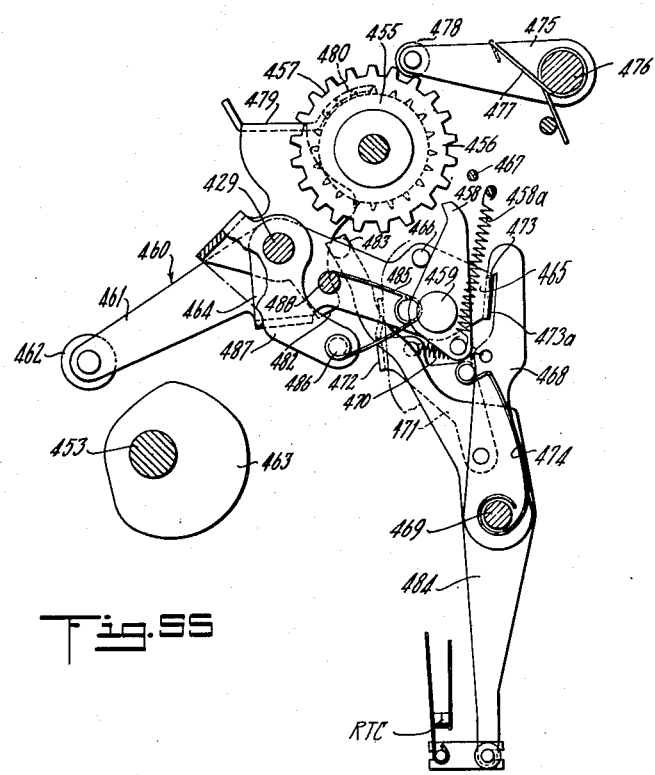
Fig. 55 is a detail view of the mechanism for feeding tape through the tape reader on line 55—55 of Fig. 53.

The hole counter is illustrated in Figs. 40 and 40a, and it comprises in general a stepping switch which is rendered operative to count the first 27 holes that are punched into the tape. A frame 601 supports a control magnet HCM which is connected to the punch clutch magnet. The armature 602 of the magnet HCM is pivoted on a pin 603 and includes a forwardly extending arm 604. A forwardly disposed portion of the frame 601 has a pair of upstanding lugs 605 into which is journalled a shaft 606. The shaft has fixed to one end thereof a ratchet wheel 607 which has 30 equally spaced teeth 608 in the periphery thereof. The shaft 606 has fixed thereto a cam 609 having a single lobe 610 which is adapted to operate a pair of contacts HCT. There is a second cam 611 fixed to the shaft 606 and this latter cam has a single lobe 612 which is positioned to follow the cam lobe 610 the distance of one ratchet wheel tooth. The lobe 612 is adapted to operate a pair of contacts HCB.

The forwardly extending portion 604 of the armature has pivoted thereto a pawl 613, the free end of which extends into contact with the ratchet teeth 608. The pawl is held against the teeth of the ratchet wheel by the conjoint action of a spring 614, and a stop lug 615. A detent 616 which cooperates with the teeth of the ratchet wheel 607 prevents reverse rotation of the wheel.

Following each energization of the magnet HCM, the ratchet wheel 607 will be moved in a clockwise direction the space of one tooth. The cam lobe 610 is arranged to transfer its contact HCT at the 27th punching cycle and to release the contact at the 28th punching cycle. The lobe 612 is arranged to transfer its contact HCB at the 28th punching cycle and to release the contact at the 29th punching cycle. When the cam 609 operates the transfer contact HCT the related circuit functions to stop further automatic stepping of the counter in response to punch operation and conditions a circuit which is effective after operation of the J carriage return switch, as well appear more fully hereinafter, to punch an interlocking code (the 7 hole). When the cam 611 operates its transfer contact HCB it causes punching of the justification control code, i. e. the 7 and 6 holes and the 1 and 5 holes in various combinations, and when the contact is released by further rotation of the cam at the 29th step it controls the punching of the carriage return code.

*Justification code computer*

The trial copy recorder has embodied therein a justification code computer illustrated in Figs. 41 through 48 of the drawings which operates to select one of 30 different justification control codes in accordance with the number of units a trial line is shorter or longer than the desired justified length and in accordance with the number of word spaces in the line. The mechanism is mounted as a unit within the frame at the rear of the carriage to coact with a computer code bar assembly mounted on the carriage. The justification control information is in the form of a five unit code and accordingly there are five sets of contacts JC1, JC2, JC3, JC4 and JC5 (see also Fig. 43). Each set of contacts has an associated vertical contact arm 637 and a horizontal seeker 638 is pivoted to the upper end of each contact arm by means of a pivot stud 639. The movable contact spring 640 of each set of contacts is formed with a tension in a direction tending to close the JC contact points, but a bail 641 extending across the five contact arms 637 normally holds the contact points open against the force of the springs 640.

A seeker bail 642 determines the angular position of all five of the seekers with respect to their contact arms. The seeker bail 642 extends laterally under the five seekers and is engaged by each of them by a hooked portion 643. The seeker bail 642 is designed to permit horizontal sliding movement of the seekers and therefore the seekers rest freely on the top of the bail.

The seeker bail 642 is indexed from its normal or zero position upwardly to eight different positions by a stepping magnet JSM mounted on the frame 645. The stepping magnet JSM is energized by the word spacing mechanism of the trial copy recorder so that the seekers are elevated one position for each succeeding word space.

The indexing mechanism is best shown in Fig. 43 of the drawings wherein the pivoted armature 646 has a rearwardly extending arm 647 to the rear end of which is pivoted a connecting link 648 by means of a pivot stud 649. The depending end of the connecting link 648 is pivoted to an indexing arm 650 by means of a pivot stud 651. The indexing arm is mounted for rocking movement on a flanged frame member 652 by means of a pivot shaft 653. It will follow, therefore, that whenever the armature 646 is attracted by the magnet JSM, the rearwardly extending arm 647 of the armature structure will be elevated with the consequent elevation of the indexing arm 650. The movement of the indexing arm 650 is transmitted to the seeker bail 643 by means of a pawl 654 which has a pivotal connection 655 on the end of the indexing arm 650. The pawl 654 has an inturned upper end 656 which is adapted to engage the teeth of a segment 657 at the outer end of a bail supporting and operating arm 658, the opposite end of the arm 658 being pivoted on a pivot screw 659 supported in an upstanding lug 660 formed at the end of the flanged frame member 652. A guide block 661 maintains the free end of the pawl 654 in alignment with the tooth segment 657 and a spring 662 interconnecting the pawl and the operating arm 650 maintains the pawl in operative position.

It will follow from the foregoing that each time the magnet JSM is energized, the pawl operating arm 650 will be rocked in a counterclockwise direction about the pivot rod 653 and the pawl 654 will thereby be rocked into contact with the tooth segment 657 and elevate the bail supporting and operating arm 658.

The opposite end of the frame 652 pivotally supports a holding ratchet 663 to which the end of the bail 642 is attached. The holding ratchet 663 constitutes an arm 664 which is pivoted by means of a pivot screw 665 to an upstanding lug formed in the channel frame member 652. The free end of the holding ratchet arm 664 has a toothed segment 667 similar to the segment 657. The teeth of the segment 667 are adapted for engagement by a detent 668 which is attached to and extends upwardly from the armature 669 of a release magnet JRM. The armature 669 is pivoted to the top of the horizontal portion 671 of the frame 645 and it includes an upstanding lug 672 which is connected by means of a spring 673 to a lug 674. The spring 673 is tensioned to hold the free inbent end of the detent 668 in contact with the teeth of the segment 667. As a consequence of this arrangement each time the holding ratchet arm 664 is indexed upwardly, the spring 673 will engage a tooth of the segment and hold the arm in its adjusted position. Release of the holding mechanism follows energization of the magnet JRM which effectively attracts the armature 669 and rocks the same about its pivot in a counterclockwise direction. The pivot shaft 653 has mounted thereon a switch arm 673a which controls contacts SSC which when opened will prevent further upward indexing of the seeker bail 642. The switch arm 673a is mounted for rocking movement on the pivot shaft 653 and an arm 677 thereof extends generally parallel to the holding ratchet arm 664. An upstanding link 678 is pivoted to the arm 677 by means of a pivot pin 679. The upper end of the upstanding link 678 is slotted to engage a pin 680 extending laterally from the side of the holding ratchet arm 664. As a result of this connection, the contact SSC will be separated when the seeker bail 642 moves to its highest intended position shown in Fig. 47. A stop lug 681 is located under the arm 677 and limits its downward movement. When the seeker bail 642 is released the bottom of the slot in the upstanding link 678 limits the movement of the bail in a clockwise direction by engaging the adjusting screw 677a with the stop lug 681.

Pivoted on the pivot shaft 653 at the end of the channel-shaped frame member 652 on which the seeker indexing arm is located is a bracket structure 682 which is generally U-shaped, and supports on the inner leg of the U a contact operating arm 683 which controls a pair of contacts JZC in the circuit of an indicating signal such as a lamp. The contact arm 683 is under the control of an operating arm 685 which is pivoted on a pin 686 extending from the face of the bracket structure 682. The operating arm 685 is connected to the bail supporting and operating arm 658 by means of a link 687. It will thus appear that whenever the arm 658 is indexed upwardly, the operating arm 685 will follow its movement. The operating arm 685 includes a nose 688 which extends through a vertical slot in a face plate 689.

A small cam 690 is mounted on the code bar assembly to move with the carriage, and this cam coacts with the nose 688 of the operating arm 685 to close the contact points JZC during certain zones of movement of the carriage depending on the number of word spaces in the line. In other words, the greater the number of word spaces the greater will be the range of positions of the carriage in which justification can be accomplished. Accordingly, the zone cam 690 on the carriage is arranged to hold the contacts JZC closed through a maximum of 30 units of travel of the carriage when there are eight or more word spaces and to close the contact at one position only when there is only one word space. All intermediate numbers of word spaces will hold the contact closed a proportionate number of units of travel of the carriage. Because of these requirements the zone cam 690 is generally triangular in shape and has formed in the angular face of the same cam surfaces 691 which are adapted to be engaged by the nose 688 of the operating arm 685. When this engagement takes place, the operating arm 685 is cammed in the direction of its length whereby the bracket structure 682 and the contact arm 683 are moved in a counterclockwise direction about the pivot shaft 653 to close the contacts JZC.

The contacts will remain closed to give a signal so long as the nose 688 of the operating arm 685 is in contact with the face of the cam 690. It will be observed by reference to Fig. 42 that the face surface of the cam 690 presents an angular area which increases in width from bottom to top. Consequently, as the operating arm 685 is indexed upwardly as word spaces are put into the line being written a wider surface of the cam will be presented to the nose of the operating arm. The signal, herein a lamp JZL, remains energized during the time that the nose of the operating arm travels across the face of the cam. The manner in which the cam derives its shape is taught in the code chart of Fig. 50.

The five seekers 638 and their associated contacts and contact levers are spaced horizontally one inch apart so that a code bar assembly 693 five inches in length (Fig. 42) mounted on a carriage frame 692 has five one-inch sections S1, S2, S3, S4 and S5 associated with the seekers, one such section being associated with each one of the seekers. Each one-inch section of the code bar assembly 693 has nine vertically spaced fields at levels corresponding to zero and the eight stepped positions of the seekers. Each level (except zero) and each section of the code bar assembly is notched at certain points to allow forward movement of the seekers under the force of their contact springs to an extent to allow the contact points to close. The remaining portions of the code bars which are not notched restrain forward movement of the seekers to prevent closing of the contact points. Thus, each horizontal unit space of each section and each level of the code bar assembly is either notched or not to control the operation of all five contacts JC1 through JC5, according to the horizontal position of the carriage and the vertical position of the seekers. In this manner, a code may be set up which is the quotient of the unit shortage in a line divided by the number of word spaces in the line. The face of the cam 690 and the face of the code bars 693 are convexed to accommodate the arc of the operating arm 685 and the seekers 638, respectively.

During the typing of the trial line the seekers do not contact the code bars and consequently do not interfere in any way with the carriage movement. This is because the previously mentioned bail 641 extends across the contact arms and normally holds the contact points open and also holds the seekers withdrawn from the plane of the code bars on the carriage. An electromagnet JCM is provided for moving the bail 641 at the end of a trial line so that the noses 695 of the seekers are all allowed to move through their respective slots in the plate 689 and into cooperative relation with the code bars whereby some seekers are stopped by the face of the code bars while others move into notches and allow their contacts to close. In this manner the contacts are closed in various combinations representing the quotient of the unit shortage in a line divided by the number of word spaces in such line. The magnet JCM is energized following the closure of the J carriage return switch. The specific manner in which the magnet JCM controls the bail 641 is best shown in Fig. 45, wherein it is seen that the armature 696 of the magnet JCM (which in this case includes two magnet coils for furnishing the required power) is pivoted on the horizontal portion 671 of the frame 645 and includes an upstanding arm 697 to which is pivoted a bail operating lever 698. The bail operating lever 698 is pivotally connected to a bracket 699 by means of eccentric pivot 699a. The bracket 699 is secured at the central portion of the bail 641 which has ears formed at each of its end portions whereby it is mounted to turn about shaft 653. The bracket has an upstanding lug 700 to which is fixed one end of a spring 701, the other end of the spring being attached to the flange of the frame member 652. It will be seen, accordingly, that the spring 701 will hold the bail 641 against the contact arms 637 and since the tension of the spring 701 is greater than the combined pressure of the contact springs 640, the contacts will be held open. When, however, the J carriage return switch is closed, the magnet JCM will be energized and its armature 696 will be attracted to the core of the magnet whereby the arm 697 will be rocked in a clockwise direction. This action will result in a forward pull on the bail operating lever 698 which is sufficiently strong to overcome the tension of the spring 701 with the result that the bail 641 is withdrawn from contact with the contact operating arms 637. The contact springs 640 of the five JC1 through JC5 contacts will project their associated seekers 638 into operative contact with the code bars 693. Thereafter, the seekers are immediately withdrawn and the bail release magnet JRM will be energized to rock the detent 668 out of contact with the tooth segment 667 whereby all the seekers are against restored to their normal or zero position. The forwardly projected position of the seekers is indicated in Fig. 48 wherein one seeker is shown to be in a depression of its associated code bar section and a second seeker is shown to be in contact with the face of its associated code bar section. This results in the closure of the contacts controlled by first seeker and in the maintenance of the open condition of the contacts controlled by the second seeker.

*Tape punching circuits*

In order to operate the tape punch, the Punch On switch must be pressed, and with the switch in this position, the key levers of the trial copy recorder cannot be operated unless there is a supply of tape properly inserted in the punch. This is because the key lever lock magnet KLM must be energized to allow key lever operation, and with the punch switch on, the energizing circuit for magnet KLM includes the punch tape contact PTC. This contact PTC is in the tape punch unit and is closed only when there is tape in the punch and there is not excessive tension on the tape between the punch and the tape supply spool. A contact closed when the punch switch is off allows the key lever lock magnet to be energized regardless of whether the contact PTC is open or closed.

All circuits controlling the punching of the tape include the tape contact PTC, the contact points closed by punch switch in its "on" position and the normally closed points of the punch lock contact PLC. The contact PLC is operated momentarily during the first part of the cycle of operation of the tape punch, and the normally closed points of contact PLC are tungsten circuit breakers provided to eliminate arcing from other contact points in the circuit.

In feeding tape through the punch by punching only the small feed holes, the tape feed switch lever is pressed to close the normally open points of this switch and energize the punch switch magnet PCM. This will cause continuous cycles of operation of the punch as long as the tape feed switch is held depressed even though the energization of magnet PCM is momentarily interrupted each cycle by the operation of contact PLC.

In the automatic operation of the tape punch by the recorder through the code selector, the selector common contact SCC is operated by every selector slide, and the closing of these contact points establishes a circuit to the common side of all the selector code contacts SC1, SC2, SC3, SC4, SC5 and SC6. This circuit includes the previously mentioned normally closed points of contact PLC and also the normally closed points of a transfer contact on an anti-repeat relay ARR. This circuit further extends from these normally closed points of the relay transfer contact through another normally closed contact on relay ARR to the punch clutch magnet PCM. Thus, the punch clutch magnet is energized and the closing of certain ones of the selector code contacts according to the particular slide which is operated causes energization of the corresponding punch code magnets PM1, PM2, PM3, PM4, PM5 and PM6 to which the selector code contacts are respectively connected.

As the punch operates, the transfer contact PLC is operated to close its normally open points and complete a circuit for energizing relay ARR and the operation of contact PLC also breaks the energizing circuit for the punch clutch magnet and the punch code magnets. The contacts PLC returns to its normal position at about mid-point in the punch cycle, and in this return movement, the movable contact engages the normally closed points before breaking the normally open points. Thus, if the selector common contact SCC is still closed, the anti-repeat relay ARR is held energized through the normally open points of its own transfer contact, and will remain energized as long as contact SCC remains closed to prevent energization of the punch magnets even though contact PLC has returned to normal. This prevents a repeat operation of the punch regardless of how long the selector contacts are held closed.

A code relay CR is used for deleting a code in the tape and also for punching a stop code. This relay is provided with seven normally open contacts, and is energized by pressing either the code delete switch or the stop code switch. When the code delete switch is pressed, a circuit is established through the normally closed points of the tape feed switch contacts, and through a normally open contact of relay CR to the two movable contacts of relay ARR the same as when the selector common contact SCC is closed. This energizes the punch clutch magnet PCM through the normally closed contact of relay ARR, and also energizes the punch code magnets P4, P5 and P6 through three normally open contacts on relay CR which are all connected to the normally closed points of the transfer contact of relay ARR the same as selector contacts SC4, SC5 and SC6. At the same time, punch code magnets P1, P2 and P3 are energized through respective normally open contacts of relay CR which are all connected through another normally closed contact on relay ARR and through normally closed points of the transfer contact operated by the stop code switch.

Thus, the pressing of the code delete switch causes a punch operation in which all the six code holes are punched the same as if a selector slide were operated to close all the six selector code contacts. However, only one punch cycle will occur regardless of how long the code delete lever is held depressed. This is because the anti-repeat relay ARR will be energized during this punch cycle and will be held energized through the normally open contact of relay CR as long as the switch is held depressed in the same manner as relay ARR is held energized through the selector common contact SCC.

However, if it is desired to rapidly delete a series of codes without pressing and releasing the delete switch once for each code, both the delete switch and the tape feed switch may be pressed simultaneously. These two switches are located adjacent each other in the front panel and both may be easily pressed by placing the finger in a position to overlap both switch levers. This simultaneous operation of the two switches causes the punch to punch all six holes in the tape, but as the normally closed points of the tape feed switch are now open, the holding circuit for relay ARR is open and the relay is deenergized at the end of each punch cycle. This permits the punch to operate continuously and punch code delete holes as long as both switches are depressed.

In punching a stop code into the tape, the stop code switch only is depressed. This energizes relay CR by closing the normally open points of the stop code switch to cause a single cycle of operation of the punch and to hold relay ARR energized as long as the switch is held depressed. The circuits for accomplishing this single punch cycle are the same as when the code delete switch is pressed. However, when the stop code switch is pressed, the normally closed points of this switch are opened to prevent energization of punch code magnets P1, P2 and P3. Thus, only punch code magnets P4, P5 and P6 are energized to punch the stop code into the tape.

A punch common contact PCC on the tape punch is connected in parallel with the selector common contact SCC in the energizing circuit for the punch clutch magnet PCM. This contact PCC is closed whenever any one or more of the punch lever latches is tripped by energization of the associated ones of the punch code magnets. The closing of contact PCC will cause a punch cycle to occur by energizing magnet PCM regardless of whether or not the selector contact SCC is closed. Contact PCC thus acts to insure an operation of the punch in the event the selector contact SCC is closed for a short interval which is sufficient to trip the punch lever latches but insufficient to engage the clutch.

The space bar is marked "Justifying Space" in the trial copy recorder, and its operation closes a word space contact WSC operated by the space bar selector slide. This contact WSC energizes the magnet JSM on the justification code computer, which is the magnet that steps the seekers upwardly each time the word space contact is closed. If a line contains more than eight word spaces, a contact SCC on the computer opens at the eighth stepped position of the seekers so that further operation of contact WSC during that line does not energize magnet JSM.

In addition to the justifying space bar, the recorder is provided with a one unit space key lever and a three unit space key lever. Operation of these keys causes corresponding carriage spacing movements but does not energize magnet JSM. These one and three unit keys are called fixed space keys because they select codes causing operation of similar keys on the justified copy reproducer which cause the same carriage spacing as on the trial copy recorder and is not altered for justification as is the extent of spacing resulting from operation of the space bar.

As each line is typed on the trial copy recorder, the number of codes punched in the tape is counted by the tape hole counter. The tape hole counter as pointed out before is provided to insure that a sufficient length of tape is punched for each line of copy for proper operation of the double reader on the justified copy reproducer. The tape hole counter is essentially a stepping switch mechanism using a magnet HCM to index a rotary shaft through a pawl and ratchet mechanism. The magnet HCM is momentarily energized once each punch cycle through the selector common contact over a circuit connecting the magnet HCM in multiple with the punch clutch magnet through a normally closed contact of relay ARR and the normally closed points of a transfer contact HCT of the counter mechanism.

When a line has been typed to a length which, in consideration of the number of word spaces, allows for justification upon retyping, the justification zone contact JZC on the computer is closed as previously described. This contact closes an energizing circuit for an indicating lamp JZL which is positioned at the rear of a translucent lens at the front of the machine. This gives a visual indication to the operator that, if the trial line is ended while this light is energized, the line may be justified when retyped on the justified copy reproducer. This justification zone light always is lighted for some distance short of the O point on the special carriage scale provided on the trial copy recorder, and this scale assists the operator in knowing whether or not to type additional letters after the light is first lighted. The lamp JZL will stay energized by contact JZC as long as the line can be justified but will be deenergized if the operator types beyond a point permitting justification. The justification zone of course varies with the number of word spaces but lines having eight or more word spaces may be expanded up to twenty-two units or contracted as much as seven units.

In order to end a line on the trial copy recorder, the operator merely presses and releases the J carriage return switch on the front panel of the machine which causes first a number 7 code to be punched in the tape and then causes a justification code to be punched and, finally, causes the carriage to be returned automatically. The apparatus in the recorder functions in response to operation of the J carriage return key in the following sequence.

1. When the J carriage return switch is pressed, relay ICR is energized by the closing of the contacts of the switch. Upon release of the J carriage return switch a holding circuit becomes effective to maintain ICR energized through its normally open contacts and a circuit is then established upon the closing of the normally closed contacts of the J carriage return switch and a set of normally open contacts of relay ICR and normally closed contacts of relay JCR to cause punching of a number 7 code hole in the tape providing at least 27 code holes have previously been punched in the tape for that line. The above circuit is completed (if 27 or more holes have been punched in the tape) through the hole counter contacts HCT in their transferred position to energize the punch magnet PM7. This causes a cycle of operation of the tape punch in this instance by energizing the punch clutch magnet PCM through the punch common contact PCC, as previously described in connection with the tape punch. If less than 27 holes have been punched during typing of that line, the contacts HCT will be in normal position and punch magnet PM7 will not be energized upon releasing the J carriage return switch. In this case the releasing of the switch establishes another circuit through contacts HCT in normal position for energizing the punch clutch magnet PCM. This causes operation of the tape punch to punch feed holes in the tape and step the hole counter until the contacts HCT are operated after the 27th step. This operation of contacts HCT stops the punch operation and causes punching of the number 7 code in the tape as previously described. Simultaneously with the energization of magnet PM7 to cause punching of the number 7 code hole, magnet HCM becomes energized over the circuit including the same contacts of relays ICR and JCR and the normally closed contact of relay ARR.

During this cycle of operation of the tape punch to punch the number 7 code hole, relay ARR is energized through contacts PLC, thereby deenergizing magnet HCM to allow indexing of the counter cam to its 28th position. This restores contacts HCT to reconnect magnet HCM to punch magnet PCM so that the counter will again follow the operation of the tape punch in the manner previously described.

Also when relay ARR is energized, to index the counter cam to its 28th position, contacts HCB are transferred. Relay ARR becomes deenergized during this punch cycle, whereupon a circuit is established for energizing relay JCR through a normally closed contact on relay ARR and normally open contacts on relay ICR.

2. Energization of relay JCR now energizes the computer contact operating magnet JCM to select the justification code to be punched in the tape during the next punch cycle providing the carriage is in the justifying zone to close contacts JZC and complete a circuit through normally closed contacts of relay LDR, normally open contacts of relay JCR and normally closed contacts of relay CRR. The energizing circuit for the punch clutch magnet PCM includes the normally open points of a transfer contact of relay JCR, and the normally closed contact of relay ARR. The punch code magnet PM6 is also energized over the same circuit up to the contacts of relay ARR, and, in this case, the circuit for the code magnet passes through the normally closed points of the transfer contact of relay ARR and through normally open contacts on relay JCR. This same circuit also energizes code magnet PM7 through a normally closed contact of relay CRR and another normally open contact of relay JCR. Likewise it will be noticed that a common side of all the computer contacts JC1, JC2, JC3, JC4 and JC5 is connected to this circuit so that when any one or more of these contacts close, the associated punch code magnets are energized. Thus, if the justification zone contact JZC is closed, the magnet JCM will be energized at the same time as the punch clutch magnet PCM to allow the computer code contacts to close and select the five-unit justification code to be punched in the tape along with the 6 and 7 code selected by the contacts of relay JCR. On short lines such as at the end of paragraphs, the carriage will not be in a position to close contacts JZC, and, accordingly, no five-unit code will be punched in the tape as the magnet JCM will not be energized. However, the 6 and 7 codes will be punched in the tape in all cases.

In the event the operator types a line longer than can be justified the indicating lamp JZL will be deenergized by the opening of contact JZC as previously described. In this case, or if the operator finds some error in typing the line, the entire line is easily deleted by pressing both the line delete and J carriage return switches. This may be done by placing one finger in a position to overlap the two switch levers as the two levers are located adjacent each other on the machine.

The same sequence of operations occurs when these two switches are pressed together as occurs when only the J carriage return switch is pressed, except that the line delete relay LDR is energized by the pressing of the line delete switch. The LDR relay is held energized after the switch is released by a holding circuit including its own normally closed points. During this sequence of operations with relay LDR energized, the computer magnet JCM is not energized when relay JCR becomes energized because the circuit for magnet JCM includes normally closed contacts of relay LDR. Relay CR becomes energized in this case instead of magnet JCM and the circuit to relay CR is completed as soon as relay ARR becomes deenergized after the transfer of contacts HCB. This circuit includes contacts HCB transferred, normally closed contacts of relay ARR, normally open contacts of relay ICR, normally closed contacts of relay CRR, and normally open contacts of relay LDR. The energization of relay CR selects the punching of the 1-2-3-4-5-6 code in the usual manner, and in this instance the 7 code hole is also punched because the punch code magnet PM7 is energized over the previously described circuit including normally open contacts of relay JCR and normally closed contacts of relay CRR.

During this second cycle of operation of the tape punch to punch either a justification code or a line delete code, relay ARR becomes energized by the closing of contact PLC. This deenergizes magnet HCM to step the hole counter to its 29th position, thereby restoring contact HCB to normal position to close a circuit for energizing relay CRR through a normally open contact of relay ARR, and a normally open contact of relay JCR. A holding circuit for relay CRR includes its own normally open contacts and normally closed points of the carriage return contacts CRTC so that relay CRR will be held energized until a carriage return operation. The holding circuit for relay ICR, however, includes a normally closed contact of relay CRR so that this relay will be deenergized by this energization of relay CRR. The holding circuits for relays JCR and LDR include normally open contacts of relay ICR so that these relays JCR (and LDR if energized) will now be deenergized by the deenergization of relay ICR.

3. A magnet CRM is provided beneath the keyboard of the trial copy recorder for operating the carriage return key lever, and this magnet now becomes energized over a circuit including the normally closed points of a transfer contact of relay JCR, and a normally open contact of relay CRR.

The energization of magnet CRM trips the carriage return cam which in the usual manner causes a return movement of the carriage. During this return movement of the carriage, contacts CRTC are operated to deenergize relay CRR, thereby deenergizing magnet CRM. The operation of contact CRTC also energizes magnet JRM on the computer which releases the seeker bail allowing all the seekers to return to their normal zero position. The operation of the carriage return cam automatically causes the punching of a carriage return code in the tape, and during this cycle of operation of the punch the hole counter is indexed to its 30th position.

*Tape reader*

After a tape has been punched as hereinabove described, the same is placed, with the data holes preceding the justification, etc. holes into the tape reader 16 of the justified copy reproducer for the automatic control of the reproducer in the justified reproduction of the text carried in code by the tape. The details of the tape reader are shown in Figs. 51 through 56 of the drawings.

The double tape reader 16 of the justified copy reproducer mounted at the left hand side of the main frame has two reading stations JCR and PCR, which insofar as the number and control of the reading pins is concerned, have identical structures. The reader JCR is affected only by codes having a 7 hole therein and may be referred to therefore as the justification code reader. The reader PCR is affected by the printing codes consisting of combinations of holes from 1 to 6 and it may therefore be referred to as the print code reader.

Inasmuch as the two reading stations involve identical structures, a detailed description of the mechanism constituting the print code reader PCR will suffice to impart an understanding of the structures in both readers. A description of the print code reader follows. The corresponding parts of the justification code reader are identified in Figs. 51 and 56 of the drawings by the same reference numerals with an "*a*" added thereto.

The tape reader includes a plurality of paired electrical contacts 412 which are disposed in opposite rows on a supporting structure 413 which is mounted on a base casting 414. Inasmuch as the present device is designed to sense any one of six holes, or any combination thereof in the control tape there are six contacts under the control of tape perforations and a seventh contact constituting a tape run-out contact which will be described in greater detail hereinafter, and a common contact RCC operative in each reading cycle. The contacts in the oppositely disposed rows are arranged on the supporting structure 413 in staggered relation so that they may be individually controlled by interposer mechanism which will be more fully described at a later point.

Each pair of contact devices consists of a fixed conducting strip 415 on one end of which is a contact point, and a resiliently movable conducting strip 416 which carries a contact point in registration with the one on the fixed strip 415 with which it is paired. The resilient conducting strip 416 is normally biased to close the contact points. Each contact device, however, is held open, except when a corresponding tape perforation appears, by means of an offset contact lever 417 which is mounted for limited swinging movement on a pivot shaft 418 which forms part of the supporting structure 413. Each of the contact levers 417 has a free end 419 which when moved outwardly causes the contact operating end thereof to move outwardly. The contact operating end of each lever has pivoted thereto a short, outwardly extending projection insulating link 420 which is notched to engage an outwardly extending pin 421 of the associated resilient contact strips 416. As a result of this structure, when the free ends 419 of the contact levers 417 are moved outwardly the opposite ends move outwardly, whereby the contact points on the associated circuit maker are opened.

The contact levers 417 are guided in their movement by a pair of guide combs 422, and the movement of these levers is partially under control of a pair of contact lever bails 423, one such bail being associated with each row of contact levers, which are adapted to engage the free ends 419 of the contact levers. Thus, when the contact lever bails 423 are moved toward each other, any contact lever which is at such time otherwise free will permit its associated resilient conducting strip 416 to move inwardly to close the contacts thereof. The contact lever bail assembly includes a pair of yoke-like members 424, each comprised of a pair of spaced arms 425 interconnected by the contact lever bail 423. One end of each arm is pivoted on the pivot shaft 418, and the other end of each has mounted thereon a roller 426. The contact lever bail assemblies are urged toward each other under the influence of the resilient contact springs 416, but they are kept in normally separated position by means of interposer bail studs 427 which are adapted to move between the rollers 426 at each end of the assembly. When the studs 427 are disposed between the rollers 426, the contact lever bail assembly is separated, the contact lever bails 423 are in contact with the free ends of the contact levers 419, and as a consequence the contact points of the circuit makers are opened.

The studs 427 are carried by an interposer bail assembly 428 which in turn is pivoted on a pivot shaft 429. The interposer bail assembly 428 includes a pair of spaced side arms on the free end of each of which is located the stud 427 and from which it projects into position between the rollers 426. An interposer bail 431 interconnects the side arms of the interposer bail assembly and this bail is adapted to overlie and to control a series of interposers as will more fully appear hereinafter. Furthermore, the interposer bail assembly has attached thereto an interposer bail arm 432 by means of which the forwardly projecting arms 428 may be rocked about the pivot shaft 429 on which they are mounted. The free end of the interposer bail arm 432 has a cam follower 433 mounted thereon adapted to operate in contact with an interposer bail cam 434 when the interposer bail arm 432 is released from the influence of a control arm 435, as will be more fully explained hereinafter.

The operation of the tape controlled contact assembly is under the ultimate control of a series of interposer arms 437 (Fig. 53), and attached tape reading pins, one such arm being provided for each tape controlled contact lever. The interposer arms 437 are freely pivoted on the shaft 429 on which they are mounted, and each consists of a lever having a pair of interposer shoulders 438 (Fig. 54) formed at the free end thereof. One shoulder 438 of each interposer arm will be associated with the free end of its corresponding contact lever. In the inoperative or non-reading position of the device, the interposer arms will be positioned as shown in Fig. 52 of the drawings with one of its shoulders 438 in the path of movement of its associated contact lever, but normally out of engagement therewith. It will be seen, therefore, that even though the contact lever bails 423 are released, any contact lever whose interposer arm 437 is in blocking position will be restrained from movement and consequently its associated contacts will remain open.

Coupled to each interposer arm is a reading pin 439 which is guided for reciprocating movement in a reading pin guide block 440. The path of the reading pins 439 intersects a tape feed throat 441 in the guide block 440. As a perforated tape is intermittently fed through the tape feed throat 441, the reading pins 439 are allowed to come into light contact therewith by reason of the fact that each interposer arm 437 is under the influence of a light spring 442. The tension of the spring 442 is insufficient to cause any damage to a control tape being read. However, the spring tension is sufficient to cause a reading pin 439 to enter a tape perforation in alignment therewith at the reading station. When this relationship is present the corresponding pin 439 will enter the tape perforation, causing the interposer arm 437 to swing on its pivot shaft 429 sufficiently to withdraw the blocking interposer shoulder 438 from the path of its associated contact lever. Under these conditions when the contact lever bails 423 are moved inwardly away from the free ends of the contact levers, a contact lever thus freed will move sufficiently to close its associated contact points. In the absence of a perforation in the tape, the reading pins will rest lightly on the surface thereof, thus preventing the associated interposer arms 437 from moving out of the path of their associated contact levers, thereby blocking the levers against movement and avoiding the operation of their associated contacts. Whenever the interposer bail 431 is in its depressed position, the interposer arms 437 will be held in non-reading position. It will be noted that the interposer bail 431 overlies and is adapted to contact the upper edge of the aligned interposed arms.

The interposer arms 437 and consequently the reading pins 439 are retained in non-reading position by the interposer bail 431 until the interposer bail arm 432 is released by the control arm 435. Such release follows energization of a control magnet RM in connection with which operates an armature 445 which is pivoted on a stub shaft 444 and about which the armature may rock. The control arm 435 is likewise pivoted on the stub shaft 444. The armature 445 is a bifurcated structure having a laterally extending stop finger 446 adapted to limit its rocking movement about the shaft 444 by contact with an armature yoke 447. A second extension 448 of the armature structure lies substantially parallel but in spaced relation in respect to the stop finger 446, and the free end of this latter extension mounts a cam following roller adapted to contact an armature knock-off cam 449. A spring 450 normally biases the armature 445 away from the core of the control magnet RM, but in order to render the action of the armature 445 positive in overcoming residual magnetism in the core, the armature knock-off cam 449 is arranged to positively rock the armature away from the core immediately after the energizing impulses. The cam 449 is so designed that it operates to hold the armature away from its core for a definite and predetermined time during each cycle, thus insuring that in starting operation of the reader the interposers will not be released at a point in the rotation of shaft 453 where an abnormal contact operation would result. The conjoint action of the control arm 435 and the armature 445 is achieved by the use of an interconnecting spring 451 and the relative adjustment of the two members is achieved through an adjusting screw 452 mounted in a flange of the control arm in such position as to contact the free end of the armature.

The interposer cam 434 and the armature knock-off cam 449 as well as a tape feed cam, as will appear hereinafter, are mounted for rotation with a power shaft 453 which is driven through gears 24 and 25 (Fig. 2). The power shaft 453 and consequently the cams thereon are continuously rotated but tape reading operations are not performed until the control magnet RM is energized. When an energizing current is present in the control magnet RM, the armature 445 is attracted to the magnet core with the result that the control arm 435 is rocked in a clockwise direction, thereby releasing the interposer bail arm 432. The interposer bail arm 432 is under the influence of a spring 454 (Fig. 52) which is effective to draw the cam follower 433 of the interposer bail arm into contact with the interposer bail cam 434. As the interposer bail cam 434 rotates, the interposer bail arm 432 rocks about the pivot shaft 429 and raises the interposer bail assembly 431. As a result of this action the interposers 437 are permitted to rise under the influence of their respective springs 442, and the reading pins 439 will enter any tape perforations that are presented in alignment with the respective pins. When one or more of the pins enters a perforation in the tape, the interposer 437 associated therewith rises sufficiently to free the interposer shoulder 438 from blocking engagement in the path of its associated contact lever 419 so that when the interposer studs 427 move from between the contact lever bail rollers 426, the contact lever, or levers, thus freed of the interposer shoulders will move inwardly under the influence of the resilient contact strip 416 and permit contacts of such operated contact lever, or levers, to close.

As the interposer bail cam 434 rotates and its high point rides in contact with the interposer bail cam follower 433, the interposer bail arm assembly is rocked in a counterclockwise direction about its pivot shaft 429 and the control arm 435 is moved inwardly under the influence of the spring 451 (Fig. 40) so as to be in position to intercept the latch end of the interposer bail arm 432 as it is lowered, thereby holding it out of further contact with the interposer bail cam 434 and sustaining it against the influence of the spring 454. In this position the reading mechanism will again be latched, the interposer bail 431 having lowered the interposer arms 437 into contact lever blocking position and the contact levers having been separated by contact with the contact lever bails 423 upon separation of the contact lever bail assembly structure by the interposer bail studs 427. A second tape reading operation cannot follow, therefore, until the control magnet RM is once against energized. However, when the control magnet is continuously energized the reader operates continuously, reading a new code for each revolution of shaft 453. The common contact RCC under control of the arm 425a is permitted to operate during each reading cycle. The extension 425a is a downward extension of a bail arm 425.

The perforations in the tape are arranged in transverse rows that are equally spaced, and it is contemplated, therefore, that as the tape is moved through the reading throat 441 in step-by-step progression, the successive rows of perforations will present themselves at the reading zone in alignment with the reading pins. For the purpose of achieving a regulated feeding of the tape through the reading zone there has been provided a tape feeding mechanism which is shown in detail in Fig. 55 of the drawings to which reference may now be had. The tape is provided along its length with sprocket holes with which the teeth of a pin wheel 455 are adapted to engage for feeding the tape through the reading throat 441. The pin wheel 455 is carried by a shaft 456 which is rotated in a bearing in the support casting by a feed ratchet wheel 457. The feed ratchet wheel 457 has peripheral teeth which are periodically engaged by a feed pawl 458 for rotating the feed ratchet wheel as may be required for the proper feeding of the tape. The feed pawl 458 is pivoted on a stud 459 carried at one end of a feed pawl operating lever 460. The operating lever is mounted on the pivot shaft 42 for limited rocking movement thereabout and it includes a feed pawl operating arm 461 on the free end of which is mounted a cam follower 462 adapted to contact a tape feed cam 463 mounted for rotation with the power shaft 453. The feed pawl operating assembly includes a transverse tape feed yoke 464 extending between the feed pawl operating arm 461 and an extension 465 to which the feed pawl 458 is pivoted. The feed pawl 458 is moved through its feeding stroke by means of a relatively strong spring 458a which has one end thereof attached to the pawl and the other end thereof to a pin fixed in the support casting. It will appear, therefore, that whenever the feed pawl operating assembly is free to rock about the pivot shaft 429, the end of the feed pawl 458 will be forced into operating engagement with the teeth of the feed ratchet wheel 457 under the influence of the operating spring 458a.

A feed pawl stop 466 is carried by the feed pawl operating assembly extension 465 in such position as to limit the clockwise movement of the feed pawl 458. The support casting carries a stop 467 which is positioned to limit the counterclockwise movement of the feed pawl 458. Between the two stops 466 and 467 the feed pawl 458 is therefore restrained to a predetermined path of movement as it functions to drive the feed ratchet wheel 457.

Restoration of the feed pawl 458 to inoperative position is under the influence of the tape feed cam 463. When the tape feed cam 463 rotates with its high point in contact with its cam follower 462, the feed pawl 458 is withdrawn to its inoperative position.

In order that the tape feed mechanism may be operative only when tape reading is desired, there has been provided a feed pawl latch 468 which is pivoted for rocking movement about a pivot shaft 469. The feed pawl latch 468 is urged to rock about its shaft 469 in a counterclockwise direction under the influence of a spring 470, but the same is normally held against such rocking movement by one of the contact lever bails 423.

Pivoted on the feed pawl latch 468 is a latch control lever 471 which has an extension 472 normally adapted to lie in contact with one of the contact lever bails 423. The spring 470 interconnects the feed pawl latch 468 and its control lever 471 so that clockwise movement of the control lever 471 imparted thereto by the contact lever bail 423 is transmitted to the feed pawl latch. The feed pawl latch has a hooked free end 473 adapted to engage over a shoulder 473a provided on the end of the feed pawl operating assembly 461.

It will appear, therefore, that as the feed pawl operating assembly is rocked into inoperative position under the influence of the tape feed cam 463, and as the contact lever bail 423 moves outwardly, the hooked end 473 of the feed pawl latch 468 will engage over the shoulder of the member 465 and hold the feed pawl operating assembly in inoperative position. Upon the next succeeding tape reading operation the contact lever bails 423 will move inwardly, thereby releasing the control lever 471 and permitting separation of the feed pawl latch 468 and the shoulder under the influence of a feed pawl latch spring 474. This will free the feed pawl operating assembly for a tape feeding operation. The timing of the respective parts is such that the reading of the perforation in the tape by the reading pins 439 takes place during the first part of the cycle and the feeding of the tape takes place during the latter part of the cycle.

A feed ratchet wheel detent 475 is pivoted on the support casting by means of a pivot screw 476, and it is rocked in a clockwise direction under the influence of a spring 477 so that a roller 478 on the free end of the detent arm is in contact with the teeth of the feed ratchet wheel 457, thereby providing a stabilizing influence for the rotary operation of the feed ratchet wheel and consequently its associated tape feeding pin wheel.

In order that the tape may be held in cooperative relation with the pin wheel 455, there has been provided a tape hold-down arm 479 which has an arcuate surface 480 disposed in proximity to the pin wheel 455 and which serves the purpose of holding the tape in contact with the feed pins of the pin wheel.

In order that threading of the tape may be facilitated, the tape hold-down arm 479 is pivoted for rocking movement on the pivot shaft 429. By virtue of the pivotal mounting of the tape hold-down arm, it may be rocked away from the pin wheel 455, thereby exposing the pin wheel to facilitate threading of the tape thereabout.

It is, of course, desirable that a tape run-out contact be opened and retained in open position while the tape hold-down arm 479 has been rocked away from the pin wheel 455 and to the end that a contact RTC may be opened and held against inadvertent closure during tape threading operations, there has been provided a camming surface 482 on an inwardly projecting portion of the tape hold-down arm. The camming surface 482 is so disposed in relation to a tape run-out contact lever stud 483 that upon rocking thereof, as into the open position of the tape hold-down arm, it will contact the stud 483 and move the lower end of a tape run-out contact lever 484 in a counterclockwise direction, thus opening the contacts RTC.

In order that the tape hold-down arm be somewhat positively held in both its open and in its closed position, there is provided a spring loop 485 which has one end thereof attached to a stud 486 extending from the face of an extension finger 487 forming part of the tape hold-down arm assembly. The other end of the spring loop is attached to a stud 488 fixed in and extending from the base casting. When the tape hold-down arm is in its closed position, as shown in Fig. 43, the spring bow 485 exerts a clockwise force against the extension 487 and thereby moves the arcuate portion 480 of the tape hold-down arm against the pin wheel 455. When the tape hold-down arm is swung into the open position, the spring bow 485 tends to force the extension finger 487 in a counterclockwise direction, thus tending to hold the tape hold-down arm in its open position.

It will appear from the foregoing, therefore, that the tape controlled contacts 412 are permitted to close when a tape reading pin 439 associated with a contact lever 417 enters a perforation in the tape. Several sets of contacts are in certain instances under the control of each contact lever, and the aggregate force of the resilient contact strips 416 is considerable; it will follow from the foregoing description and explanation that the interposer structure sustains this force and avoids transmission thereof to the reading pins, and even though the reading pins are the ultimate control instrument for the pin controlled contacts, there is only the force of the interposer spring 442 imposed on the reading pin 439 with the result that the reading pins offer no obstruction to the even passage of the tape through the reading zone. The tape may consequently be used repeatedly without fear of damage or undue wear by contact with the reading pins.

The justification code reader JCR is under the control of a justification read magnet JRM and a linkage system has therefore been provided for operating the interposer bail 431a and the feed pawl operating lever 460a of the justification code reader since a single cam shaft 453 is employed for operating both readers. Cam shaft 453 has a second set of cams 434a and 463a which are duplicates of the cams 434 and 463, respectively. Cam 430a is designed to operate the interposer bail arm 432a when released by the armature 435a upon energization of the justification read magnet JRM. The interposer bail arm 432a has a generally U-shaped extension 710 including a downwardly extending leg 711. The interposer bail 431a has attached thereto an L-shaped lever 712 which is mounted for rocking movement on the shaft 429a. The lever 712 has a downwardly extending leg 713 which is connected to the downwardly extending leg 711 by means of a link 713a pivotally connected to the end of said legs. It will follow, therefore, that when the cam 434a is in operative contact with the interposer bail arm 432a, the interposer bail 431a will be rocked through the operating linkage just described. The feed pawl operating lever 461a has a generally U-shaped extension 715 which includes a leg 716 which is disposed downwardly and which is mounted for rocking movement on the shaft 429a. The downwardly projecting ends of the legs 714 and 716 are respectively pivotally connected at the ends of a link 717. It will, therefore, appear that when the cam 463a rotates into operative contact with the lever 461a, the feed pawl operating lever 460a is rocked about the shaft 429a by the linkage system just described.

*Translator*

As explained hereinabove, the keys composing the keyboard of the justified copy reproducer are selectively actuated by means of a translator which is located under the keyboard and which is under the control of code designations recorded in the columns of a tape in the tape reading unit 16.

The translator is of the type known in this art as a mechanical translator, i. e., the type bars of the writing machine are mechanically operated from the power roll 21 under control of their key levers, and the selection of the key lever to be operated is made by the relative positioning of longitudinally slidable permutation members of the translator. The relative positioning of the permutation members is controlled electrically by the sensed code designation in the tape. The translator is disclosed in detail in Figs. 57 through 62.

The translator comprises generally six code or permutation bars corresponding, respectively, to the six positions of a predetermined code system. These bars are indicated respectively, by the reference characters PB1 to PB6, inclusive. The translator also comprises six selector magnets TM1 to TM6 controlling, respectively, the relative positioning of the six permutation bars PB1 to PB6, and a plurality of seeker members 489 corresponding, respectively, to the keys composing the main keyboard of the machine. The seekers 489 function to actuate their respective key levers, each seeker member 489 comprising an upper hooked end 490 engaging a stud 491 on the side of its corresponding key lever and being adapted to be pulled down to operate such key lever. The translator also includes an operating or power shaft 492 having control cams 493, 494 and 495, mounted thereon, and the translator also comprises mechanism operated by the cams for effecting a cycle of operation during which the selected key lever is actuated and the parts then restored to a normal or inactive position.

As shown, the six permutation bars PB1 to PB6, inclusive, are arranged horizontally and extend transversely beneath the keyboard and in spaced parallel relation with respect to one another. The permutation bars are supported at their two ends for limited longitudinal sliding movement by vertically disposed end comb plates 496 (Fig. 58) suitably fixed to side flange members 497 of a main frame plate and being guided intermediate their ends by vertical comb plates 498 and 499 also suitably fixed to the frame. Suitable tension springs 500 serve to hold integral projections 501 of the bars against the front wall of the guide slots of the intermediate comb plates 498 and 499. Each permutation bar is normally urged to move to the left as viewed in Fig. 58 by a corresponding compression spring 502 surrounding an operating pin 503 which is slidably mounted in spaced flanges 504 of a bracket at the right hand side of the unit, each such pin 503 engaging the right hand end of its corresponding permutation bar. Each permutation bar of the group PB1 to PB6, inclusive, is normally held in an inactive or latched position against the force of its related compression spring 502 by means of a corresponding armature 505 of a corresponding selector magnet of the group TM1 to TM6, inclusive. The permutation bars are shown in the drawings in their inactive or latched positions where they are at the end of their movement toward the right as viewed in Fig. 58. In the latter view, the bar PB1 is shown as provided with an integrally formed lug 506 having a latching point 507 engaging the left hand end of a groove 508 formed in the outer end of the pivoted armature 509 of its related selector magnet TM1. It will be appreciated that each of the other permutation bars is provided with a similar latching lug 506 which engages a similar groove 508 in the armature 509 of its related translator selector magnet. From the foregoing it will be apparent that when any one of the selector magnets of the group TM1 to TM6 is energized, its related armature is attracted, thereby releasing its related permutation bar of the group PB1 to PB6, inclusive, and each such released bar is then moved longitudinally toward the left as viewed in Fig. 58 by its related compression spring 502 and until a lug 510 formed thereon engages a normally stationary restoring bail 511. All released permutation bars are returned at the end of each operating cycle of the translator to their latched positions by means of the restoring bail 511, the latter being mounted on a lever 512 and being operated by a follower lever 512a engaging the cam 493 on the power shaft 492 (Figs. 58 and 62). The manner in which the permutation bars are returned and relatched will be presently described in detail.

There is one seeker for each of the key levers of the keyboard. As shown in Fig. 61, the seeker members 489 extend downwardly from their related key levers and the straight lower ends 513 thereof are arranged transversely of the six permutation bars PB1 to PB6, inclusive, and the seekers are disposed at the sides of the bars which are opposite to that occupied by the translator selector magnets TM1 to TM6, inclusive. The seeker members 489 are maintained against movement in a direction extending lengthwise of the permutation bars by spaced upper and lower comb plates 514 and 515, respectively, which are formed as integral flanges of a rigid frame plate 516 extending transversely beneath the keyboard. The upper comb plate 514 is bent over as indicated at 517 to provide a means for holding a rod 518 which extends transversely of, and beneath the key levers and serves both as a fulcrum and as a retaining means for the upper ends of the seeker member 489, each of the seeker members being formed with a lug 519 which is adapted to engage the underside of rod 518 and thereby limit upward movement of such seeker member 489. A tension spring 520 connects each seeker member 489 with a flange 521 of a fixed frame plate 522 and thereby constantly urges its related seeker 489 against a seeker positioning bail 523, the latter extending transversely across all of the seeker members and being connected at its two outer ends, respectively, to the lower ends of a pair of arms 524 which are in turn pivotally supported at their upper ends to the ends of the fixed support rod 518. There are two cams 495 (Fig. 57) identical with one another, and they are carried, respectively, on opposite ends of the power shaft 492 and at points adjacent the two arms 524. Each of the arms 524 carries a follower roller 526 which is held in continuous engagement with a related one of the cams 495 by the tension springs 520 holding the seeker members 489 against the positioning bail 523. The two cams 495 function as positioning means for the bail 523 and the seeker members 489. In the normal or inactive position of the translator, the cams 495 hold the positioning bail 523 in the position shown in Fig. 58, thereby holding the lower straight ends 513 of the seekers 489 out of seeking relation with respect to the permutation bars PB1 to PB6, inclusive.

As indicated by the showing of permutation bar PB1 in Fig. 58, the longitudinal edge thereof facing the seeker members 489 is formed as a series of tabs 527 which before assembling may be removed by a suitable tool, and, when so removed, provide permutation slots 528. The remaining permutation bars are similarly formed. Each seeker member is disposed opposite either a tab 527 or a slot 528 in each permutation bar, when such bar is both in its latched and in its released position. In a manner which is well known in this art, the tabs 527 of the six permutation bars are permutatively removed according to a predetermined plan so that for each positional relationship of the six permutation bars, the lower straight edge 513 of only one of the seeker members 489 at any given time will be opposite a slot 528 in each of the six bars and such one seeker member is, therefore, the only one that can be operated, for actuating its related key in response to the code designation which effects such positional relationship of the bars. The code designations used in the illustrated embodiment for effecting the different relative positions of the permutation bars for operating the typewriter keys appear at the top in Fig. 49 and in Fig. 49A. As an example, it is noted that the M key has noted in connection therewith the translator code 3–4–5. This means that when the permutation bars PB3, PB4 and PB5 are released by the energizing of their related selector magnets TM3, TM4 and TM5, respectively, and with all other permutation bars remaining in their latched position, the lower edge 489 of the seeker member attached to the M key lever will be opposite a slot in each of the six permutation bars, and no other seeker member will be opposite a continuous vertical row of such slots.

At a selected point in each cycle of operation of the translator, the cams 495 and springs 520 will provide for movement of the positioning bail 523 to the left as viewed in Fig. 61 so that the seeker members 489 may pivot about the rod 518 and the lower ends 513 thereof may move into seeking relationship with respect to the six permutation bars. The seeker member 489 which is opposite a continuous vertical row of slots 528 in the permutation bars will then move into such vertical row of slots and all other seekers will be stopped by a tab 527 in one or more of the permutation bars. The selected seeker 489 which moves into the continuous row of slots, moves far enough for a ledge portion 529 thereon to be beneath and in the path of an operating bail 530.

The operating bail 530 extends across all of the seeker members 489 and is fixed at its two outer ends, respectively, to a pair of operating bail levers 531. The two bail levers 531 are pivoted, respectively, on fixed studs 532 projecting inwardly from the translator frame. Each bail lever 531 is composed of two parts (Fig. 61), one part 533 carrying the operating bail 530 and the other part 534 being adjustably secured by a suitable means indicated at 535 to the part 533 and carrying a follower roller 536 engaging an operating cam 495. As shown in Fig. 57, there are two such cams 495 engaged, respectively, by the two rollers 536 of the two bail levers 534 and each bail lever 534 is kept in engagement with its related operating cam by a tension spring 537 connecting an extension of each lever 534 and a pin 538 of the fixed transverse frame plate 521.

From the foregoing it will be apparent that during each revolution of the power shaft 492, which comprises an operating cycle of the translator, and after the cams 495 have positioned a selected seeker 489 beneath the operating bail 530, the cams 494 and springs 537 will provide for moving the bail levers 533 clockwise as viewed in Fig. 61 and during such movement the operating bail 530 will engage and pull down the selected seeker member 489 and thereby pull down the key lever to which such selected seeker is attached. From the foregoing description of the power mechanism it will be apparent that such downward movement of the related key lever will result in actuating the related key by tripping its related cam unit 31.

In the illustrated embodiment, the cams 495, through the springs 520 and positioning bail 523, move the seekers 489 into seeking relationship with the six permutation bars at the outset of the operating cycle of the translator shaft 492 and move such seekers out of seeking relationship near the end of each such cycle. The operating bail cams 494 start moving the selected seeker member 489 downward soon after movement of the positioning bails 523. The operating bail 530 is restored to its inactive position near the end of each cycle. The positioning bail 523 disconnects the selected seeker 489 from the operating bail 530 when the seekers are engaged by the bail 523 just before the restoration of the operating bails 530.

Each operating cycle of the translator is initiated by engaging the translator clutch 539 which is the same as the clutch shown in Figs. 33 and 34. When the clutch 539 is engaged, it connects the gear 26 to the translator shaft 492. The translator shaft 492 is rotated for one revolution and is then disconnected from the power source by disengagement of the clutch 539. As stated, each revolution of the shaft 492 provides for one operating cycle of the translator. The clutch 539 is engaged by the energizing of the translator clutch magnet TCM. It is to be noted that four of the selector magnets shown in Fig. 58 are arranged in pairs with the outer ends of the armatures 509 of each pair disposed in alignment with each other. It will be appreciated that a third magnet is arranged with each pair to present its armature in overlapping staggered relation to the armatures of the paired magnets. A restoring and knock-off bail 540 is associated with each set of three armatures. The knock-off bails 540 are suitably pivoted on fixed studs 541 and each bail comprises a first bail element 542 extending across the magnet side of each of its associated armatures 509, and also comprises a second bail element 543 disposed above and across its associated armatures and coacting with the rear or righthand edge of the lugs 506 carried by the permutation bars corresponding to the three armatures and selector magnets with which such knock-off bail is associated. Each knock-off bail is urged toward the position shown in Fig. 58 by a tension spring 544. Each armature 509 is pivoted on an upstanding fixed member 545 and is urged away from its related coil by a tension spring 546.

The knock-off bail 540 coacts with the restoring bail 511 to relatch the permutation bars PB1 to PB6, inclusive, at the end of an operating cycle of the translator. As shown in Fig. 58, the lugs 510 on any permutation bar will engage the bail 511 when released by the energizing of its related selector magnet. Near the end of each revolution of the shaft 492, the restoring bail cam 493 will start moving the follower 493a counterclockwise as viewed in Fig. 47. The follower 493a will then move the bail lever 512 clockwise as viewed in Fig. 58, and the bail 511 will start restoring movement, to the right, of any of the permutation bars which were previously released. The restoring bail 511 will engage the restoring lugs 510 on the permutation bars which were not previously released, and then the bail 511 will move all six of the permutation bars to the right as viewed in Fig. 58. The rear edges of the lugs 506 on the permutation bars engage the bail elements 543 of their corresponding knock-off bails 540. The restoring bail 511 will continue to move the permutation bars to the right as viewed in Fig. 58, until the knock-off bails 540 are moved clockwise and their bail elements 542 engage and move outward any of their related armatures which are stuck, thereby assuring the engagement of the latching points 507 of the lugs 506 on the permutation bars within the slots 508 of the related armatures 509. The springs 546 will then hold all armatures 509 against the lugs 501. The restoring bail 511 will start a counterclockwise movement back to the inactive position shown, with the result that the permutation bars PB1 to PB6, inclusive, and the knock-off bails 540 will follow the restoring bail in its return movement until the latching point 507 of the lug 506 of each permutation bar engages the latching lefthand end of the slot 508 of its related armature 509.

Carbon ribbon feed

Since the justified copy reproducer is designed for exceptionally high grade composition, it is equipped to use a relatively narrow strip of carbon paper ribbon. This mechanism is shown in Figs. 67, 68 and 69, wherein a carbon paper ribbon 617 is unwound from a storage roll (not shown) and led across the machine and through the usual ribbon guide in front of the platen to a curved guide 618 provided with guiding lugs 619 at each end thereof. The ribbon is led downwardly in a diagonal path from the guide 618 to a guide roller 620. The ribbon then passes between a pressure roller 621 and a feed roller 622 and thence diagonally downwardly. A bracket 623 is provided to prevent the ribbon from following around the feed roller.

The feed roller 622 is rotatably mounted on one end of a shaft 624 journalled in a plate 625 secured to the side of the machine frame. The pressure roller 621 is rotatably mounted on a stud 621a, the stud being mounted at the mid-point of a release lever 626 which is pivoted at 627 to a stud carried by the plate 625, which stud also mounts the guide roller 620. A spring 628 urges the lever in a counterclockwise direction to constantly urge the roller 621 with the roller 622. In order to insure that the relatively narrow ribbon 617 will remain in its proper position between the two rollers 621 and 622, the upper roller 621 is flanged so as to project on each side of the ribbon and feed roller 622, thereby preventing the ribbon from slipping off the feed roller 622.

The shaft 624 extends through the frame of the machine and is journalled in a lug formed in a bracket 629 (Fig. 69) supported from the escapement frame. A bevel gear 630 secured to the shaft 624 meshes with a similar bevel gear 631 secured to a short shaft 632. A large gear 633 is mounted for rotation on a bracket 634 and meshes with the escapement pinion 147. In consequence of the train of gears just described, the shaft 624 is rotated in a counterclockwise direction when the escapement mechanism is operated for letter spacing, whereby the carbon ribbon 617 will be fed an extent depending upon the width of the character printed. However, when the carriage is released from the escapement mechanism as is the case when the carriage is tabulated or returned by power, the carbon ribbon will not feed due to the fact that the pinion 147 is disconnected from the carriage by the operation of the carriage release mechanism heretofore described in connection with Figs. 17 and 18.

Double reader control circuits

The tape prepared on the trial copy recorder is placed into both sections of the double reader on the justified copy reproducer, and in order to start the reading operation, the tape hold-down arms on both sections of the reader must be against the pin wheels to allow the two tape contacts JRTC and PRTC to close. The tape is placed edgewise into both sections of the double reader, and it is not necessary to form a loop between the two sections of the reader. It is only necessary that the first printing code holes at the beginning of the line should be back of the reader pins in the front or printing section.

In order to start automatic operation of the justified copy reproducer it is only required to press and release the start read switch. When the start read switch is pressed, a circuit is completed for energizing relay JRR through the normally open points of the transfer contact of the start read switch, through a normally closed contact on relay PRR, through normally closed points of a transfer contact on the non-justify switch and through the normally closed contacts on the end line switch. A holding circuit for relay JRR is completed through its own normally open contact, and through normally open contacts JRC6 in parallel with normally closed contact JRC7 of the justification section of the double reader. When the start read switch is released, its normally closed contacts establish a circuit to energize the justification section magnet JRM over a circuit through the normally closed points of a transfer contact on relay SIR, and through a normally open contact of relay JRR. This starts operation of the justification section only, and as this reader section reads the printing codes in the tape, no controls are set up because the number 7 code must be read in order to complete circuits through the other contacts of the justification reader.

It will be remembered from the description of the operation of the trial copy recorder that at the trailing end of each line a number 7 code hole alone is first punched followed by a code including the number 7 and number 6 holes, plus a five-unit code (or various subcombinations of five units) representing the justification control. Accordingly, as the justification section of the double reader reaches the end of the first line, it will first read a number 7 code hole alone. The reading of the number 7 code hole alone at the justification section ordinarily opens the previously traced holding circuit for relay JRR and stops operation of this section of the reader. However, this does not occur when the printing section of the reader is not operating, as is the case when the relay PRR is deenergized. Thus, relay JRR is held energized when the justification section reads the number 7 code over a circuit including the normally closed points of a transfer contact of relay PRR, a normally open contact on relay JRR, the normally closed points of the contacts of the non-justify switch and the normally closed contacts of the end line switch.

The next code to be read by the justification section of the double reader is the 7 and 6 code holes along with the five-unit justification code. This completes a circuit to energize relay PRR through normally open points of a transfer contact JRC7, through a normally open contact JRC6 and through another normally open contact of JRC7. A holding circuit for relay PRR is established through its own normally open contact, and through a normally open contact PRC6 connected in parallel with normally closed points of a transfer contact PRC7 of the printing section of the double reader. At the same time that relay PRR is energized by the reading of the 6 and 7 code holes at the justification section, storage relays JR1, JR2, JR3, JR4 and JR5 are energized in accordance with the five-unit justification code read along with these 6 and 7 code holes.

In other words, when the 7 and 6 code holes are read, a circuit is established through the normally open points of the transfer contact of JRC7, through a normally open contact on JRC6 to one side of a normally open contact on JRC5, JRC4, JRC3, JRC2 and JRC1, and the other side of each of these five normally open contacts is connected respectively to the five previously mentioned storage relays. Thus, the justification code storage relays are energized in accordance with the number of code holes read along with the 6 and 7 codes at this point in the tape. These storage relays are provided with a pick-up winding in addition to a holding winding, and the ones of these relays which become energized by the particular code read have their holding winding energized through their respective normally open contacts. The holding contacts of relays JR3, JR4 and JR5 are connected together and to a normally open contact on relay PRR. The holding contacts of relays JR1 and JR2 are connected together and to a normally closed contact on relay CR8 connected in parallel with a normally open contact of relay PRR through multiple normally open contacts on all of the storage relays.

As the justification code is stored and relay PRR is energized by the justification section, operation of the printing section of the double reader is started by energizing the control magnet PRM over a circuit including the normally closed points of the start read switch, the normally closed contacts of relay SIR, the normally closed back space contact BSC, the normally closed carriage return contact CRTC, the normally open contact of relay PRR and the normally closed points of a transfer contact on relay DCR. This causes the printing section to read the regular six-unit codes and accordingly control the translator and effect automatic operation of the justified copy reproducer to print the line. The printing section of the double reader, however, does not cause printing operation in response to any code employing the number 7 code hole because the energizing circuit for the translator code magnets through the printing section contacts includes a normally closed contact PRC7 which is opened whenever a code is read including the number 7 hole.

Both sections of the double reader are now operating, and the control circuits are so interlocked that if the justification section reaches a number 7 code hole in the tape while the printing section is still operating, the justification section will be stopped until the printing section reaches a number 7 code hole. On the other hand, if the printing section finishes the line and reaches the number 7 code hole while the justification section is still operating, it will continue to read through the next line.

The above interlock is accomplished by arranging a holding circuit for relay JRR which is controlled only by normally closed contacts of JRC7 in parallel with normally open contacts of JRC6 when relay PRR is energized, but when relay PRR is deenergized, its normally closed contacts hold relay JRR energized even though its other holding circuit is opened by contacts JRC6 and JRC7. When the justification section of the reader is stopped during operation of the printing section, it will be automatically started only after the printing section has read a number 7 code hole to energize relay JRR over a circuit including a normally open contact of PRC7, the normally closed contact of the non-justify switch and the normally closed contact of the end line switch. At the same time, the reading of the number 7 code hole without the number 6 code hole by the printing section will open the holding circuit for relay PRR and stop operation of the printing section by deenergizing magnet PRM. The energization of relay JRR starts the operation of the justification section and the first code read will be the justification code including code holes 6 and 7. This will energize relay PRR so that the printing section will be again started and both reader sections will then operate the same as described in connection with starting the automatic operation of the machine.

From the previous description, it will be clear that the two sections of the double reader are so interlocked electrically that the justification reader section will always first find the justification controls for each line before the printing reader starts reading that line, and while the printing reader is reading and automatically typing a line, the justification reader section is searching for the interlocking number 7 code preceding the justification code for the next line to be typed. The interlocking number 7 code which precedes each justification code in the tape is for the purpose of insuring that the justification section will not alter an existing justification control for a line being typed by getting ahead of the printing reader in the case where a short line follows a longer line. In other words, the number 7 code hole stops the justification section before it reaches the justification code for the next line while the printing section is still reading and typing the characters of the preceding line.

Any code read by the printing section having the 5 and 6 hole without the 4 holes will energize relay DCR and as the printing section control magnet PRM is controlled by a normally closed contact of relay DCR, the printing section will be stopped upon reading either a carriage return code, a tabulation code, or a back space code. The holding circuit for relay DCR includes a normally closed contact BSC and a normally closed contact CRTC so that relay DCR is held energized until the start of either the back space, tabulation, or the carriage return operation of the machine, but magnet PRM is not energized to start the printing section until these contacts BSC and CRTC close at the completion of the machine operation.

The 4-5-6 stop code stops the printing section in the justified copy reproducer. A relay SIR in this case is normally deenergized, and becomes energized upon reading a 4-5-6 stop code at the printing section over a circuit including a normally closed contact of PRC7, a normally open contact of PRC6, a normally open contact of PRC5, a normally open contact of PRC4, and a normally closed contact of PRC3. A holding circuit for relay SIR is provided through its own normally open contact and the normally closed points of the contact of the start read switch. Thus, whenever a 4-5-6 code is read by the printing section, relay SIR is energized to open the circuit to the magnet PRM and stop operation of the printing reading section. Operation of the printing section may also be stopped manually by pressing the stop read switch which energizes relay SIR. Relay SIR will be held energized until the start read switch is operated whereupon the printing section will start upon release of the switch. When relay SIR is energized to stop operation of the printing section, the justification section will continue operations until it reaches a number 7 code, whereupon it will also stop and will start only upon operation of the start read switch.

In operating the justified copy reproducer, it may sometimes be desirable to stop the machine for a long period of time and turn off the main power switch when a length of tape still remains in the reader. For example, this would occur when a length of tape still remained in the machine at the end of the day so that the power must be turned off the machine before finishing the entire tape. As will later appear, the justification controls set up by energization of the storage relays may be lost in the event the power switch is turned off while the printing section is operating to automatically type a line. For this reason, a special switch called the end line switch is provided on the machine, which may be pressed by the operator during typing of a line and held down until the machine stops, whereupon the power switch may be turned off without danger of losing any justification controls set up in the machine. The function of this end line switch is merely to open the circuit to the JRR relay so that when the printing section finishes a line, relay JRR will not become energized to start operation of the justification section, and accordingly, both sections of the reader will stop with no justification controls stored in the relays. Thus, the operator merely presses the end line switch and when both readers stop operation, the power switch may be turned off, and later when it is desired to resume operation from the same tape, the power switch is merely turned on and the start read switch pressed.

Provision is also made on the justified copy reproducer for operating the machine to produce unjustified lines. For this purpose, a non-justify switch is provided on the machine which when pressed is automatically retained in its depressed position. With the non-justify switch locked in its depressed position, pressing the start read switch does not energize relay JRR as previously described, but in this case completes a circuit to energize relay PRR through the normally open contact of the start read switch, through the normally closed contact of relay PRR, through the normally open contact of the non-justify switch to the windings of relay PRR. Thus, with tape in the printing section only, magnet PRM is energized upon release of the start read switch to operate this section only of the double reader.

In the reproducer, it will be remembered that a line delete code 1-2-3-4-5-6-7 may be punched in the tape in place of the justification code to delete the entire line preceding this delete code. When this code is read by the justification section, a circuit is completed for energizing a cut-out relay COR through a series of normally open contacts operated by all seven pins of the justification section. A holding circuit for relay COR is provided and is controlled in the same manner as the holding circuit for relay PRR, so that relay COR is held energized until the printing reader finishes the line following the line delete signal. When relay COR is energized, a normally closed contact of this relay is opened to open the circuit which energizes the translator magnets through the printing section contacts. Thus, while the printing section is reading a line following the reading of a line delete signal by the justification section, the translator code magnets do not become energized, and, accordingly, that line is not printed.

*Word space control circuits*

The extent of spacing between words upon automatic operation of the space bar key lever in the justified copy reproducer is varied between one unit and five units to effect justification. Accordingly, in this mechanism the selector slide operated by the space bar cam does not directly select the energization of the escapement magnets EM1, EM2 and EM3, but this selector slide controls three normally open auxiliary contacts WSC. Two of the three contacts WSC control the energizing circuits for the escapement magnets, and the other controls a word space repeater relay WSR. The extent of word spacing resulting from operation of contacts WSC is under the joint control of the two storage relays JR1 and JR2 and the step-down relay SDR.

From the circuit diagram it will be noticed that the following different word space values are effected upon operation of contacts WSC according to the different combinations set up by relays JR1, JR2 and SDR.

*One unit space*

1. With JR1 and JR2 both deenergized and SDR energized, magnet EM1 becomes energized to select a one unit word space.

*Two unit space*

1. With JR1 and JR2 both deenergized and SDR deenergized, magnet EM2 is energized to select a two unit word space.

2. With JR1 energized, JR2 deenergized, and SDR energized, EM2 becomes energized to select a two unit word space.

*Three unit space*

1. With JR1 energized, JR2 deenergized, and SDR deenergized, EM3 is energized to select a three unit word space.

2. With JR1 deenergized, JR2 energized and SDR energized, magnet EM3 alone is energized to select a three unit word space.

*Four unit space*

1. With JR1 deenergized, JR2 energized, and SDR deenergized, magnets EM3 and EM1 are both energized to select a four unit word space.

2. With JR1, JR2 and SDR energized, magnets EM3 and EM1 are energized to select a four unit word space.

*Five unit space*

1. With JR1 and JR2 both energized and SDR deenergized, magnets EM3 and EM2 are both energized to select a five unit word space.

From the above, it will be noted that when the step-down relay SDR is energized, the extent of word spacing is reduced by one unit for each of the four values of word spacing selected by the relays JR1 and JR2. Thus with relay SDR deenergized, the initial word spacing in a line is always determined by relays JR1 and JR2, and the point at which this extent of word spacing is reduced during typing of the line is determined by the energization of the step-down relay SDR, in order that all lines may be justified regardless of the change in length required and the number of word spaces in the line.

As previously mentioned, the point at which the extent of word spacing is reduced one unit by the energization of relay SDR is perforated in the tape in the form of a three-unit code. This code conditions the storage relays JR3, JR4 and JR5. In order that relay SDR may be energized after the proper number of word spaces in a line in accordance with this information stored in relays JR3, JR4 and JR5, three relays CR3, CR4 and CR5 become energized during typing of the line in certain combinations corresponding to the various accumulated number of word spaces throughout the line. Thus, when the condition of relays CR3, CR4 and CR5 corresponds respectively to the stored condition of relays JR3, JR4 and JR5, relay SDR becomes energized to reduce the value of word spaces thereafter.

The contacts of the word space repeater relay WSR and contacts of a half-step relay CRP are used to set up conditions of relays CR3, CR4 and CR5 which correspond to the accumulated number of word spaces in typing a line. In addition, a final count relay CR8 is provided to deenergize relays JR1, JR2 and SDR after the eighth word space so that any additional word spaces will be at the normal two-unit value. It will be noted that the circuits for energizing relays CRP, CR3, CR4, CR5 and CR8 include normally open contacts of all five storage relays connected in multiple. This arrangement permits operation of the counting relay arrangement only if a code has been stored in the storage relays, or for example, at the end of a short line ending a paragraph, no justification code is punched into the tape, and accordingly, none of the five relays will be energized, so that in typing this line on the justified copy reproducer relays CRP, CR3, CR4, CR5 and CR8 will not become energized.

In studying the control circuits for relays CRP, CR3, CR4, CR5 and CR8, it will be apparent that the following conditions are established during the accumulation of word spaces in automatically typing a line:

1. During the first word space, relay CR3 becomes energized. After the first word space, relay CRP becomes energized, and relay CR3 is held energized.

2. During the second word space, relay CR4 becomes energized, relay CRP and relay CR3 are held energized. After the second word space, relay CRP becomes deenergized, relay CR3 and relay CR4 are held energized.

3. During the third word space, relay CR3 becomes deenergized and relay CR4 is held energized. After the third word space, relay CRP becomes energized and relay CR4 is held energized.

4. During the fourth word space, relay CR5 becomes energized, relay CR4 and relay CRP are held energized. After the fourth word space, relay CRP becomes deenergized, relay CR4 and relay CR5 are held energized.

5. During the fifth word space, relay CR4 becomes deenergized, and relay CR5 is held energized. After the fifth word space, relay CRP becomes energized and relay CR5 is held energized.

6. During the sixth word space, relay CR3 becomes energized, relay CR5 and relay CRP are held energized. After the sixth word space, relay CRP becomes deenergized, relay CR3 and relay CR5 are held energized.

7. During the seventh word space, relay CR4 becomes energized, relay CR3 and relay CR5 are held energized. After the seventh word space, relay CRP becomes energized and relays CR3, CR4 and CR5 are held energized.

8. During the eighth word space, relay CR8 becomes energized, and relays CR3, CR4, CR5 and CRP are held energized. After the eighth word space, relays JR1, JR2, SDR and CRP become deenergized, and relays CR3, CR4, CR5 and CR8 are held energized.

Relays CR3, CR4, CR5 and CR8 are deenergized when relay PRR is deenergized at the end of a line.

From the above it will be clear that at each successive word space from the first to the eighth, a different combination of relay energization is established. After each of these word spaces, the combination set up in relays CR3, CR4 and CR5 is compared with the combination stored in relays JR3, JR4 and JR5 and when the two combinations match, relay SDR is energized. In other words, the various combinations are established during the word space operation and the comparison is made after each word space operation so that when the two combinations match, the SDR relay is energized before the next succeeding word space operation. This is because relays CR3, CR4, CR5 and CR8 become energized or deenergized only when relay WSR is energized by the closing of word space contacts WSC, and the energizing circuit for relay SDR includes a normally closed contact of relay WSR so that it can be energized only following a word space operation when relay WSR is deenergized by contacts WSC in their normal position. It will also be noted that the half-step relay CRP is alternately energized and deenergized on each successive period after the word space operation of the machine. This half-step relay CRP is provided to interlock the stepping or counting operations of relays CR3, CR4, CR5 and CR8 with the alternate operations of relay WSR. It will further be noted that the energizing circuit for relay SDR includes parallel normally open contacts on relays CR3, CR4 and CR5 so that relay SDR cannot be energized unless at least one of the three relays is energized.

From a study of the justification code chart, it will be clear how each code set up in the storage relays will effect justification of various lines. In accomplishing this operation, it will be remembered that the number 1 and number 2 codes condition relays JR1 and JR2 to determine the initial word space value, and that the number 3, number 4 and number 5 codes condition relays JR3, JR4 and JR5 to determine the number of word spaces after which the extent of word spacing is reduced by the energization of relay SDR.

The manner in which the justification controls operate may be observed from a study of the diagram of Fig. 50. It will be observed from this diagram that the controls are adapted to reduce a line having a minimum number of eight word spaces by seven units, or to increase a line having a minimum number of eight word spaces by twenty-two units. It is evident, of course, that the greatest reduction or expansion of a line is possible when eight word spaces appear in the line. In this regard it may be noted that the normal space between words is two units and furthermore after the eighth word space all subsequent word spaces are reduced to a normal two units.

As described in connection with the word space control circuits, spacing between words at the beginning of a line will be a given number of units for a precomputed number of word spaces, whereafter the spacing between the following words is reduced by a given number of units until the spacing between the first nine words has been adjusted, whereafter any additional words will be spaced by the normal two-unit space. The manner in which justification is controlled may best be understood by resort to an example. With reference to Fig. 50, suppose a line having five word spaces appears to be eight units short of a desired length. It will, therefore, be necessary to add eight units between the words of such line to achieve complete justification of the line. Thus, by referring to the justification code, which is applicable to such condition, it will be noted that it consists of the 2 code and the 4 code. The first of these codes, namely the 2 code, will control the number of additional units by which the words will be spaced during the reproduction of the initial part of the line. The 4 code in this diagram indicates the point at which the reduction, if any, in word spacing takes place.

The 2 code may be found in the small box at the bottom left of Fig. 50, wherein it will appear that the starting word space will be four units and that the reduced word space will be three units. By referring to the box at the lower right of Fig. 50, it will appear that the reduction in spacing units will take place after the third word space.

In the example there are five word spaces having an aggregate of ten normal units of spacing therebetween. Since the first three word spaces will be four units or a total of twelve units, and since the next two word spaces will be three units for each or an aggregate of six units, it follows that a total of eighteen units will be provided in the five word spaces. Since the normal number of space units in the five word space line would be ten units, as noted above, it readily appears that eight additional units have been provided to achieve complete justification of the line.

While a specific form of the instrumentalities employed in the machine has been described for purpose of illustration, it is contemplated that numerous changes may be made without departing from the spirit of the invention.

What is claimed is:

1. In a machine for producing justified copy under control of a perforated control tape, a power operated typing mechanism including individually operable type actions, a variable escapement carriage against which said type actions are adapted to operate, line justifying mechanism including a plurality of storage relays under control of a tape code, adapted to control the spacing of said carriage between words a given distance for a predetermined number of word spaces from the beginning of a line, a second set of storage relays energizable by word spacing during the reproduction of a line, and means responsive to a predetermined condition of said second set of storage relays operative to reduce said spacing between succeeding words of a line.

2. In a machine for producing justified copy under control of a perforated control tape, a power operated typing mechanism including individually operable type actions, a variable escapement carriage against which said type actions are adapted to operate, line justifying mechanism including a first group of storage relays under control of a tape code adapted to control the spacing of said carriage between words a given distance for a predetermined number of word spaces from the beginning of a line, a second group of storage relays energizable by accumulated word spacing during the reproduction of a line, and means thereafter operative when relays of said first and second groups are energized in the same combination to reduce said spacing between succeeding words of a line.

3. In a machine for producing justified copy under the control of a control tape having character codes and a justification code punched therein, a power operated typing mechanism including individually operable type actions, a variable escapement carriage against which said type actions are adapted to operate, line justifying mechanism adapted to control the variable spacing of said carriage between words, character code reading mechanism including movable hole sensing pins for originating control manifestations for said type actions, operational control code reading mechanism including movable hole sensing pins for originating control manifestations for said justifying mechanism, a common drive means for controlling the movement of said hole sensing pins, and means for selectively connecting said code reading mechanisms to said common drive means whereby the movement of said hole sensing pins of each of said mechanisms is under independent control.

4. In a machine for producing justified copy under the control of a control tape having character codes and a justification code punched therein, a power operated typing mechanism including individually operable type actions, a variable escapement carriage against which said type actions are adapted to operate, line justifying mechanism adapted to control the variable spacing of said carriage between words, a character code reading station including hole sensing pins and means for moving the same for originating control manifestations for said type actions, an operational control code reading station including hole sensing pins and means for moving the same for originating control manifestations for said line justifying mechanism, a cam shaft for directly controlling the moving means of the hole sensing pins in one of said code reading stations, and a linkage system connecting said cam shaft and the hole sensing pin moving means in the other code reading station.

5. In a machine for producing justified copy under the control of a control tape having character codes and a justification code punched therein, a power operated typing mechanism including individually operable type actions, a variable escapement carriage against which said type actions are adapted to operate, line justifying mechanism adapted to control the variable spacing of said carriage between words, a character code reading station including movable hole sensing pins, an operational control code reading station including movable hole sensing pins, a common drive means for controlling the movement of said hole sensing pins, and means under control of a code read in said operational control code reading station for rendering inoperative the sensing function of the pins in the character code reading station until a related justification code has been read in said operational control code reading station.

6. In a machine for producing justified copy under the control of a control tape having character codes and a justification code punched therein, a power operated typing mechanism including individually operable type actions, a variable escapement carriage against which said type actions are adapted to operate, line justifying mechanism adapted to control the variable spacing of said carriage between words, a character code reading station including movable hole sensing pins, an operational control code reading station including movable hole sensing pins, a common drive means for controlling the movement of said hole sensing pins, and electromagnetic means under control of a code read in said operational control code reading station for rendering operative the sensing function of the pins in the character code reading station when a related justification code has been sensed in said operational control code reading station.

7. In a machine for producing justified copy under control of a perforated control tape having character codes and function control codes punched therein, a power operated character code sensing station including code reading pins, a power operated function control code sensing station including code reading pins, a common drive shaft for moving the reading pins of said stations into code reading position, electromagnetic means individual to each of said sensing stations for operatively coupling the pins thereof with said drive shaft and thereby rendering the same operative to read codes in a control tape, and means under control of a tape code for energizing one of said electromagnetic means.

8. In a machine for producing justified copy under control of a perforated control tape having character codes and function control codes punched therein, a power operated character code sensing station including code reading pins, a power operated function control code sensing station including code reading pins, a common drive shaft for moving the reading pins of said stations into code reading position, and electromagnetic means individual to each of said sensing stations for operatively coupling the pins thereof with said drive shaft and thereby rendering the same operative to read codes in a control tape.

9. In a machine for producing justified copy under control of a perforated control tape having character codes and function control codes punched therein, a power operated character code sensing station including code reading pins, a power operated function control code sensing station including code reading pins, a common drive shaft for said stations, and means individual to each of said sensing stations for rendering the code reading pins thereof operative in response to operation of said common drive shaft to read codes in a control tape.

10. In a machine for producing justified copy under control of a perforated control tape having character codes and function control codes punched therein, a power operated character code sensing station including code reading pins, a power operated function control code sensing station including code reading pins, a common drive shaft for the reading pins of said stations, electromagnetic means for said character code sensing station for rendering the pins therein operative to read character codes in a control tape, electromagnetic means for said function control code sensing station for rendering the pins therein operative to read function control codes in the same control tape, manual means for energizing the electromagnetic means at said function control code sensing station, and means under control of a tape code for energizing the electromagnetic means at said character code sensing station.

11. In a machine for producing justified copy under control of a perforated control tape, a power operated typing mechanism including individually operable type actions, a variable escapement carriage adapted to provide a normal number of space units between words, line justifying mechanism including a plurality of storage relays under control of a tape code adapted to increase the number of space units of said carriage escapement between words from the beginning of a line, a second set of storage relays energizable by word spacing during the reproduction of a line, means responsive to a predetermined condition of said second set of storage relays operative to reduce the number of word space units between a predetermined number of succeeding words of a line, and means operative after a fixed number of word spaces of a line for restoring normal carriage escapement.

12. In a machine for producing justified copy under control of a perforated control tape, a power operated typing mechanism including individually operable type actions, a variable escapement carriage adapted to provide a normal number of space units between words, line justifying mechanism including a plurality of storage relays under control of a tape code adapted to increase the number of space units of said carriage escapement between words from the beginning of a line, a second set of storage relays energizable by word spacing during the reproduction of a line, means responsive to a predetermined condition of said second set of storage relays operative to reduce the number of word space units between a predetermined number of succeeding words of a line, a word space counter, and means under control of said word space counter operative after a fixed number of word spaces of a line for restoring normal carriage escapement.

13. In a machine for producing justified copy under control of a perforated control tape having character representing perforations and a single line of justification code holes disposed transversely of the longitudinal axis thereof at the end of character representing perforation groups, a power operated typing mechanism including individually operable type actions under control of character representing perforations of a control tape, a variable escapement carriage adapted to provide a normal number of space units between words, line justifying mechanism including a plurality of storage relays concurrently settable in tape code controlled combinations adapted to control the escapement of said carriage to vary the number of space units between words from the normal number for a predetermined number of word spaces from the beginning of a line, and means thereafter operative conjointly with said relays during tape controlled typing of a line to control the carriage escapement to produce a normal number of space units between a predetermined number of succeeding words of the line being typed.

14. In a machine for producing justified copy under control of a perforated control tape having character representing perforations and a single line of justification code holes disposed transversely of the longitudinal axis thereof at the end of character representing perforation groups, a power operated typing mechanism including individually operable type actions under control of character representing perforations of a control tape, a variable escapement carriage adapted to provide a normal number of space units between words, line justifying mechanism including a plurality of storage relays concurrently settable in tape code controlled combinations adapted to control the escapement of said carriage to vary the number of space units between words from the normal number for a predetermined number of word spaces from the beginning of a line, means thereafter operative conjointly with said relays during tape controlled typing of a line to control the carriage escapement to reduce the number of space units between a predetermined number of succeeding words by a unit of space, and means operative after a line having a fixed number of word spaces has been typed for restoring normal carriage escapement.

15. In a machine for producing justified copy under control of a perforated control tape having character representing perforations and a single line of justification code holes disposed transversely of the longitudinal axis thereof at the end of character representing perforation groups, a power operated typing mechanism including individually operable type actions under control of character representing perforations of a control tape, a variable escapement carriage adapted to provide a normal number of space units between words, line justifying mechanism including a plurality of storage relays concurrently settable in tape code controlled combinations adapted to control the escapement of said carriage to increase the number of space units between words over the normal number for a predetermined number of word spaces from the beginning of a line, a second set of storage relays energizable by word spacing during the typing of a line and operative conjointly with said first named storage relays to control the carriage escapement to reduce the number of space units between a predetermined number of succeeding words by a unit of space, a word space counter, and means responsive to said word space counter after a line having a fixed number of word spaces has been typed for restoring normal carriage escapement.

16. In a machine for producing justified copy under control of a perforated control tape having character codes and justification control codes punched therein, a power operated character code sensing station, a power operated justification control code sensing station, reciprocal code hole sensing pins in each of said stations, a drive shaft for said stations for controlling the reciprocating movement of said pins, and means individual to each of said stations for selectively coupling the code hole sensing pins therein in reciprocationg relation with said drive shaft.

17. In a machine for producing justified copy under control of a perforated control tape having character codes and justification control codes punched therein, a power operated character code sensing station, a power operated justification control code sensing station, reciprocal code hole sensing pins in each of said stations, a drive shaft for said stations for controlling the reciprocating movement of said pins, means individual to each of said stations for coupling the code hole sensing pins therein in reciprocating relation with said drive shaft, means for disabling the coupling means for the code hole sensing pins in said justification control code sensing station following the sensing of a justification control code therein, and means responsive to the sensing of a control tape code in said character code sensing station for rendering active the coupling means for said code hole sensing pins in said justification control code sensing station.

18. In a machine for producing justified copy under control of a perforated control tape having character codes and justification control codes punched therein, a power operated character code sensing station, a power operated justification control code sensing station, code hole sensing pins in each of said stations, a drive shaft for said stations, means individual to each of said stations for coupling the code hole sensing pins therein in operative relation with said drive shaft, means responsive to the sensing of a control tape code in said justification control code sensing station for disabling the coupling means for the sensing pins in said justification control code sensing station following the sensing of a justification control code therein, and means responsive to the sensing of a control tape code in said character code sensing station for rendering active the coupling means for said code hole sensing pins in said justification control code sensing station.

19. In a machine for producing justified copy under control of a perforated control tape having character codes and functional control codes punched therein, a power operated character code sensing station including code reading pins, a power operated justification control code sensing station including code reading pins, a common drive shaft for moving the reading pins of said stations into code reading position, electromagnetic means individual to each of said sensing stations for operatively coupling the pins thereof with said drive shaft when said electromagnetic means are energized and thereby rendering said pins operative to read codes in a control tape, means for deenergizing the electromagnetic means for said justification control code sensing station following the sensing of a justification control code therein, and means responsive to the sensing of a tape code in said character code sensing station for energizing the electromagnetic means of said justification control code sensing station.

20. In a machine for producing justified copy under control of a perforated control tape having character codes and functional control codes punched therein, a power operated character code sensing station including code reading pins, a power operated justification control code sensing station including code reading pins, a common drive shaft for moving the reading pins of said stations into code reading position, electromagnetic means individual to each of said sensing stations for operatively coupling the pins thereof with said drive shaft when said electromagnetic means are energized and thereby rendering said pins operative to read codes in a control tape, means responsive to the sensing of a control tape code in said justification control code sensing station for deenergizing the electromagnetic means for said justification control code sensing station following the sensing of a justification control code therein, and means responsive to the sensing of a control tape code in said character code sensing station for energizing the electromagnetic means of said justification control code sensing station.

21. In a machine for producing justified copy under control of a coded control tape, a power operated typing mechanism including individually operable type actions, a carriage against which said type actions are adapted to operate, a variable escapement mechanism for said carriage adapted to provide a fixed predetermined number of unit spaces between words during normal typing, means for simultaneously sensing the bits of a single multi-bit justification code on a control tape that is representative both of the number of unit spaces to be inserted between words and the number of word spaces that are to receive such number of unit spaces to effect justification, variable escapement control means responsive to said sensing means for controlling said variable escapement mechanism to produce word spaces having the number of unit spaces corresponding to a justification code sensed by said sensing means, word space factor storage means settable by said sensing means to the number of word spaces that are to receive the number of unit spaces corresponding to a justification code sensed by said sensing means, a word space counter operative to count the word spaces during the typing of a line, means for comparing the setting of said word space factor storage means and said word space counter after each word spacing operation, and means operable when said word space counter setting is the same as the setting of said word space factor storage means for causing said variable escapement control means to change the number of unit spaces by which the following words of the line are spaced.

22. The invention defined in claim 21 wherein the means operable when said word space counter setting is the same as the setting of said word space factor storage means causes said variable escapement control means to reduce by one the number of unit spaces by which the following words of the line are spaced.

23. The invention of claim 21 wherein there is provided a second word space counter adapted to count a fixed predetermined number of word spaces during the typing of a line, and means responsive to said second word space counter upon the counting thereby of a fixed predetermined number of word spaces to render inoperative said variable escapement control means, whereby said variable escapement will provide a lesser fixed predetermined number of unit spaces between any remaining words typed into a line.

24. The invention of claim 21 wherein the means operable when said word space counter setting is the same as the setting of said word space factor storage means causes said variable escapement control means to reduce by one the number of unit spaces by which the following words of the line are spaced, and wherein there is provided a second word space counter adapted to count a fixed predetermined number of word spaces during the typing of a line, and means responsive to said second word space counter upon the counting thereby of a fixed predetermined number of word spaces to render inoperative said variable escapement mechanism control means, whereby said variable escapement will provide a fixed predetermined lower number of unit spaces between any remaining words thereafter typed into a line.

25. The invention of claim 21 wherein said variable escapement control means includes a plurality of relays.

26. The invention of claim 21 wherein said word space factor storage means and said word space counter each comprise a plurality of relays.

References Cited in the file of this patent

UNITED STATES PATENTS

| | | |
|---|---|---|
| 2,294,722 | Dodge | Sept. 1, 1942 |
| 2,375,271 | Ayres | May 8, 1945 |
| 2,379,862 | Bush | July 10, 1945 |
| 2,555,734 | Dodge | June 5, 1951 |